(12) United States Patent
Lee et al.

(10) Patent No.: US 12,133,197 B2
(45) Date of Patent: Oct. 29, 2024

(54) METHOD AND APPARATUS FOR SIDELINK TERMINAL TO TRANSMIT SIGNAL IN WIRELESS COMMUNICATION SYSTEM

(71) Applicant: LG ELECTRONICS INC., Seoul (KR)

(72) Inventors: Seungmin Lee, Seoul (KR); Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 532 days.

(21) Appl. No.: 17/422,086

(22) PCT Filed: Jan. 13, 2020

(86) PCT No.: PCT/KR2020/000598
§ 371 (c)(1),
(2) Date: Jul. 9, 2021

(87) PCT Pub. No.: WO2020/145785
PCT Pub. Date: Jul. 16, 2020

(65) Prior Publication Data
US 2022/0104178 A1   Mar. 31, 2022

(30) Foreign Application Priority Data

Jan. 11, 2019   (KR) .................. 10-2019-0004229
Jan. 11, 2019   (KR) .................. 10-2019-0004230
Jan. 11, 2019   (KR) .................. 10-2019-0004236

(51) Int. Cl.
*H04W 72/02* (2009.01)
*H04W 64/00* (2009.01)
(Continued)

(52) U.S. Cl.
CPC ......... *H04W 72/02* (2013.01); *H04W 64/006* (2013.01); *H04W 76/14* (2018.02); *H04W 4/40* (2018.02); *H04W 92/18* (2013.01)

(58) Field of Classification Search
CPC .... H04W 72/02; H04W 76/14; H04W 64/006
See application file for complete search history.

(56) References Cited

U.S. PATENT DOCUMENTS

| 10,157,539 B1 | 12/2018 | Hoover et al. |
| 2018/0242190 A1 | 8/2018 | Khoryaev et al. |
| 2019/0229964 A1* | 7/2019 | Ouchi .................. H04L 5/0051 |

FOREIGN PATENT DOCUMENTS

WO   2018160048 A1   9/2018

OTHER PUBLICATIONS

Intel Corporation, "Summary for NR-V2X AI-7.2.4.1.4 Resource Allocation Mechanism", 3GPP TSG RAN WG1 Meeting #95, Nov. 12-16, 2018, R1-1814260.

(Continued)

*Primary Examiner* — Ronald B Abelson
(74) *Attorney, Agent, or Firm* — BRYAN CAVE LEIGHTON PAISNER LLP

(57) ABSTRACT

One embodiment relates to a method for a first terminal to transmit a sidelink signal in a wireless communication system, the method comprising: a step in which the first terminal determines at least one from among transmission parameters, a CSI-RS transmission configuration, and a DMRS configuration; and a step in which the first terminal transmits the sidelink signal to a second terminal, on the basis of at least one from among the transmission parameters, CSI-RS transmission configuration, and DMRS configuration. The terminal determines, on the basis of establishment of a unicast connection with the second terminal, a first value corresponding to a relative difference from the second terminal by using information included in a message (Continued)

from the second terminal and sensor information, and determines at least one from among the transmission parameters, CSI-RS transmission configuration, and DMRS configuration on the basis of the first value.

12 Claims, 38 Drawing Sheets

(51) Int. Cl.
*H04W 76/14* (2018.01)
*H04W 4/40* (2018.01)
*H04W 92/18* (2009.01)

(56) References Cited

OTHER PUBLICATIONS

Ericsson, "Sidelink Resource Allocation in V2X", 3GPP TSG-RAN WG2 #93, Feb. 15-19, 2016, R2-161566.

* cited by examiner

FIG. 1
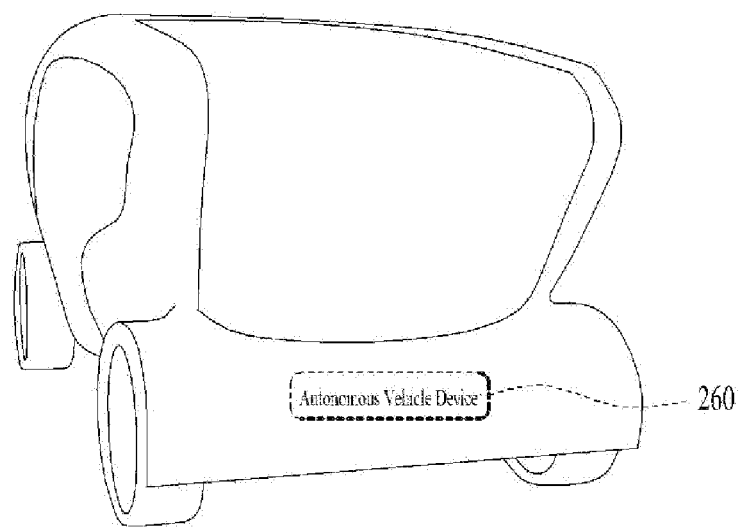
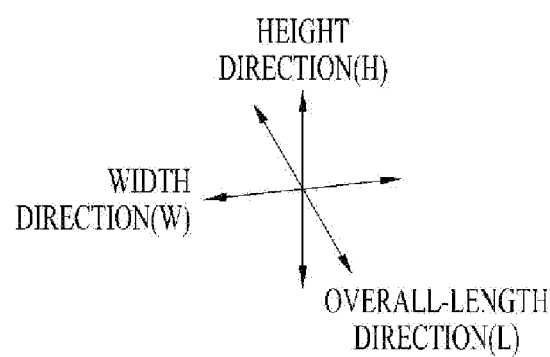

FIG. 15
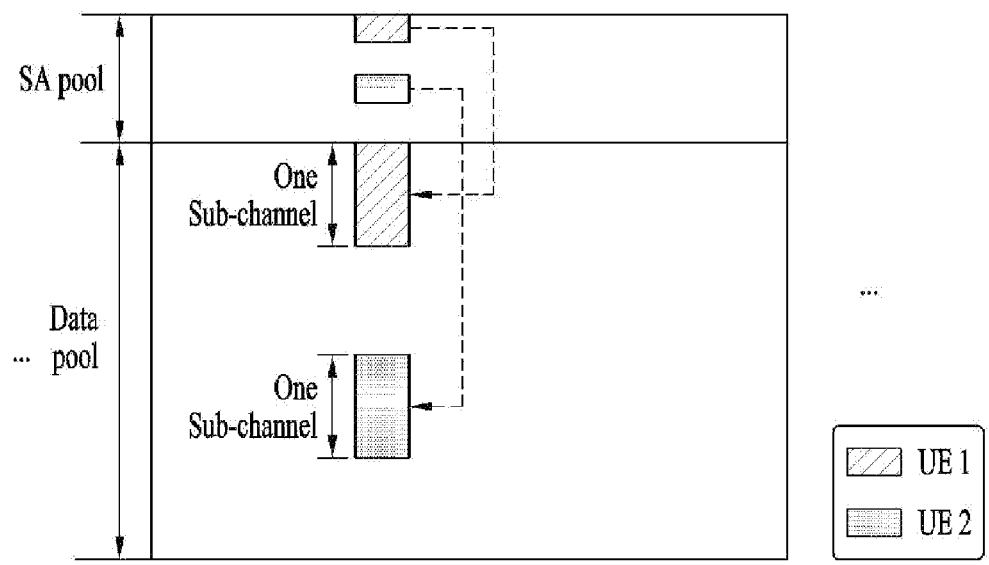
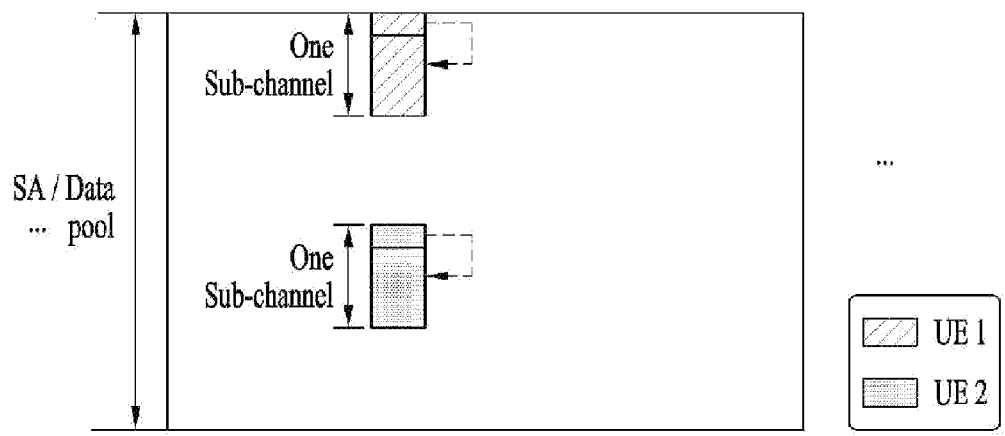

FIG. 26

$P^{(0)} = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$ ← Circulant shift value $P^1 = \begin{bmatrix} 0 & 1 & 0 & 0 \\ 0 & 0 & 1 & 0 \\ 0 & 0 & 0 & 1 \\ 1 & 0 & 0 & 0 \end{bmatrix}$

→

$H = \begin{bmatrix} P^{a11} & P^{a12} & \cdots & P^{a1(n-1)} & P^{a1n} \\ P^{a21} & P^{a22} & \cdots & P^{a2(n-1)} & P^{a2n} \\ \vdots & \vdots & \ddots & \vdots & \vdots \\ P^{am1} & P^{am2} & \cdots & P^{am(n-1)} & P^{amn} \end{bmatrix}$ $P^{\infty} = 4 \times 4 \text{ zero - matrix}$

METHOD AND APPARATUS FOR SIDELINK TERMINAL TO TRANSMIT SIGNAL IN WIRELESS COMMUNICATION SYSTEM

This application is the National Stage filing under 35 U.S.C. 371 of International Application No. PCT/KR2020/000598 filed on Jan. 13, 2020, which claims priority to Korean Patent Application Nos. 10-2019-0004229 filed on Jan. 11, 2019; 10-2019-0004230 filed on Jan. 11, 2019 and 10-2019-0004236 filed on Jan. 11, 2019, the contents of which are hereby incorporated by reference herein in their entirety.

TECHNICAL FIELD

The present disclosure relates to a wireless communication system, and more particularly, to a method and apparatus for efficiently obtaining channel state information (CSI) and configuring a transmission parameter or a demodulation reference signal (DMRS) based on a change in the moving direction or speed of a vehicle.

BACKGROUND ART

Wireless communication systems have been widely deployed to provide various types of communication services such as voice or data. In general, the wireless communication systems are multiple access systems capable of supporting communication between multiple users by sharing available system resources (e.g., bandwidth, transmit power, etc.). The multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

In a wireless communication system, a variety of radio access technologies (RATs) such as LTE, LTE-A, and Wi-Fi are used and the fifth generation of wireless technology (5G) belongs to the RATs. Three main requirement categories for 5G include (1) a category of enhanced mobile broadband (eMBB), (2) a category of massive machine type communication (mMTC), and (3) a category of ultra-reliable and low-latency communications (URLLC). Partial use cases may require a plurality of categories for optimization and other use cases may focus upon only one key performance indicator (KPI). 5G supports such various use cases using a flexible and reliable method.

eMBB far surpasses basic mobile Internet access and covers abundant bidirectional work and media and entertainment applications in cloud and augmented reality. Data is one of a core driving force of 5G and, in the 5G era, a dedicated voice service may not be provided for the first time. In 5G, it is expected that voice will simply be processed as an application program using data connection provided by a communication system. Main causes for increased traffic volume are increase in the size of content and an increase in the number of applications requiring high data transmission rate. A streaming service (of audio and video), conversational video, and mobile Internet access will be more widely used as more devices are connected to the Internet. These application programs require always-on connectivity in order to push real-time information and alerts to users. Cloud storage and applications are rapidly increasing in a mobile communication platform and may be applied to both work and entertainment. Cloud storage is a special use case which accelerates growth of uplink data transmission rate. 5G is also used for cloud-based remote work. When a tactile interface is used, 5G demands much lower end-to-end latency to maintain good user experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 20.4 billion up to the year of 2020. Industrial IoT is one of categories of performing a main role enabling a smart city, asset tracking, smart utilities, agriculture, and security infrastructure through 5G.

URLLC includes new services that will transform industries with ultra-reliable/available, low-latency links such as remote control of critical infrastructure and a self-driving vehicle. A level of reliability and latency is essential to control and adjust a smart grid, industrial automation, robotics, and a drone.

Next, a plurality of use cases will be described in more detail.

5G is a means of providing streaming at a few hundred megabits per second to gigabits per second and may complement fiber-to-the-home (FTTH) and cable-based broadband (or DOCSIS). Such high speed is needed to deliver TV at a resolution of 4K or more (6K, 8K, and more), as well as virtual reality and augmented reality. Virtual reality (VR) and augmented reality (AR) applications include immersive sports games. A specific application program may require a special network configuration. For example, for VR games, gaming companies need to incorporate a core server into an edge network server of a network operator in order to minimize latency.

Automotive is expected to be a new important driving force in 5G together with many use cases for mobile communication for vehicles. For example, entertainment for passengers requires high simultaneous capacity and mobile broadband with high mobility. This is because future users continue to expect high connection quality regardless of location and speed. Another automotive use case is an AR dashboard. The AR dashboard displays information talking to a driver about a distance to an object and movement of the object by being superimposed on an object seen from a front window to identify an object in the dark. In the future, a wireless module will enable communication between vehicles, information exchange between a vehicle and supporting infrastructure, and information exchange between a vehicle and other connected devices (e.g., devices transported by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by a human being.

A smart city and a smart home mentioned as a smart society will be embedded in a high-density wireless sensor network. A distributed network of an intelligent sensor will identify conditions for costs and energy-efficient maintenance of a city or a home. Similar configurations may be performed for respective households. All temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is highly decentralized so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of energy such as electricity by a method having efficiency, reliability, economic feasibility, sustainability of production, and automatability. The smart grid may also be regarded as another sensor network having low latency.

A health care part contains many application programs capable of enjoying the benefits of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in an industrial application field. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of cables and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

DISCLOSURE

Technical Problem

The object of embodiment(s) is to provide a method of changing a transmission parameter configuration, a channel state information reference signal (CSI-RS) transmission configuration, and/or a demodulation reference signal (DMRS) configuration by using information obtained by sensors of a vehicle user equipment (UE) and information from other vehicles obtained through vehicle-to-everything (V2X) communication. That is, the object is to provide a method of enabling a mobile UE to efficiently obtain channel information before determining transmission parameters.

Objects that are intend to be achieved with embodiment(s) are not limited to what has been particularly described hereinabove and other objects not described herein will be more clearly understood by persons skilled in the art to which embodiment(s) pertain from the following description.

Technical Solution

In an aspect of the present disclosure, a method of transmitting a sidelink signal by a first user equipment (UE) in a wireless communication system is provided. The method may include: determining, by the first UE, at least one of a transmission parameter, a channel state information reference signal (CSI-RS) transmission configuration, or a demodulation reference signal (DMRS) configuration; and transmitting, by the first UE, the sidelink signal to a second UE based on the at least one of the transmission parameter, the CSI-RS transmission configuration, or the DMRS configuration. Based on establishment of a unicast connection with the second UE, the first UE may determine a first value corresponding to a relative difference from the second UE by using information included in a message from the second UE and sensor information. The first UE may determine the at least one of the transmission parameter, the CSI-RS transmission configuration, or the DMRS configuration based on the first value.

In another aspect of the present disclosure, a first UE in a wireless communication system is provided. The first UE may include: a memory; and a plurality of processors coupled to the memory. At least one processor among the plurality of processors may be configured to determine at least one of a transmission parameter, a CSI-RS transmission configuration, or a DMRS configuration and transmit a sidelink signal to a second UE based on the at least one of the transmission parameter, the CSI-RS transmission configuration, or the DMRS configuration. Based on establishment of a unicast connection with the second UE, the first UE may determine a first value corresponding to a relative difference from the second UE by using information included in a message from the second UE and sensor information. The first UE may determine the at least one of the transmission parameter, the CSI-RS transmission configuration, or the DMRS configuration based on the first value.

The first value may be one of a relative speed/acceleration, a relative distance/distance change, or a relative position/position change.

A transmission parameter, a CSI-RS transmission configuration, or a DMRS configuration related to the first value may be received through physical layer or higher layer signaling.

Based on that there is no establishment of a unicast connection with a specific UE, the first UE may determine a second value corresponding to relative differences from a plurality of UEs based on the sensor information and one of minimum, average, maximum, and weight values of information in messages received from the plurality of UEs. The first UE may determine the at least one of the transmission parameter, the CSI-RS transmission configuration, or the DMRS configuration based on the second value.

The first UE may receive a transmission parameter, a CSI-RS transmission configuration, or a DMRS configuration depending on an average relative speed, an average distance, and an average moving trajectory in a specific area for each resource pool, bandwidth part, or carrier through physical layer or higher layer signaling.

The first UE may transmit at least one of an average relative speed, an average relative acceleration, or an average distance of other UEs communicating with the first UE, an average number of UEs performing communication, channel state information (CSI) variation, or modulation and coding scheme (MCS) variation to a base station through physical layer or higher layer signaling.

When the first UE is a Mode 1 UE, a base station may provide configuration information on the Mode 1 UE to a Mode 2 UE.

The message from the second UE may be at least one of a basic safety message (BSM), a cooperative awareness message (CAM), or a decentralized notification message (DENM).

The message from the second UE may include at least one of a speed, an acceleration, a location, an altitude, a direction, a distance (relative distance), a trajectory (relative trajectory change), a lane (lane change), a congestion level, or a channel busy ratio (CBR).

The sensor information may include at least one of a speed, an acceleration, a location, an altitude, a direction, a distance (relative distance), a trajectory (relative trajectory change), a lane (lane change), a congestion level, or a CBR.

The CSI-RS transmission configuration may include a configuration of a CSI-RS transmission period and pattern, the DMRS configuration may include a configuration of a number and pattern of DMRSs per slot, and the transmission parameter may include at least one of transmission power, a transmission resource size, or a retransmission count setting.

The sidelink signal may be either a CSI-RS or a DMRS.

The first UE may be an autonomous driving vehicle or included in the autonomous driving vehicle.

Advantageous Effects

According to embodiment(s), a transmission parameter may be configured based on information provided by vehicle sensors such as a speed, a direction, and a trajectory change, and feedback may be efficiently provided. Thus, user equipments (UEs) may effectively exchange channel state information (CSI), thereby improving decoding performance in UE-to-UE communication. Further, channel quality between UEs may be effectively measured in unicast or groupcast communication, thereby effectively configuring the transmission parameter (e.g., modulation and coding scheme (MCS), power, resource block (RB) size, etc.) and reducing transmission of excessive channel state information reference signals (CSI-RSs) or use of demodulation reference signals (DMRSs) with high density. In summary, the reception rate may be improved compared to resource usage so that overall system performance may be improved.

It will be appreciated by persons skilled in the art that the effects that could be achieved by embodiment(s) are not limited to what has been particularly described hereinabove and other effects not mentioned herein will be more clearly understood from the following detailed description.

DESCRIPTION OF DRAWINGS

The accompanying drawings, which are included to provide a further understanding of embodiment(s), illustrate various embodiments and together with the description of the specification serve to explain the principle of the specification.

FIG. 1 is a diagram illustrating a vehicle according to embodiment(s).

FIG. 15 illustrates an example of transmitting a PSCCH in sidelink transmission mode 3 or 4 to which embodiment(s) are applicable.

FIGS. 25 and 26 illustrate parity-check matrices to which embodiment(s) are applicable.

BEST MODE

1. Driving
(1) Exterior of Vehicle

FIG. 1 is a diagram illustrating a vehicle according to embodiment(s).

Referring to FIG. 1, a vehicle 10 according to embodiment(s) is defined as a transportation means traveling on roads or railroads. The vehicle 10 includes a car, a train, and a motorcycle. The vehicle 10 may include an internal combustion engine vehicle having an engine as a power source, a hybrid vehicle having an engine and a motor as a power source, and an electric vehicle having an electric motor as a power source. The vehicle 10 may be a privately owned vehicle. The vehicle 10 may be a shared vehicle. The vehicle 10 may be an autonomous driving vehicle.

(2) Components of Vehicle

Figure 2:
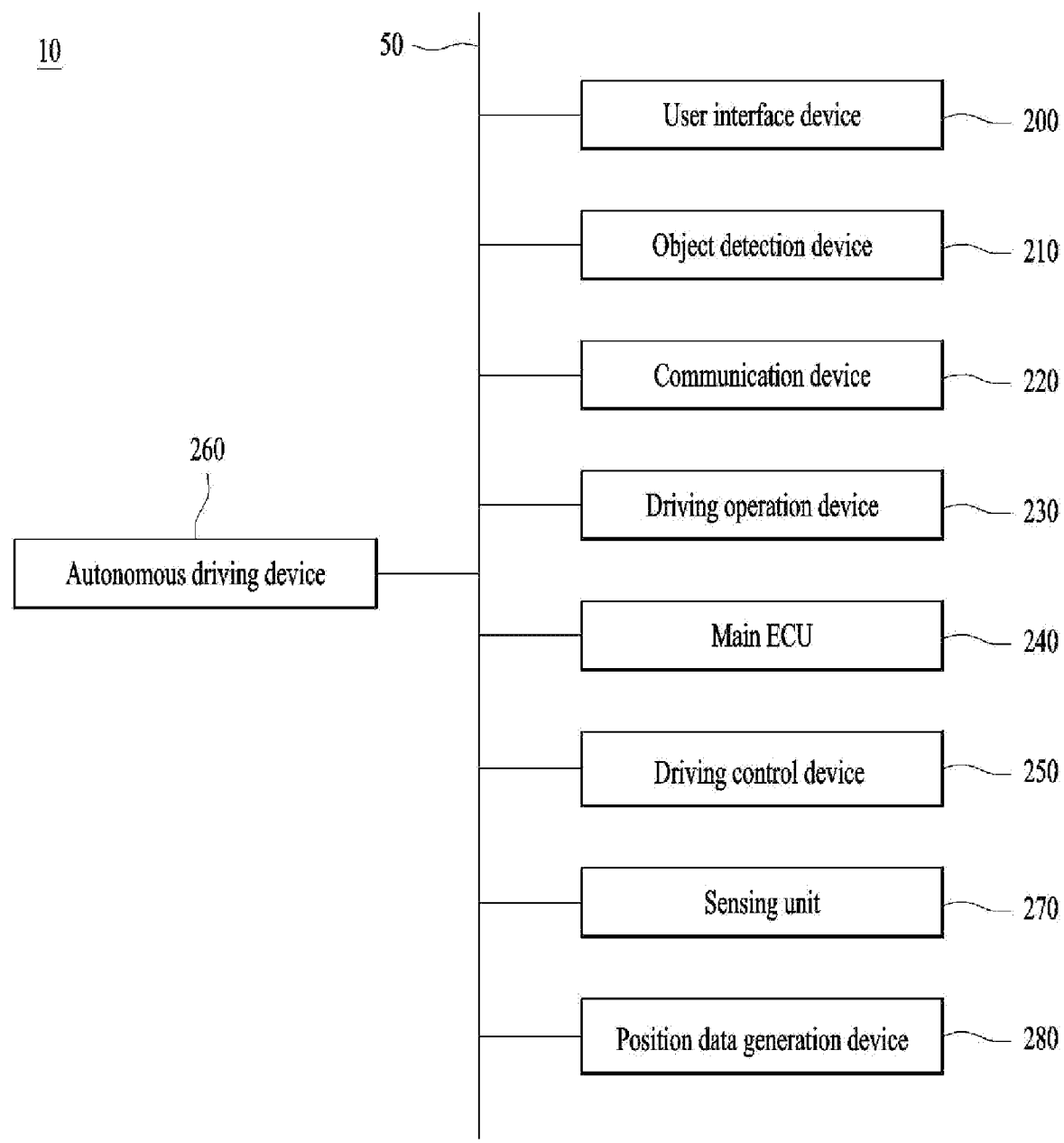
FIG. 2 is a control block diagram of the vehicle according to embodiment(s).

FIG. 2 is a control block diagram of the vehicle according to embodiment(s).

Referring to FIG. 2, the vehicle 10 may include a user interface device 200, an object detection device 210, a communication device 220, a driving operation device 230, a main electronic control unit (ECU) 240, a driving control device 250, an autonomous driving device 260, a sensing unit 270, and a position data generation device 280. The object detection device 210, the communication device 220, the driving operation device 230, the main ECU 240, the driving control device 250, the autonomous driving device 260, the sensing unit 270 and the position data generation device 280 may be implemented by electronic devices which generate electric signals and exchange the electric signals with one another.

1) User Interface Device

The user interface device 200 is a device for communication between the vehicle 10 and a user. The user interface device 200 may receive user input and provide information generated in the vehicle 10 to the user. The vehicle 10 may implement a user interface (UI) or user experience (UX) through the user interface device 200. The user interface device 200 may include an input device, an output device, and a user monitoring device.

2) Object Detection Device

The object detection device 210 may generate information about objects outside the vehicle 10. Information about an object may include at least one of information about presence or absence of the object, information about the position of the object, information about a distance between the vehicle 10 and the object, or information about a relative speed of the vehicle 10 with respect to the object. The object detection device 210 may detect objects outside the vehicle 10. The object detection device 210 may include at least one sensor which may detect objects outside the vehicle 10. The object detection device 210 may include at least one of a camera, a radar, a lidar, an ultrasonic sensor, or an infrared sensor. The object detection device 210 may provide data about an object generated based on a sensing signal generated from a sensor to at least one electronic device included in the vehicle.

2.1) Camera

The camera may generate information about objects outside the vehicle 10 using images. The camera may include at least one lens, at least one image sensor, and at least one processor which is electrically connected to the image sensor, processes received signals, and generates data about objects based on the processed signals.

The camera may be at least one of a mono camera, a stereoscopic camera, or an around view monitoring (AVM) camera. The camera may acquire information about the position of an object, information about a distance to the object, or information about a relative speed with respect to the object using various image processing algorithms. For example, the camera may acquire information about a distance to an object and information about a relative speed with respect to the object from an acquired image based on change in the size of the object over time. For example, the camera may acquire information about a distance to an object and information about a relative speed with respect to the object through a pin-hole model, road profiling, or the like. For example, the camera may acquire information about a distance to an object and information about a relative speed with respect to the object from a stereoscopic image acquired from a stereoscopic camera based on disparity information.

The camera may be mounted in a portion of the vehicle at which field of view (FOV) may be secured in order to capture the outside of the vehicle. The camera may be disposed in proximity to a front windshield inside the vehicle in order to acquire front view images of the vehicle. The camera may be disposed near a front bumper or a radiator grill. The camera may be disposed in proximity to a rear glass inside the vehicle in order to acquire rear view images of the vehicle. The camera may be disposed near a rear bumper, a trunk, or a tail gate. The camera may be disposed in proximity to at least one of side windows inside the vehicle in order to acquire side view images of the vehicle. Alternatively, the camera may be disposed near a side mirror, a fender, or a door.

2.2) Radar

The radar may generate information about an object outside the vehicle 10 using electromagnetic waves. The radar may include an electromagnetic wave transmitter, an electromagnetic wave receiver, and at least one processor which is electrically connected to the electromagnetic wave transmitter and the electromagnetic wave receiver, processes received signals, and generates data about an object based on the processed signals. The radar may be implemented as a pulse radar or a continuous wave radar in terms of electromagnetic wave emission. The continuous wave radar may be implemented as a frequency modulated continuous wave (FMCW) radar or a frequency shift keying (FSK) radar according to signal waveform. The radar may detect an object through electromagnetic waves based on time of flight (TOF) or phase shift and detect the position of the detected object, a distance to the detected object, and a relative speed with respect to the detected object. The radar may be disposed at an appropriate position outside the vehicle in order to detect objects positioned in front of, behind, or on the side of the vehicle.

2.3) Lidar

The lidar may generate information about an object outside the vehicle 10 using a laser beam. The lidar may include a light transmitter, a light receiver, and at least one processor which is electrically connected to the light transmitter and the light receiver, processes received signals, and generates data about an object based on the processed signals. The lidar may be implemented as a TOF type or a phase shift type. The lidar may be implemented as a driven type or a non-driven type. A driven type lidar may be rotated by a motor and detect an object around the vehicle 10. A non-driven type lidar may detect an object positioned within a predetermined range from the vehicle according to light steering. The vehicle 10 may include a plurality of non-driven type lidars. The lidar may detect an object through a laser beam based on the TOF type or the phase shift type and detect the position of the detected object, a distance to the detected object, and a relative speed with respect to the detected object. The lidar may be disposed at an appropriate position outside the vehicle in order to detect objects positioned in front of, behind, or on the side of the vehicle.

3) Communication Device

The communication device 220 may exchange signals with devices disposed outside the vehicle 10. The communication device 220 may exchange signals with at least one of infrastructure (e.g., a server and a broadcast station), another vehicle, or a terminal. The communication device 220 may include at least one of a transmission antenna, a reception antenna, or a radio frequency (RF) circuit or an RF element which may implement various communication protocols, in order to perform communication.

For example, the communication device may exchange signals with external devices based on cellular V2X (C-V2X). For example, C-V2X may include side-link communication based on LTE and/or side-link communication based on NR. Details related to C-V2X will be described later.

For example, the communication device may exchange signals with external devices based on dedicated short range communications (DSRC) or wireless access in vehicular environment (WAVE) based on IEEE 802.11p physical (PHY)/media access control (MAC layer technology and IEEE 1609 network/transport layer technology. DSRC (or WAVE) is communication specification for providing an intelligent transport system (ITS) service through short-range dedicated communication between vehicle-mounted devices or between a roadside device and a vehicle-mounted device. DSRC may be a communication scheme that may use a frequency of 5.9 GHz and have a data transmission rate in the range of 3 Mbps to 27 Mbps. IEEE 802.11p may be combined with IEEE 1609 to support DSRC (or WAVE).

The communication device of embodiment(s) may exchange signals with external devices using only one of C-V2X and DSRC. Alternatively, the communication device of embodiment(s) may exchange signals with external devices using a hybrid of C-V2X and DSRC.

4) Driving Operation Device

The driving operation device 230 is a device for receiving user input for driving. In a manual mode, the vehicle 10 may be driven based on a signal provided by the driving operation device 230. The driving operation device 230 may include a steering input device (e.g., a steering wheel), an acceleration input device (e.g., an accelerator pedal), and a brake input device (e.g., a brake pedal).

5) Main ECU

The main ECU 240 may control the overall operation of at least one electronic device included in the vehicle 10.

6) Driving Control Device

The driving control device 250 is a device for electrically controlling various vehicle driving devices included in the vehicle 10. The driving control device 250 may include a powertrain driving control device, a chassis driving control device, a door/window driving control device, a safety device driving control device, a lamp driving control device, and an air-conditioner driving control device. The powertrain driving control device may include a power source driving control device and a transmission driving control device. The chassis driving control device may include a steering driving control device, a brake driving control device, and a suspension driving control device. Meanwhile, the safety device driving control device may include a seat belt driving control device for seat belt control.

The driving control device 250 includes at least one electronic control device (e.g., an ECU).

The driving control device 250 may control vehicle driving devices based on signals received by the autonomous device 260. For example, the driving control device 250 may control a powertrain, a steering device, and a brake device based on signals received by the autonomous device 260.

7) Autonomous Driving Device

The autonomous driving device 260 may generate a route for self-driving based on acquired data. The autonomous driving device 260 may generate a driving plan for traveling along the generated route. The autonomous driving device 260 may generate a signal for controlling movement of the vehicle according to the driving plan. The autonomous device 260 may provide the generated signal to the driving control device 250.

The autonomous driving device 260 may implement at least one advanced driver assistance system (ADAS) function. The ADAS may implement at least one of adaptive cruise control (ACC), autonomous emergency braking (AEB), forward collision warning (FCW), lane keeping assist (LKA), lane change assist (LCA), target following assist (TFA), blind spot detection (BSD), adaptive high beam assist (HBA), automated parking system (APS), a pedestrian collision warning system, traffic sign recognition (TSR), traffic sign assist (TSA), night vision (NV), driver status monitoring (DSM), or traffic jam assist (TJA).

The autonomous driving device 260 may perform switching from a self-driving mode to a manual driving mode or switching from the manual driving mode to the self-driving mode. For example, the autonomous driving device 260 may switch the mode of the vehicle 10 from the self-driving mode to the manual driving mode or from the manual driving mode to the self-driving mode, based on a signal received from the user interface device 200.

8) Sensing Unit

The sensing unit 270 may detect a state of the vehicle. The sensing unit 270 may include at least one of an internal measurement unit (IMU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, or a pedal position sensor. Further, the IMU sensor may include one or more of an acceleration sensor, a gyro sensor, and a magnetic sensor.

The sensing unit 270 may generate vehicle state data based on a signal generated from at least one sensor. The vehicle state data may be information generated based on data detected by various sensors included in the vehicle. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data of a pressure applied to an acceleration pedal, data of a pressure applied to a brake pedal, etc.

9) Position Data Generation Device

The position data generation device 280 may generate position data of the vehicle 10. The position data generation device 280 may include at least one of a global positioning system (GPS) or a differential global positioning system (DGPS). The position data generation device 280 may generate position data of the vehicle 10 based on a signal generated from at least one of the GPS or the DGPS. According to an embodiment, the position data generation device 280 may correct position data based on at least one of the IMU sensor of the sensing unit 270 or the camera of the object detection device 210. The position data generation device 280 may also be called a global navigation satellite system (GNSS).

The vehicle 10 may include an internal communication system 50. A plurality of electronic devices included in the vehicle 10 may exchange signals through the internal communication system 50. The signals may include data. The internal communication system 50 may use at least one communication protocol (e.g., CAN, LIN, FlexRay, MOST or Ethernet).

(3) Components of Autonomous Driving Device

Figure 3:
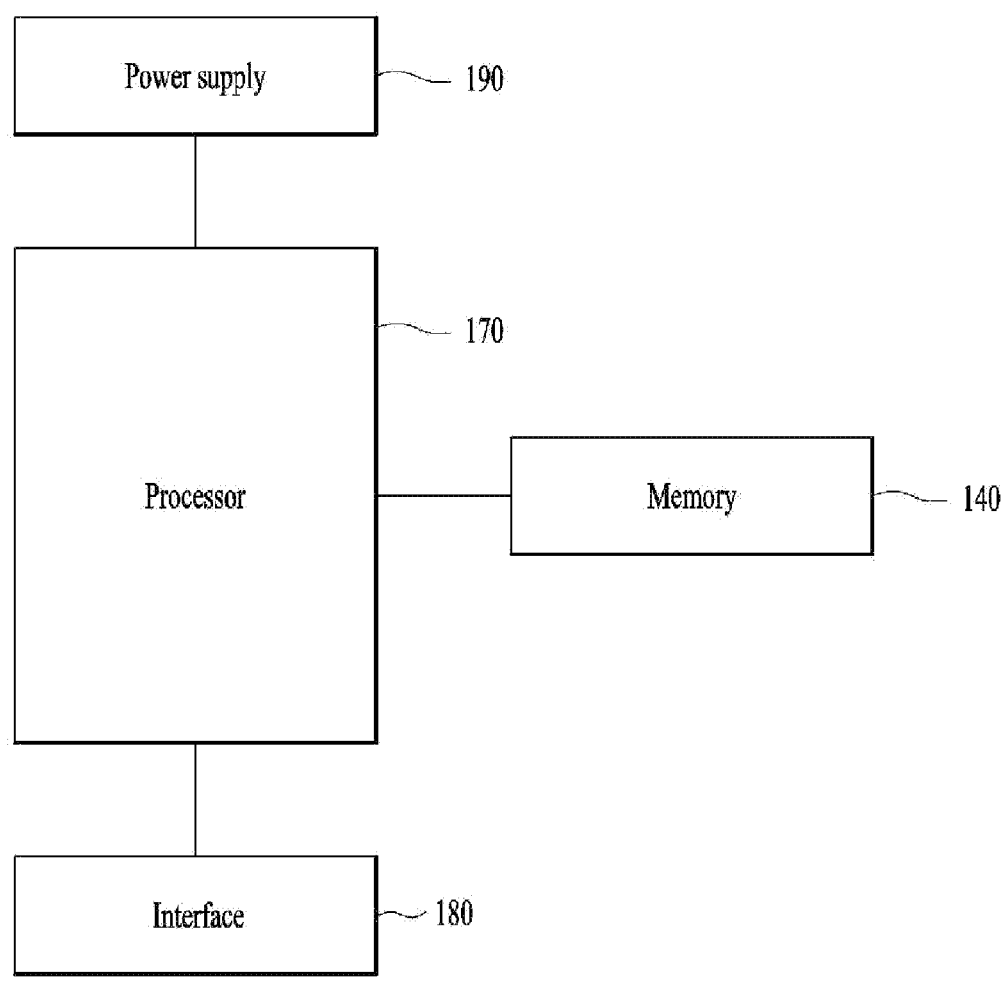
FIG. 3 is a control block diagram of an autonomous device according to embodiment(s).

FIG. 3 is a control block diagram of the autonomous driving device according to embodiment(s).

Referring to FIG. 3, the autonomous driving device 260 may include a memory 140, a processor 170, an interface 180, and a power supply 190.

The memory 140 is electrically connected to the processor 170. The memory 140 may store basic data with respect to units, control data for operation control of units, and input/output data. The memory 140 may store data processed in the processor 170. Hardware-wise, the memory 140 may be configured as at least one of a ROM, a RAM, an EPROM, a flash drive, or a hard drive. The memory 140 may store various types of data for overall operation of the autonomous driving device 260, such as a program for processing or control of the processor 170. The memory 140 may be integrated with the processor 170. According to an embodiment, the memory 140 may be categorized as a subcomponent of the processor 170.

The interface 180 may exchange signals with at least one electronic device included in the vehicle 10 by wire or wirelessly. The interface 180 may exchange signals with at least one of the object detection device 210, the communication device 220, the driving operation device 230, the main ECU 240, the driving control device 250, the sensing unit 270, or the position data generation device 280 in a wired or wireless manner. The interface 180 may be configured using at least one of a communication module, a terminal, a pin, a cable, a port, a circuit, an element, or a device.

The power supply 190 may provide power to the autonomous driving device 260. The power supply 190 may be provided with power from a power source (e.g., a battery) included in the vehicle 10 and supply the power to each unit of the autonomous driving device 260. The power supply 190 may operate according to a control signal supplied from the main ECU 240. The power supply 190 may include a switched-mode power supply (SMPS).

The processor 170 may be electrically connected to the memory 140, the interface 180, and the power supply 190 and exchange signals with these components. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electronic units for executing other functions.

The processor 170 may be operated by power supplied from the power supply 190. The processor 170 may receive data, process the data, generate a signal, and provide the signal while power is being supplied thereto.

The processor 170 may receive information from other electronic devices included in the vehicle 10 through the interface 180. The processor 170 may provide control signals to other electronic devices in the vehicle 10 through the interface 180.

The autonomous driving device 260 may include at least one printed circuit board (PCB). The memory 140, the interface 180, the power supply 190, and the processor 170 may be electrically connected to the PCB.

(4) Operation of Autonomous Driving Device

1) Reception Operation

Figure 4:
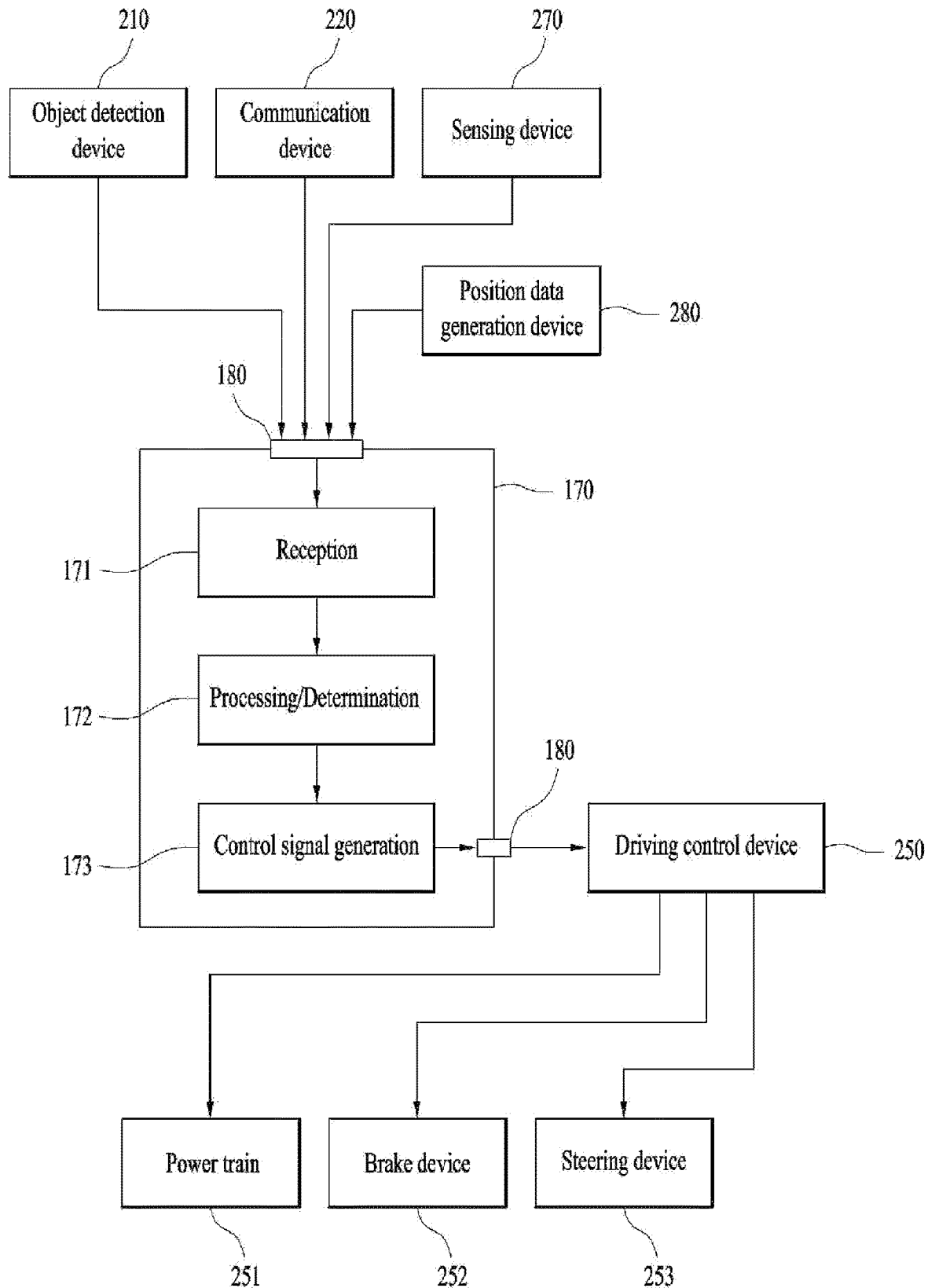
FIG. 4 is a block diagram of the autonomous device according to embodiment(s)

Referring to FIG. 4, the processor 170 may perform a reception operation. The processor 170 may receive data from at least one of the object detection device 210, the communication device 220, the sensing unit 270, or the position data generation device 280 through the interface 180. The processor 170 may receive object data from the object detection device 210. The processor 170 may receive HD map data from the communication device 220. The processor 170 may receive vehicle state data from the sensing unit 270. The processor 170 may receive position data from the position data generation device 280.

2) Processing/Determination Operation

The processor 170 may perform a processing/determination operation. The processor 170 may perform the processing/determination operation based on traveling situation information. The processor 170 may perform the processing/determination operation based on at least one of the object data, the HD map data, the vehicle state data, or the position data.

2.1) Driving Plan Data Generation Operation

The processor 170 may generate driving plan data. For example, the processor 170 may generate electronic horizon data. The electronic horizon data may be understood as driving plan data in a range from a position at which the vehicle 10 is located to a horizon. The horizon may be understood as a point a predetermined distance before the position at which the vehicle 10 is located based on a predetermined traveling route. The horizon may refer to a point at which the vehicle may arrive after a predetermined time from the position at which the vehicle 10 is located along a predetermined traveling route.

The electronic horizon data may include horizon map data and horizon path data.

2.1.1) Horizon Map Data

The horizon map data may include at least one of topology data, road data, HD map data, or dynamic data. According to an embodiment, the horizon map data may include a plurality of layers. For example, the horizon map data may include a first layer that matches the topology data, a second layer that matches the road data, a third layer that matches the HD map data, and a fourth layer that matches the dynamic data. The horizon map data may further include static object data.

The topology data may be explained as a map created by connecting road centers. The topology data is suitable for approximate display of a location of a vehicle and may have a data form used for navigation for drivers. The topology data may be understood as data about road information other than information on driveways. The topology data may be generated based on data received from an external server through the communication device 220. The topology data may be based on data stored in at least one memory included in the vehicle 10.

The road data may include at least one of road slope data, road curvature data, or road speed limit data. The road data may further include no-passing zone data. The road data may be based on data received from an external server through the communication device 220. The road data may be based on data generated in the object detection device 210.

The HD map data may include detailed topology information in units of lanes of roads, connection information of each lane, and feature information for vehicle localization (e.g., traffic signs, lane marking/attribute, road furniture, etc.). The HD map data may be based on data received from an external server through the communication device 220.

The dynamic data may include various types of dynamic information which may be generated on roads. For example, the dynamic data may include construction information, variable speed road information, road condition information, traffic information, moving object information, etc. The dynamic data may be based on data received from an external server through the communication device 220. The dynamic data may be based on data generated in the object detection device 210.

The processor 170 may provide map data in a range from a position at which the vehicle 10 is located to the horizon.

2.1.2) Horizon Path Data

The horizon path data may be explained as a trajectory through which the vehicle 10 may travel in a range from a position at which the vehicle 10 is located to the horizon. The horizon path data may include data indicating a relative probability of selecting a road at a decision point (e.g., a fork, a junction, a crossroad, or the like). The relative probability may be calculated based on a time taken to arrive at a final destination. For example, if a time taken to arrive at a final destination is shorter when a first road is selected at a decision point than that when a second road is selected, a probability of selecting the first road may be calculated to be higher than a probability of selecting the second road.

The horizon path data may include a main path and a sub-path. The main path may be understood as a trajectory obtained by connecting roads having a high relative probability of being selected. The sub-path may be branched from at least one decision point on the main path. The sub-path may be understood as a trajectory obtained by connecting at least one road having a low relative probability of being selected at at least one decision point on the main path.

3) Control Signal Generation Operation

The processor 170 may perform a control signal generation operation. The processor 170 may generate a control signal based on the electronic horizon data. For example, the processor 170 may generate at least one of a powertrain control signal, a brake device control signal, or a steering device control signal based on the electronic horizon data.

The processor 170 may transmit the generated control signal to the driving control device 250 through the interface 180. The driving control device 250 may transmit the control signal to at least one of a powertrain 251, a brake device 252, or a steering device 253.

2. Cabin

Figure 5:
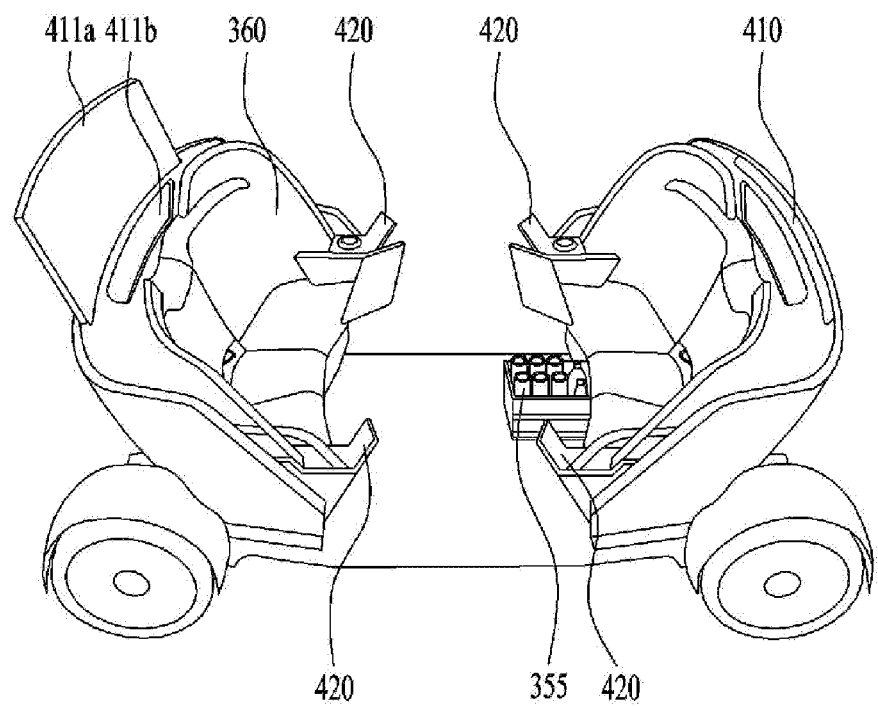
FIG. 5 is a diagram showing the interior of the vehicle according to embodiment(s).

FIG. 5 is a diagram showing the interior of the vehicle according to embodiment(s).

Figure 6:
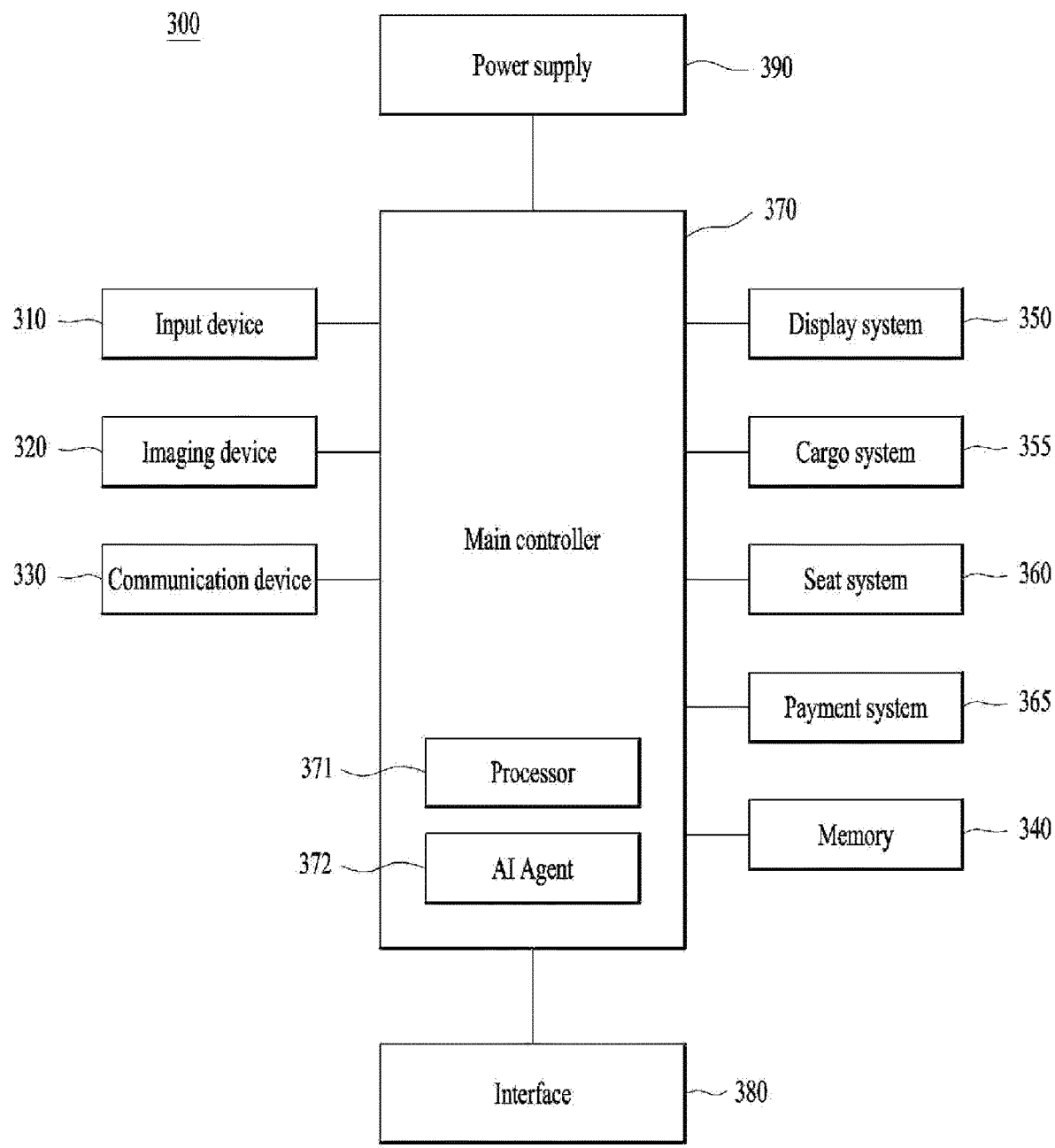
FIG. 6 is a block diagram referred to in description of a cabin system for the vehicle according to embodiment(s).

FIG. 6 is a block diagram referred to in description of a cabin system for a vehicle according to embodiment(s).

Referring to FIGS. 5 and 6, a cabin system 300 for a vehicle (hereinafter, a cabin system) may be defined as a convenience system for a user who uses the vehicle 10. The cabin system 300 may be explained as a high-end system including a display system 350, a cargo system 355, a seat system 360, and a payment system 365. The cabin system 300 may include a main controller 370, a memory 340, an interface 380, a power supply 390, an input device 310, an imaging device 320, a communication device 330, the display system 350, the cargo system 355, the seat system 360, and the payment system 365. According to embodiments, the cabin system 300 may further include components in addition to the components described in this specification or may not include some of the components described in this specification.

1) Main Controller

The main controller 370 may be electrically connected to the input device 310, the communication device 330, the display system 350, the cargo system 355, the seat system 360, and the payment system 365 and exchange signals with these components. The main controller 370 may control the input device 310, the communication device 330, the display system 350, the cargo system 355, the seat system 360, and the payment system 365. The main controller 370 may be implemented using at least one of application specific integrated circuits (ASICs), digital signal processors (DSPs), digital signal processing devices (DSPDs), programmable logic devices (PLDs), field programmable gate arrays (FP-GAs), processors, controllers, microcontrollers, microprocessors, or electronic units for executing other functions.

The main controller 370 may be configured as at least one sub-controller. The main controller 370 may include a plurality of sub-controllers according to an embodiment. Each of the sub-controllers may individually control grouped devices and systems included in the cabin system 300. The devices and systems included in the cabin system 300 may be grouped by functions or grouped based on seats on which a user may sit.

The main controller 370 may include at least one processor 371. Although FIG. 6 illustrates the main controller 370 including a single processor 371, the main controller 371 may include a plurality of processors. The processor 371 may be categorized as one of the above-described sub-controllers.

The processor 371 may receive signals, information, or data from a user terminal through the communication device 330. The user terminal may transmit signals, information, or data to the cabin system 300.

The processor 371 may identify a user based on image data received from at least one of an internal camera or an external camera included in the imaging device. The processor 371 may identify a user by applying an image processing algorithm to the image data. For example, the processor 371 may identify a user by comparing information received from the user terminal with the image data. For example, the information may include at least one of route information, body information, fellow passenger information, baggage information, position information, preferred content information, preferred food information, disability information, or use history information of a user.

The main controller 370 may include an artificial intelligence (AI) agent 372. The AI agent 372 may perform machine learning based on data acquired through the input device 310. The AI agent 371 may control at least one of the display system 350, the cargo system 355, the seat system 360, or the payment system 365 based on machine learning results.

2) Essential Components

The memory 340 is electrically connected to the main controller 370. The memory 340 may store basic data about units, control data for operation control of units, and input/output data. The memory 340 may store data processed in the main controller 370. Hardware-wise, the memory 340 may be configured using at least one of a ROM, a RAM, an EPROM, a flash drive, or a hard drive. The memory 340 may store various types of data for the overall operation of the cabin system 300, such as a program for processing or control of the main controller 370. The memory 340 may be integrated with the main controller 370.

The interface 380 may exchange signals with at least one electronic device included in the vehicle 10 by wire or wirelessly. The interface 380 may be configured using at least one of a communication module, a terminal, a pin, a cable, a port, a circuit, an element, or a device.

The power supply 390 may provide power to the cabin system 300. The power supply 390 may be provided with power from a power source (e.g., a battery) included in the vehicle 10 and supply the power to each unit of the cabin system 300. The power supply 390 may operate according to a control signal supplied from the main controller 370. For example, the power supply 390 may be implemented as a switched-mode power supply (SMPS).

The cabin system 300 may include at least one PCB. The main controller 370, the memory 340, the interface 380, and the power supply 390 may be mounted on at least one PCB.

3) Input Device

The input device 310 may receive user input. The input device 310 may convert the user input into an electrical signal. The electrical signal converted by the input device 310 may be converted into a control signal and provided to at least one of the display system 350, the cargo system 355, the seat system 360, or the payment system 365. The main controller 370 or at least one processor included in the cabin system 300 may generate a control signal based on the electrical signal received from the input device 310.

The input device 310 may include at least one of a touch input unit, a gesture input unit, a mechanical input unit, or a voice input unit. The touch input unit may convert a user's touch input into an electrical signal. The touch input unit may include at least one touch sensor for detecting a user's touch input. According to an embodiment, the touch input unit may realize a touchscreen through integration with at least one display included in the display system 350. Such a touchscreen may provide both an input interface and an output interface between the cabin system 300 and a user. The gesture input unit may convert a user's gesture input into an electrical signal. The gesture input unit may include at least one of an infrared sensor or an image sensor to sense a user's gesture input. According to an embodiment, the gesture input unit may detect a user's three-dimensional gesture input. To this end, the gesture input unit may include a plurality of light output units for outputting infrared light or a plurality of image sensors. The gesture input unit may detect a user's three-dimensional gesture input using TOF, structured light, or disparity. The mechanical input unit may convert a user's physical input (e.g., press or rotation) through a mechanical device into an electrical signal. The mechanical input unit may include at least one of a button, a dome switch, a jog wheel, or a jog switch. Meanwhile, the gesture input unit and the mechanical input unit may be integrated. For example, the input device 310 may include a jog dial device that includes a gesture sensor and is formed such that it may be inserted into/ejected from a part of a surrounding structure (e.g., at least one of a seat, an armrest, or a door). When the jog dial device is parallel to the surrounding structure, the jog dial device may serve as a gesture input unit. When the jog dial device is protruded from the surrounding structure, the jog dial device may serve as a mechanical input unit. The voice input unit may convert a user's voice input into an electrical signal. The voice input unit may include at least one microphone. The voice input unit may include a beam forming microphone.

4) Imaging Device

The imaging device 320 may include at least one camera. The imaging device 320 may include at least one of an internal camera or an external camera. The internal camera may capture an image of the inside of the cabin. The external camera may capture an image of the outside of the vehicle. The internal camera may acquire an image of the inside of the cabin. The imaging device 320 may include at least one internal camera. It is desirable that the imaging device 320 include as many cameras as the number of passengers who can be accommodated in the vehicle. The imaging device 320 may provide an image acquired by the internal camera. The main controller 370 or at least one processor included in the cabin system 300 may detect a motion of a user based on an image acquired by the internal camera, generate a signal based on the detected motion, and provide the signal to at least one of the display system 350, the cargo system 355, the seat system 360, or the payment system 365. The external camera may acquire an image of the outside of the vehicle. The imaging device 320 may include at least one external camera. It is desirable that the imaging device 320 include as many cameras as the number of doors through which passengers can enter the vehicle. The imaging device 320 may provide an image acquired by the external camera. The main controller 370 or at least one processor included in the cabin system 300 may acquire user information based on the image acquired by the external camera. The main controller 370 or at least one processor included in the cabin system 300 may authenticate a user or acquire body information (e.g., height information, weight information, etc.) of a user, fellow passenger information of a user, and baggage information of a user based on the user information.

5) Communication Device

The communication device 330 may wirelessly exchange signals with external devices. The communication device 330 may exchange signals with external devices through a network or directly exchange signals with external devices. External devices may include at least one of a server, a mobile terminal, or another vehicle. The communication device 330 may exchange signals with at least one user terminal. The communication device 330 may include an antenna and at least one of an RF circuit or an RF element which may implement at least one communication protocol in order to perform communication. According to an embodiment, the communication device 330 may use a plurality of communication protocols. The communication device 330 may switch communication protocols according to a distance to a mobile terminal.

For example, the communication device may exchange signals with external devices based on cellular V2X (C-V2X). For example, C-V2X may include LTE based sidelink communication and/or NR based sidelink communication. Details related to C-V2X will be described later.

For example, the communication device may exchange signals with external devices based on dedicated short range communications (DSRC) or wireless access in vehicular environment (WAVE) based on IEEE 802.11p PHY/MAC layer technology and IEEE 1609 network/transport layer technology. DSRC (or WAVE) is communication specification for providing an intelligent transport system (ITS) service through short-range dedicated communication between vehicle-mounted devices or between a roadside device and a vehicle-mounted device. DSRC may be a communication scheme that may use a frequency of 5.9 GHz and have a data transfer rate in the range of 3 Mbps to 27 Mbps. IEEE 802.11p may be combined with IEEE 1609 to support DSRC (or WAVE).

The communication device of embodiment(s) may exchange signals with external devices using only one of C-V2X and DSRC. Alternatively, the communication device of embodiment(s) may exchange signals with external devices using a hybrid of C-V2X and DSRC.

6) Display System

The display system 350 may display graphical objects. The display system 350 may include at least one display device. For example, the display system 350 may include a first display device 410 for common use and a second display device 420 for individual use.

6.1) Display Device for Common Use

The first display device 410 may include at least one display 411 which outputs visual content. The display 411 included in the first display device 410 may be realized by at least one of a flat panel display, a curved display, a rollable display, or a flexible display. For example, the first display device 410 may include a first display 411 which is positioned behind a seat and formed to be inserted/ejected into/from the cabin, and a first mechanism for moving the first display 411. The first display 411 may be disposed so as to be inserted into/ejected from a slot formed in a seat main frame. According to an embodiment, the first display device 410 may further include a flexible area control mechanism. The first display may be formed to be flexible and a flexible area of the first display may be controlled according to user position. For example, the first display device 410 may be disposed on the ceiling inside the cabin and include a second display formed to be rollable and a second mechanism for rolling or unrolling the second display. The second display may be formed such that images may be displayed on both sides thereof. For example, the first display device 410 may be disposed on the ceiling inside the cabin and include a third display formed to be flexible and a third mechanism for bending or unbending the third display. According to an embodiment, the display system 350 may further include at least one processor which provides a control signal to at least one of the first display device 410 or the second display device 420. The processor included in the display system 350 may generate a control signal based on a signal received from at least one of the main controller 370, the input device 310, the imaging device 320, or the communication device 330.

A display area of a display included in the first display device 410 may be divided into a first area 411a and a second area 411b. The first area 411a may be defined as a content display area. For example, the first area 411 may display at least one of graphical objects corresponding to entertainment content (e.g., movies, sports, shopping, music, etc.), video conferences, food menus, or augmented reality screens. The first area 411a may display graphical objects corresponding to traveling situation information of the vehicle 10. The traveling situation information may include at least one of object information outside the vehicle, navigation information, or vehicle state information. The object information outside the vehicle may include information about presence or absence of an object, positional information of the object, information about a distance between the vehicle and the object, and information about a relative speed of the vehicle with respect to the object. The navigation information may include at least one of map information, information about a set destination, route information according to setting of the destination, information about various objects on a route, lane information, or information about the current position of the vehicle. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle indoor temperature information, vehicle indoor humidity information, pedal position information, vehicle engine temperature information, etc. The second area 411b may be defined as a user interface area. For example, the second area 411b may display an AI agent screen. The second area 411b may be located in an area defined by a seat frame according to an embodiment. In this case, a user may view content displayed in the second area 411b between seats. The first display device 410 may provide hologram content according to an embodiment. For example, the first display device 410 may provide hologram content for each of a plurality of users such that only a user who requests the content may view the content.

6.2) Display Device for Individual Use

The second display device 420 may include at least one display 421. The second display device 420 may provide the display 421 at a position at which only an individual passenger may view display content. For example, the display 421 may be disposed on an armrest of a seat. The second display device 420 may display graphic objects corresponding to personal information of a user. The second display device 420 may include as many displays 421 as the number of passengers who may ride in the vehicle. The second display device 420 may realize a touchscreen by forming a layered structure along with a touch sensor or being integrated with the touch sensor. The second display device 420 may display graphical objects for receiving user input for seat adjustment or indoor temperature adjustment.

7) Cargo System

The cargo system 355 may provide items to a user at the request of the user. The cargo system 355 may operate based on an electrical signal generated by the input device 310 or the communication device 330. The cargo system 355 may include a cargo box. The cargo box may be hidden, with items being loaded in a part under a seat. When an electrical signal based on user input is received, the cargo box may be exposed to the cabin. The user may select a necessary item from articles loaded in the cargo box. The cargo system 355 may include a sliding moving mechanism and an item pop-up mechanism in order to expose the cargo box according to user input. The cargo system 355 may include a plurality of cargo boxes in order to provide various types of items. A weight sensor for determining whether each item is provided may be embedded in the cargo box.

8) Seat System

The seat system 360 may provide a user customized seat to a user. The seat system 360 may operate based on an electrical signal generated by the input device 310 or the communication device 330. The seat system 360 may adjust at least one element of a seat based on acquired user body data. The seat system 360 may include a user detection sensor (e.g., a pressure sensor) for determining whether a user sits on a seat. The seat system 360 may include a plurality of seats on which a plurality of users may sit. One of the plurality of seats may be disposed to face at least one other seat. At least two users may set facing each other inside the cabin.

9) Payment System

The payment system 365 may provide a payment service to a user. The payment system 365 may operate based on an electrical signal generated by the input device 310 or the communication device 330. The payment system 365 may calculate a price for at least one service used by the user and request the user to pay the calculated price.

3. C-V2X

A wireless communication system is a multiple access system that supports communication with multiple users by sharing available system resources (for example, bandwidth, transmit power, or the like). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, a multi-carrier frequency division multiple access (MC-FDMA) system and the like.

Sidelink refers to a communication method of establishing a direct link between user equipments (UEs) and directly exchanging voice, data, or the like between terminals without passing through a base station (BS). The sidelink is considered as one way to solve a burden of the BS due to rapidly increasing data traffic.

Vehicle-to-everything (V2X) refers to a communication technology that exchanges information with other vehicles, pedestrians, things for which infrastructure is built, and the like through wired/wireless communication. The V2X may be classified into four types such as vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

Meanwhile, as more communication devices require larger communication capacities, there is a need for improved mobile broadband communication as compared to existing radio access technology (RAT). Accordingly, a communication system considering a service or a terminal that is sensitive to reliability and latency is being discussed. Next-generation radio access technologies that consider improved mobile broadband communication, massive MTC, ultra-reliable and low-latency communication (URLLC), and the like may be referred to as new RAT or new radio (NR). Vehicle-to-everything (V2X) communication may be supported even in NR The following technologies may be used for various wireless communication systems such as code division multiple access (CDMA), frequency division multiple access (FDMA), time division multiple access (TDMA), orthogonal frequency division multiple access (OFDMA), and single carrier frequency division multiple access (SC-FDMA). CDMA may be implemented by wireless technologies such as universal terrestrial radio access (UTRA) and CDMA2000. TDMA may be implemented by wireless technologies such as global system for mobile communications (GSM)/general packet radio service (GPRS)/enhanced data rates for GSM evolution (EDGE). OFDMA may be implemented by wireless technologies such as institute of electrical and electronics engineers (IEEE) 802.11 (Wi-Fi), IEEE 802.16 (WiMAX), IEEE 802-20, and evolved UTRA (E-UTRA). IEEE 802.16m is an evolution of IEEE 802.16e and provides backward compatibility with systems based on IEEE 802.16e. UTRA is part of a universal mobile telecommunications system (UMTS). 3rd generation partnership project (3GPP) long term evolution (LTE) is part of evolved UMTS (E-UMTS) using evolved-UMTS terrestrial radio access (E-UTRA), and employs OFDMA on downlink and SC-FDMA on uplink. LTE-advanced (LTE-A) is an evolution of 3GPP LTE.

5G NR is a successor technology to LTE-A, and is a new clean-slate type mobile communication system having characteristics such as high performance, low latency, and high availability. 5G NR may take advantage of all available spectral resources such as a low frequency band below 1 GHz, an intermediate frequency band from 1 GHz to 10 GHz, and a high frequency (millimeter wave) band above 24 GHz.

For clarity of description, the following description focuses on LTE-A or 5G NR, but the technical idea of embodiment(s) is not limited thereto.

Figure 7:
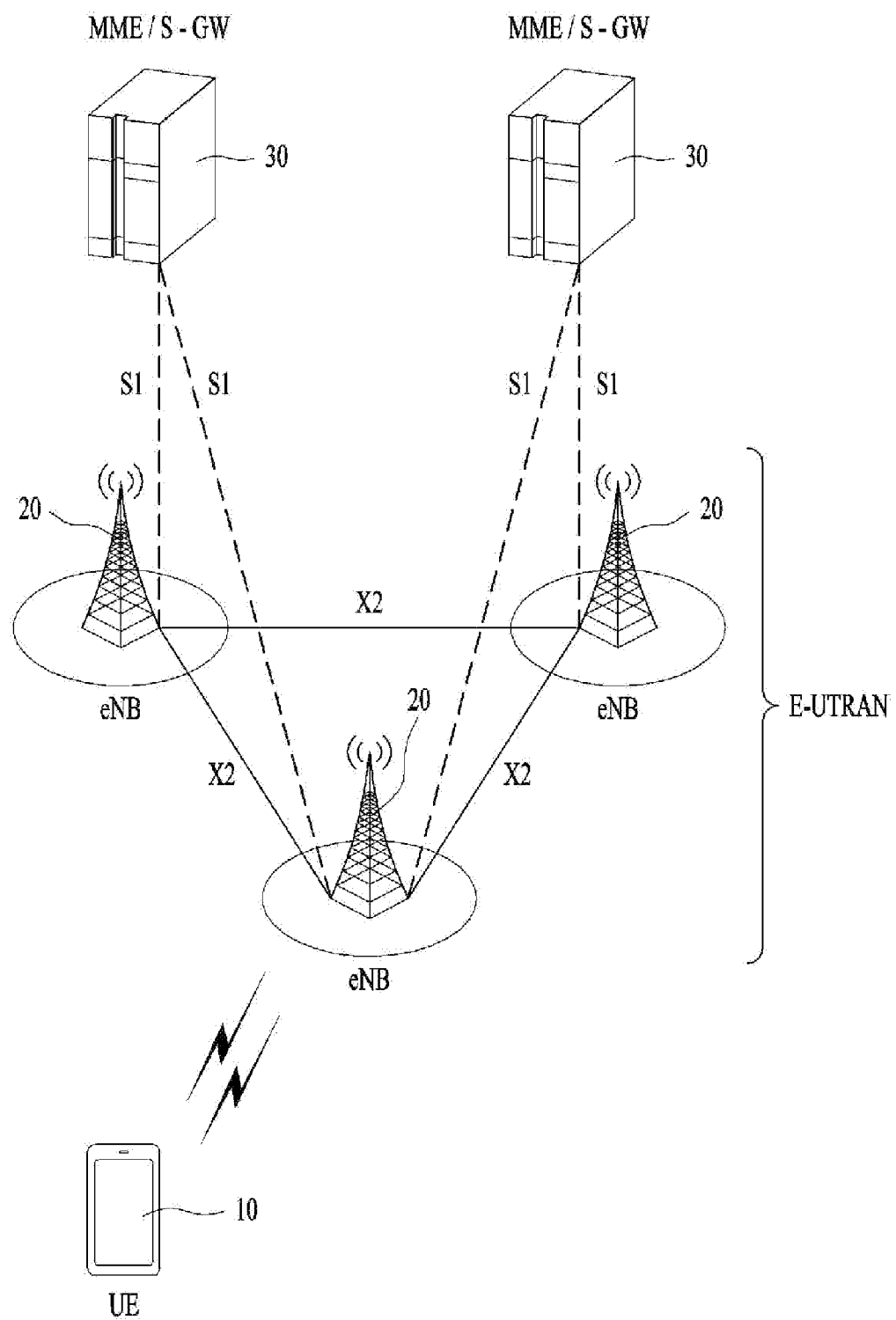
FIG. 7 illustrates the structure of an LTE system to which embodiment(s) are applicable.

FIG. 7 illustrates the structure of an LTE system to which embodiment(s) are applicable. This system may be referred to as an evolved-UMTS terrestrial radio access network (E-UTRAN) or long-term evolution (LTE)/LTE-advanced (LTE-A) system.

Referring to FIG. 7, the E-UTRAN includes a base station 20 that provides a control plane and a user plan to a user equipment (UE) 10. The UE 10 may be fixed or mobile. The UE 10 may be referred to by another term, such as a mobile station (MS), a user terminal (UT), a subscriber station (SS), a mobile terminal (MT), a wireless device, etc. The BS 20 refers to a fixed station that communicates with the UE 10. The BS 20 may be referred to by another term, such as an evolved-NodeB (eNB), a base transceiver system (BTS), an access point, etc.

BSs 20 may be connected to each other through an X2 interface. The BS 20 is connected to an evolved packet core (EPC) 30 through an S1 interface, more specifically, to a mobility management entity (MME) through S1-MME and to a serving gateway (S-GW) through S1-U.

The EPC 30 includes the MME, the S-GW, and a packet data network (PDN) gateway (P-GW). The MME has access information of the UE or capability information of the UE, and such information is generally used for mobility management of the UE. The S-GW is a gateway having the E-UTRAN as an end point. The P-GW is a gateway having the PDN as an end point.

Layers of a radio interface protocol between the UE and the network may be classified into a first layer (L1), a second layer (L2), and a third layer (L3) based on the lower three layers of the open system interconnection (OSI) reference model that is well-known in a communication system. Thereamong, a physical layer belonging to the first layer provides an information transfer service using a physical channel, and a radio resource control (RRC) layer belonging to the third layer serves to control a radio resource between the UE and the network. For this, the RRC layer exchanges an RRC message between the UE and the BS.

Figure 8:
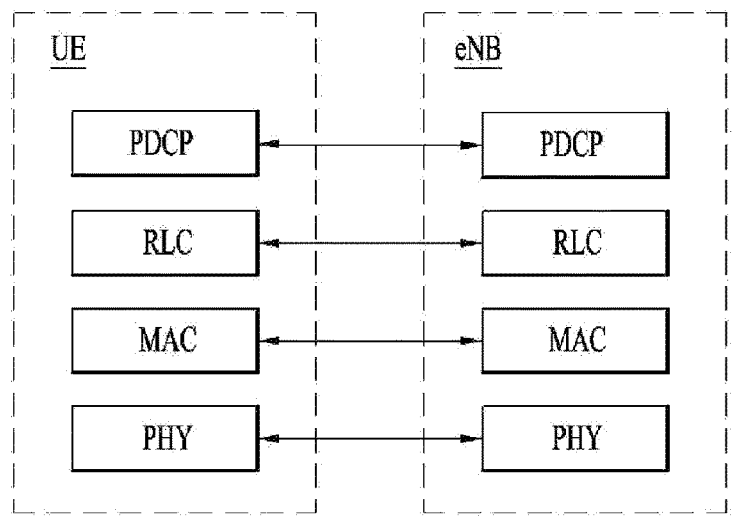
FIG. 8 illustrates a radio protocol architecture for a user plane to which embodiment(s) are applicable.

FIG. 8 illustrates a radio protocol architecture for a user plane to which embodiment(s) are applicable.

Figure 9:
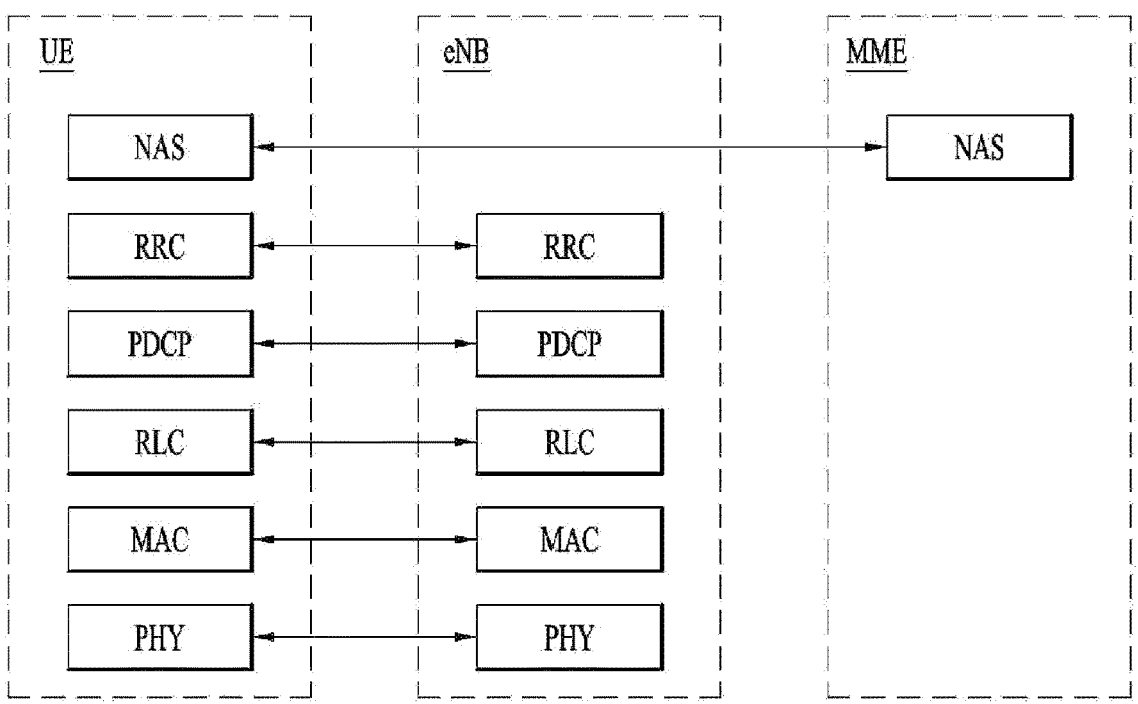
FIG. 9 illustrates a radio protocol architecture for a control plane to which embodiment(s) are applicable.

FIG. 9 illustrates a radio protocol architecture for a control plane to which embodiment(s) are applicable. The user plane is a protocol stack for user data transmission. The control plane is a protocol stack for control signal transmission.

Referring to FIGS. 8 and 9, a physical layer provides an upper layer with an information transfer service through a physical channel. The physical layer is connected to a media access control (MAC) layer, which is an upper layer of the physical layer, through a transport channel. Data is transferred between the MAC layer and the physical layer through the transport channel. The transport channel is classified according to how and with which characteristics data is transferred through a radio interface.

Data is moved between different physical layers, i.e., between the physical layers of a transmitter and a receiver, through a physical channel. The physical channel may be modulated according to an orthogonal frequency division multiplexing (OFDM) scheme and use time and frequency as radio resources.

The MAC layer provides a service to a radio link control (RLC) layer, which is an upper layer, through a logical channel. The MAC layer provides a mapping function from a plurality of logical channels to a plurality of transport channels. The MAC layer also provides a logical channel multiplexing function caused by mapping from a plurality of logical channels to a single transport channel A MAC sublayer provides data transfer services on logical channels.

The RLC layer performs concatenation, segmentation, and reassembly of an RLC service data unit (SDU). In order to guarantee various types of quality of service (QoS) required by a radio bearer (RB), the RLC layer provides three operation modes: transparent mode (TM), unacknowledged mode (UM), and acknowledged mode (AM). AM RLC provides error correction through an automatic repeat request (ARQ).

The RRC layer is defined only in the control plane. The RRC layer is related to the configuration, reconfiguration, and release of RBs to serve to control logical channels, transport channels, and physical channels. The RB means a logical path provided by the first layer (physical layer) and the second layer (MAC layer, RLC layer, or PDCP layer) in order to transfer data between a UE and a network.

A function of a packet data convergence protocol (PDCP) layer in the user plane includes transfer, header compression, and ciphering of user data. A function of the PDCP layer in the control plane includes transfer and encryption/integrity protection of control plane data.

The configuration of the RB means a process of defining the characteristics of a radio protocol layer and channels in order to provide specific service and configuring each detailed parameter and operating method. The RB may be divided into two types of a signaling RB (SRB) and a data RB (DRB). The SRB is used as a passage through which an RRC message is transported in the control plane, and the DRB is used as a passage through which user data is transported in the user plane.

If RRC connection is established between the RRC layer of UE and the RRC layer of the E-UTRAN, the UE is in an RRC connected (RRC_CONNECTED) state and if not, the UE is in an RRC idle (RRC_IDLE) state. In NR, an RRC inactive (RRC_INACTIVE) state has been further defined. The UE of RRC_INACTIVE state may release connection to the BS while maintaining connection to a core network.

A downlink transport channel through which data is transmitted from the network to the UE includes a broadcast channel (BCH) through which system information is transmitted and a downlink shared channel (SCH) through which user traffic or control messages are transmitted. Traffic or a control message for a downlink multicast or broadcast service may be transmitted through the downlink SCH or may be transmitted through a separate downlink multicast channel (MCH). Meanwhile, an uplink transport channel through which data is transmitted from the UE to the network includes a random access channel (RACH) through which an initial control message is transmitted and an uplink shared channel (SCH) through which user traffic or a control message is transmitted.

Logical channels that are placed over the transport channel and mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. A resource block is a resources allocation unit and includes a plurality of OFDM symbols and a plurality of subcarriers. Each subframe may use specific subcarriers of specific OFDM symbols (e.g., the first OFDM symbol) of a corresponding subframe for a physical downlink control channel (PDCCH), that is, an L1/L2 control channel A transmission time interval (TTI) is a unit time for subframe transmission.

Figure 10:
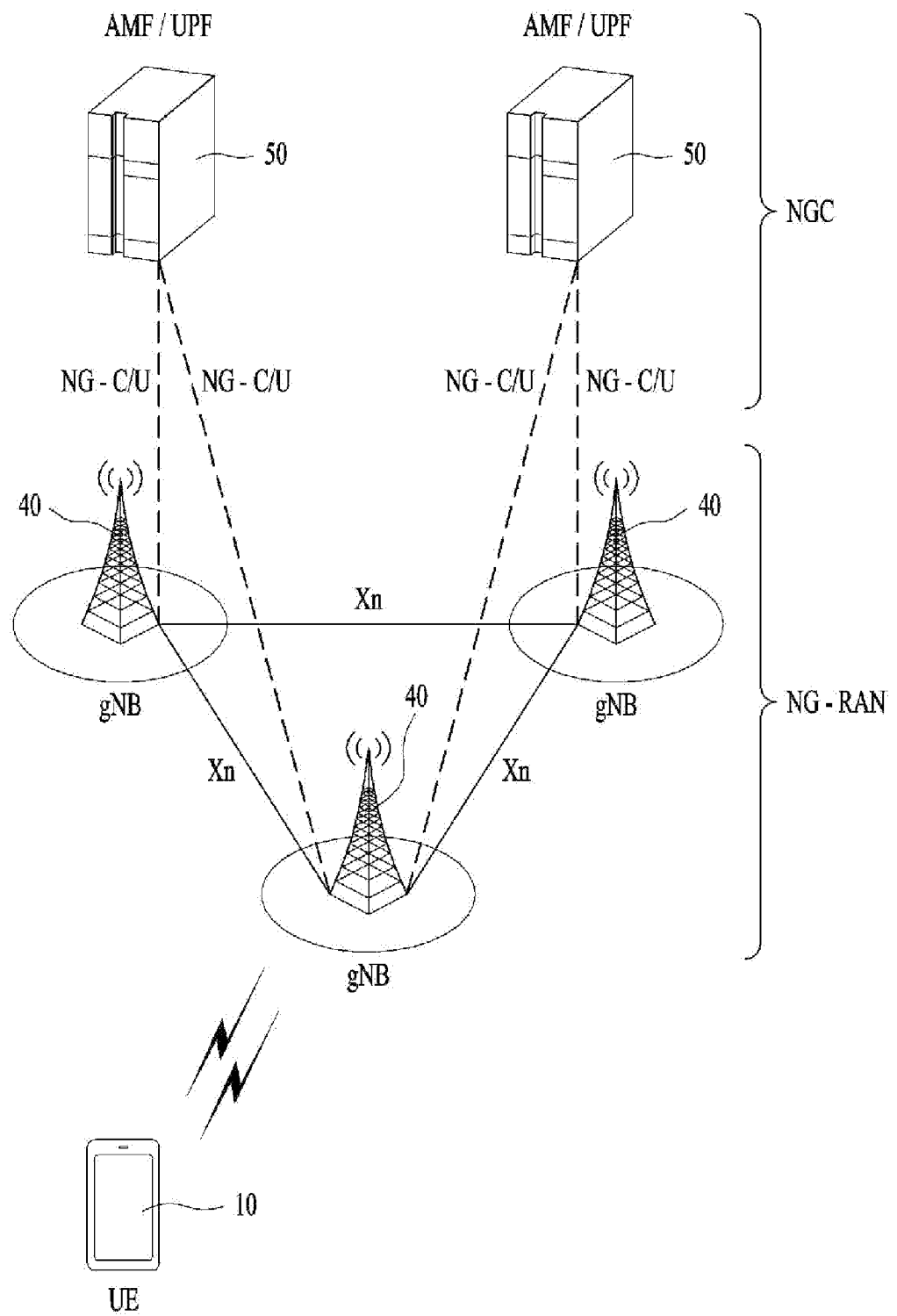
FIG. 10 illustrates the structure of an NR system to which embodiment(s) are applicable.

FIG. 10 illustrates the structure of an NR system to which embodiment(s) are applicable.

Referring to FIG. 10, a next generation radio access network (NG-RAN) may include a gNB and/or an eNB that provides user plane and control plane protocol terminations to a UE. FIG. 10 illustrates the case of including only gNBs. The gNB and the eNB are connected through an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 11:
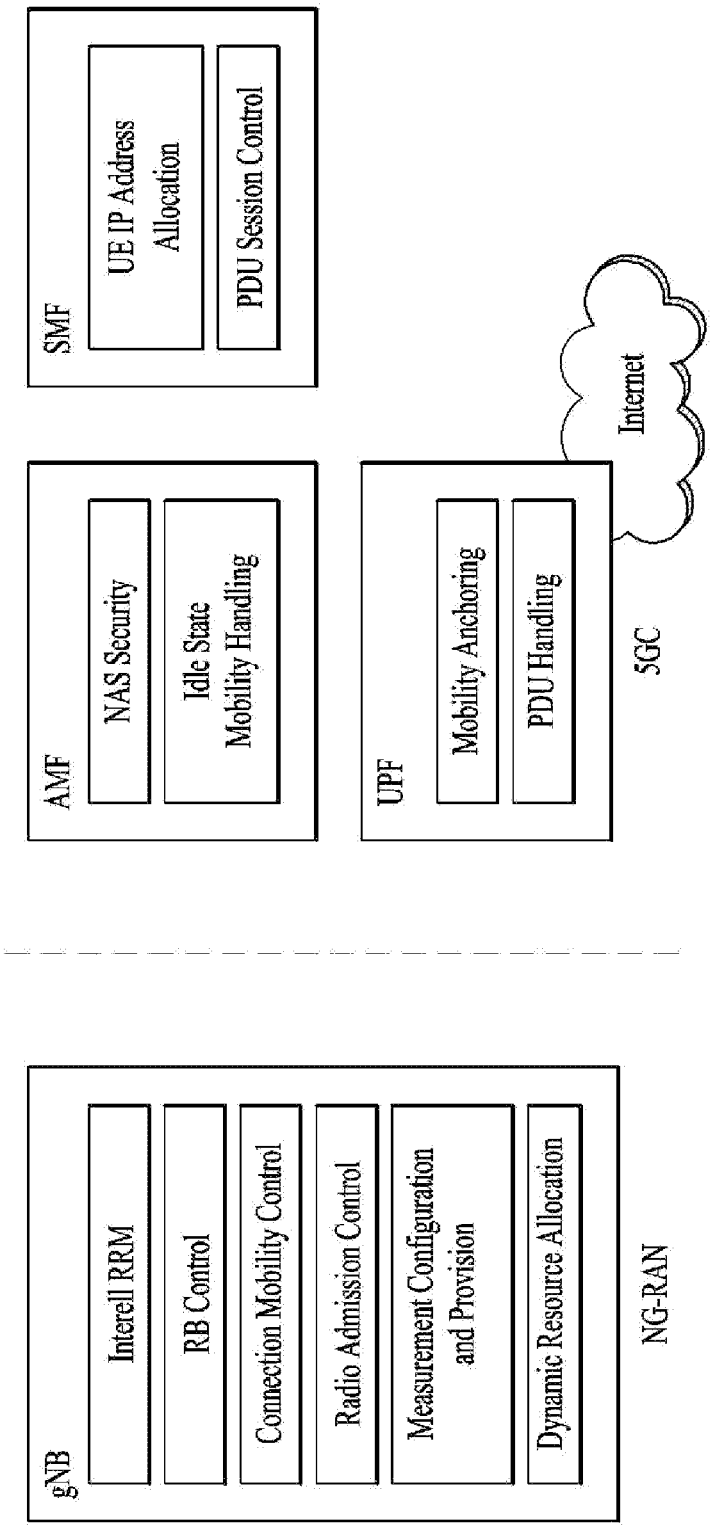
FIG. 11 illustrates functional split between an NG-RAN and a 5GC to which embodiment(s) are applicable.

FIG. 11 illustrates functional split between an NG-RAN and a 5GC to which embodiment(s) are applicable.

Referring to FIG. 11, a gNB may provide functions, such as intercell radio resource management (RRM), RB control, connection mobility control, radio admission control, measurement configuration and provision, dynamic resource allocation, etc. An AMF may provide functions, such as NAS security, idle state mobility handling, etc. A UPF may provide functions, such as mobility anchoring, protocol data unit (PDU) handling, etc. A session management function (SMF) may provide functions, such as UE IP address allocation, PDU session control.

Figure 12:
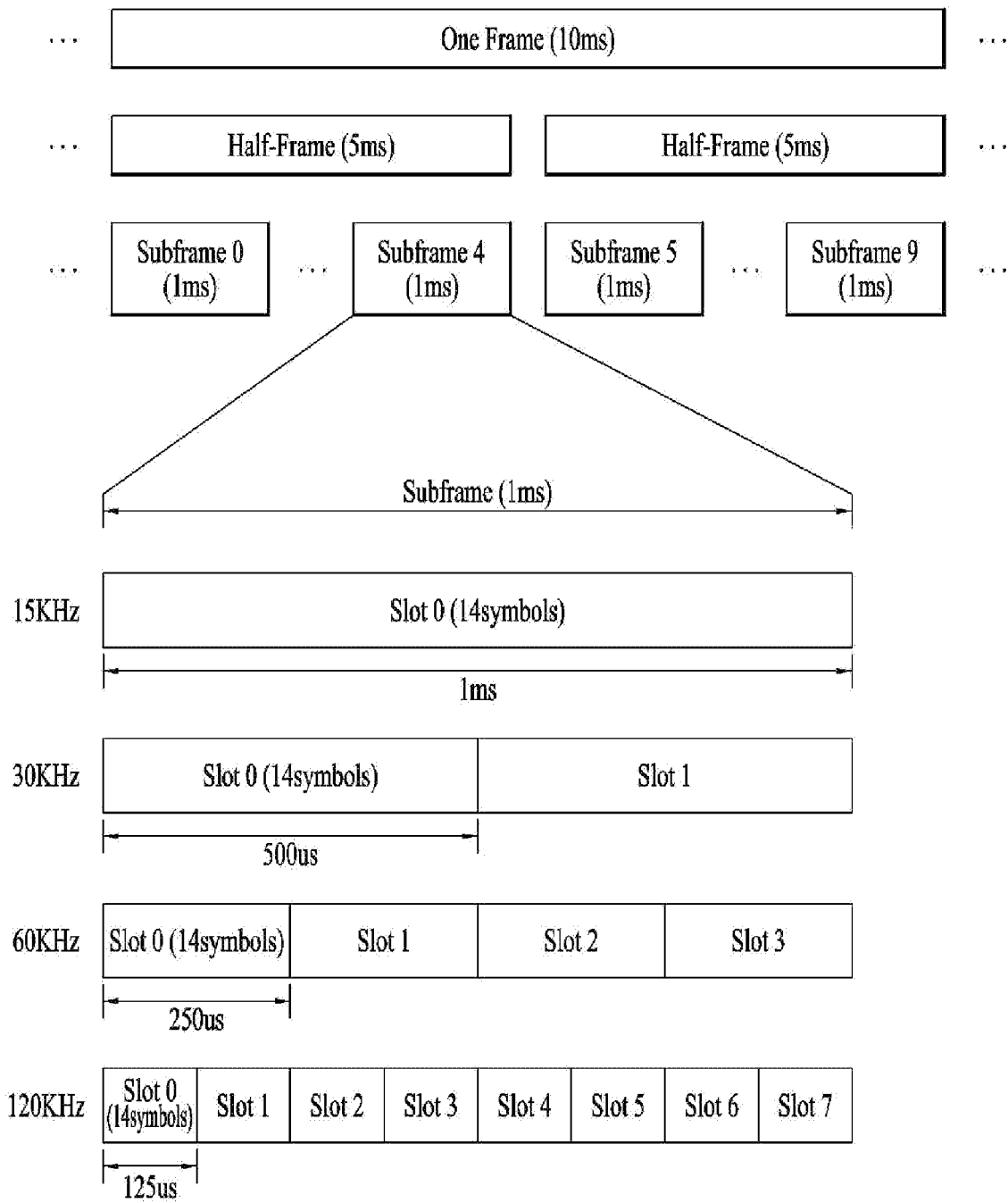
FIG. 12 illustrates the structure of an NR radio frame to which embodiment(s) are applicable.

FIG. 12 illustrates the structure of an NR radio frame to which embodiment(s) are applicable.

Referring to FIG. 12, a radio frame may be used for uplink and downlink transmission in NR. The radio frame is 10 ms long and may be defined as two half-frames (HFs), each 5 ms long. An HF may include 5 subframes (SFs), each 1 ms long. An SF may be split into one or more slots. The number of slots in the SF may be determined based on a subcarrier spacing (SCS). Each slot may include 12 or 14 OFDM(A) symbols depending on a cyclic prefix (CP).

When a normal CP is used, each slot may include 14 symbols. When an extended CP is used, each slot may include 12 symbols. Here, a symbol may include an OFDM symbol (or CP-OFDM symbol) or an SC-FDMA symbol (or DFT-s-OFDM symbol).

Table 1 below shows the number of symbols, $N^{slot}_{symb}$, per slot, the number of slots, $N^{frame,\mu}_{slot}$, per frame, and the number of slots, $N^{subframe,\mu}_{slot}$, per subframe according to SCS configuration $\mu$ when the normal CP is used.

TABLE 1

| SCS (15*2u) | $N^{slot}_{symb}$ | $N^{frame, \mu}_{slot}$ | $N^{subframe, \mu}_{slot}$ |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows the number of symbols per slot, the number of slots per frame, and the number of slots per subframe according to SCS when the extended CP is used.

TABLE 2

| SCS (15*2^u) | $N^{slot}_{symb}$ | $N^{frame, \mu}_{slot}$ | $N^{subframe, \mu}_{slot}$ |
| --- | --- | --- | --- |
| 60 KHz (u = 2) | 12 | 40 | 4 |

In an NR system, different OFDM(A) numerologies (e.g., SCSs and CP lengths) may be configured in a plurality of cells aggregated for one UE. Then, an (absolute time) duration of a time resource (e.g., a subframe, a slot, or a TTI) consisting of the same number of symbols (for convenience, referred to as a time unit (TU)) may be differently configured in the aggregated cells.

Figure 13:
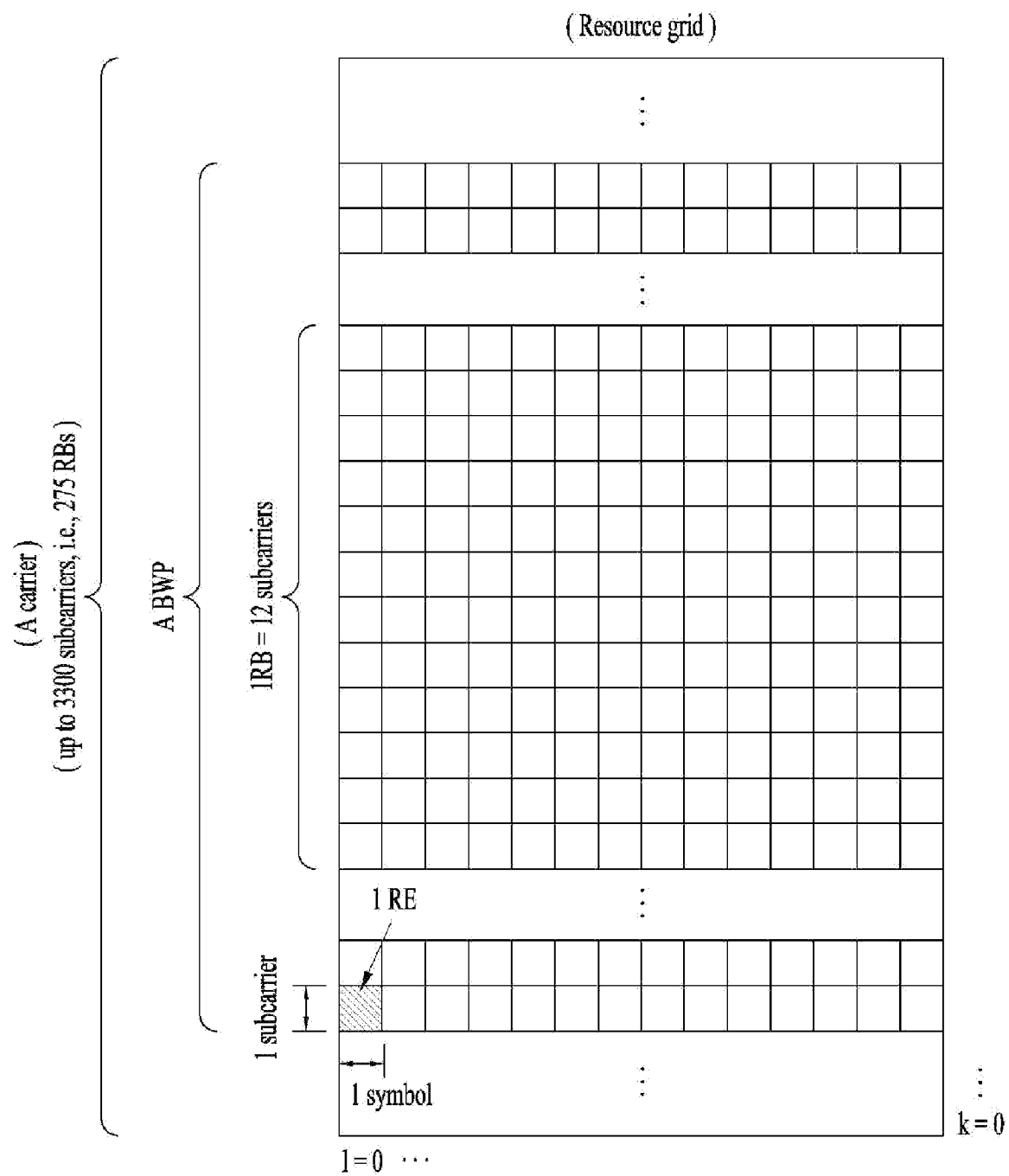
FIG. 13 illustrates the structure of a slot of an NR frame to which embodiment(s) are applicable.

FIG. 13 illustrates the structure of a slot of an NR frame to which embodiment(s) are applicable.

Referring to FIG. 13, a slot includes a plurality of symbols in the time domain. For example, one slot may include 14 symbols in the case of a normal CP and 12 symbols in the case of an extended CP. Alternatively, one slot may include 7 symbols in the case of the normal CP and 6 symbols in the case of the extended CP.

A carrier includes a plurality of subcarriers in the frequency domain. A resource block (RB) may be defined as a plurality of consecutive subcarriers (e.g., 12 subcarriers) in the frequency domain. A bandwidth part (BWP) may be defined as a plurality of consecutive (P)RBs in the frequency domain and correspond to one numerology (e.g., SCS or CP length). The carrier may include a maximum of N (e.g., 5) BWPs. Data communication may be performed through activated BWPs. Each element may be referred to as a resource element (RS) in a resource grid and one complex symbol may be mapped thereto.

Figure 14:
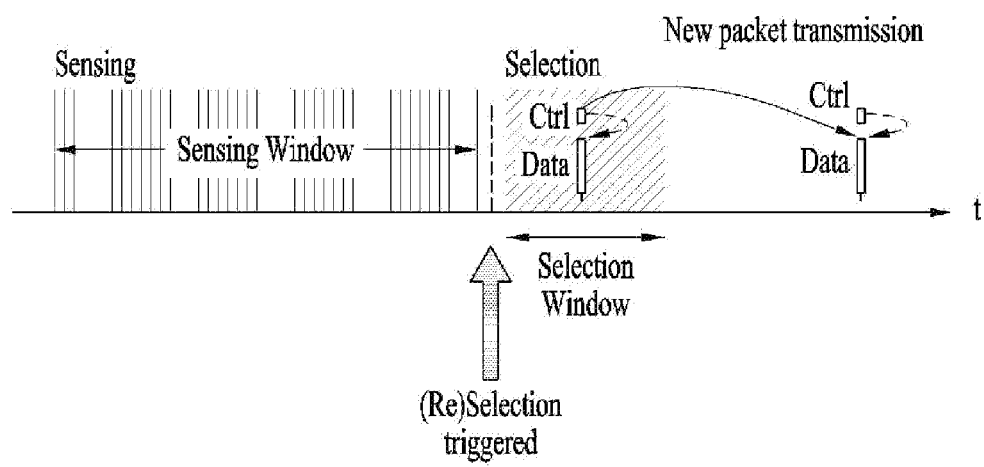
FIG. 14 illustrates an example of selecting a transmission resource to which embodiments(s) are applicable.

As illustrated in FIG. 14, a scheme of reserving a transmission resource of a subsequent packet may be used for transmission resource selection.

FIG. 14 illustrates an example of selecting a transmission resource to which embodiments(s) are applicable.

In V2X communication, two transmissions may be performed per MAC PDU. For example, referring to FIG. 14, during resource selection for initial transmission, a resource for retransmission may be reserved with a predetermined time gap. A UE may discern transmission resources reserved by other UEs or resources that are being used by other UEs through sensing within a sensing window and randomly select a resource having less interference from among resources that remain after excluding the resources that are reserved or being used by other UEs within a selection window.

For example, the UE may decode a physical sidelink control channel (PSCCH) including information about periodicity of the reserved resources within the sensing window and measure physical sidelink shared channel (PSSCH) reference signal received power (RSRP) on periodically determined resources based on the PSCCH. The UE may exclude resources on which PSSCH RSRP exceeds a threshold from resources that are selectable in the selection window. Next, the UE may randomly select a sidelink resource from among resources that remain within the selection window.

Alternatively, the UE may measure a received signal strength indicator (RSSI) of periodic resources within the sensing window to determine resources having less interference (e.g., resources having low interference corresponding to 20% or less). Then, the UE may randomly select a sidelink resource from resources included in the selection window among the periodic resources. For example, upon failing to decode the PSCCH, the UE may use this method.

FIG. 15 illustrates an example of transmitting a PSCCH in sidelink transmission mode 3 or 4 to which embodiment(s) are applicable.

In V2X communication, i.e., in sidelink transmission mode 3 or 4, a PSCCH and a PSSCH are transmitted through frequency division multiplexing (FDM) as opposed to sidelink communication. In V2X communication, since it is important to reduce latency in consideration of characteristics of vehicle communication, the PSCCH and the PSSCH may be transmitted through FDM on different frequency resources of the same time resource in order to reduce latency. Referring to FIG. 15, the PSCCH and the PSSCH may be non-adjacent as illustrated in (a) of FIG. 15 or may be adjacent as illustrated in (b) of FIG. 15. A basic unit of such transmission is a subchannel. The subchannel may be a resource unit having one or more RBs in size on the frequency axis on a predetermined time resource (e.g., time resource unit). The number of RBs included in the subchannel (i.e., the size of the subchannel and a start position of the subchannel on the frequency axis) may be indicated through higher layer signaling. An embodiment of FIG. 15 may also be applied to NR sidelink resource allocation mode 1 or 2.

Hereinafter, a cooperative awareness message (CAM) and a decentralized environmental notification message (DENM) will be described.

In V2V communication, a CAM of a periodic message type and a DENM of an event triggered message type may be transmitted. The CAM may include basic vehicle information, including vehicle dynamic state information such as direction and speed, vehicle static data such as dimension, an external light state, and a path history. The size of the CAM may be 50 to 300 bytes. The CAM may be broadcast and latency should be less than 100 ms. The DENM may be a message generated during an unexpected situation such as breakdown or accident of a vehicle. The size of the DENM may be shorter than 3000 bytes and all vehicles in the range of message transmission may receive the DENM. The DENM may have a higher priority than the CAM.

Hereinafter, carrier reselection will be described.

Carrier reselection for V2X/sidelink communication may be performed in a MAC layer based on a channel busy ratio (CBR) of configured carriers and a ProSe-per-packet priority (PPPP) of a V2X message to be transmitted.

The CBR may mean the portion of subchannels in a resource pool, sidelink RSSI (S-RSSI) of which measured by a UE is sensed as exceeding a preset threshold. There may be PPPP related to each logical channel. The value of PPPP should be set in consideration of latency required by both a UE and a BS. During carrier reselection, the UE may select one or more carriers from among candidate carriers in ascending order from the lowest CBR.

Hereinafter, physical layer processing will be described.

A data unit to which embodiment(s) are applicable may be a target of physical layer processing in a transmitting side before the data unit is transmitted through a radio interface. A radio signal carrying the data unit to which embodiment(s) are applicable may be a target of physical layer processing at a receiving side.

Figure 16:
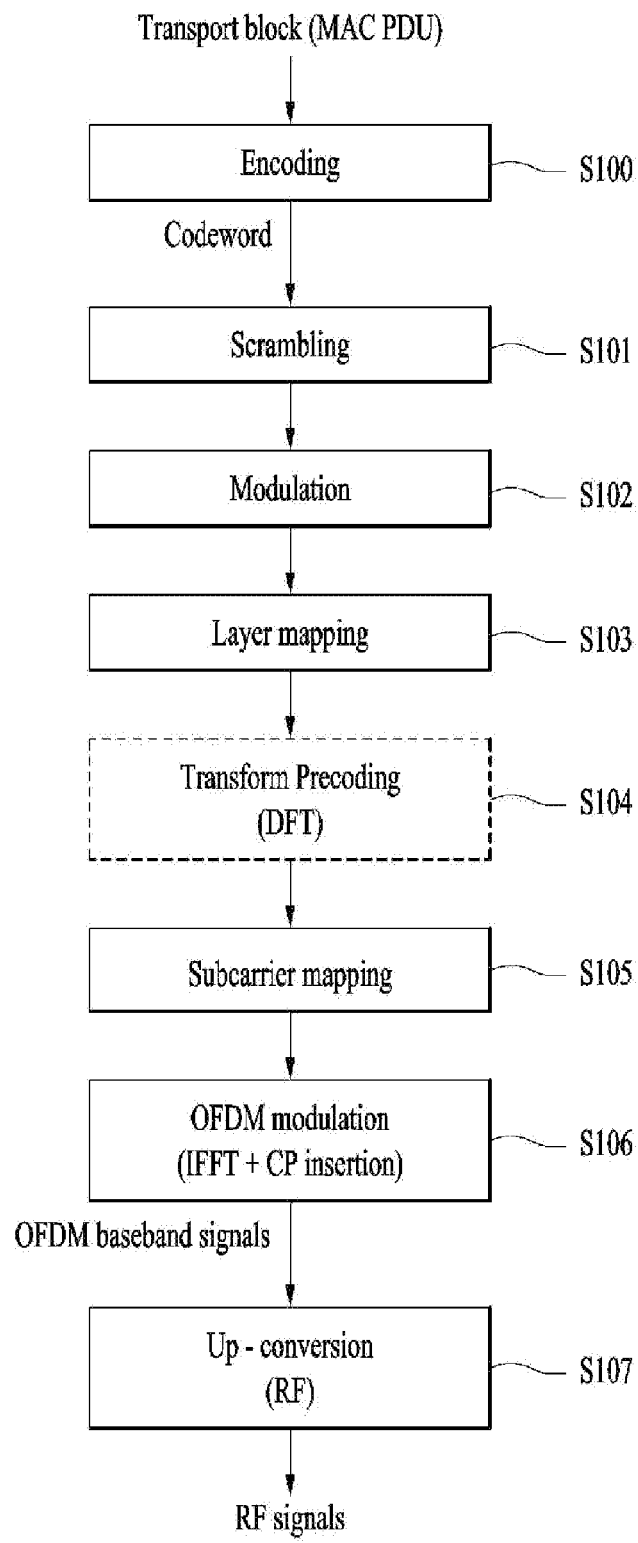
FIG. 16 illustrates an example of physical processing at a transmitting side to which embodiment(s) are applicable.

FIG. 16 illustrates an example of physical processing at a transmitting side to which embodiment(s) are applicable.

Table 3 shows a mapping relationship between an uplink transport channel and a physical channel and Table 4 shows a mapping relationship between uplink control channel information and a physical channel

TABLE 3

| Transport Channel | Physical Channel |
|---|---|
| UL-SCH | PUSCH |
| RACH | PRACH |

TABLE 4

| Control Information | Physical Channel |
|---|---|
| UCI | PUCCH, PUSCH |

Table 5 shows a mapping relationship between a downlink transport channel and a physical channel and Table 6 shows a mapping relationship between downlink control channel information and a physical channel

TABLE 5

| Transport Channel | Physical Channel |
|---|---|
| DL-SCH | PDSCH |
| BCH | PBCH |
| PCH | PDSCH |

TABLE 6

| Control Information | Physical Channel |
|---|---|
| DCI | PDCCH |

Table 7 shows a mapping relationship between a sidelink transport channel and a physical channel and Table 8 shows a mapping relationship between sidelink control channel information and a physical channel

TABLE 7

| Transport Channel | Physical Channel |
|---|---|
| SL-SCH | PSSCH |
| SL-BCH | PSBCH |

TABLE 8

| Control Information | Physical Channel |
|---|---|
| SCI | PSCCH |

Figure 17:
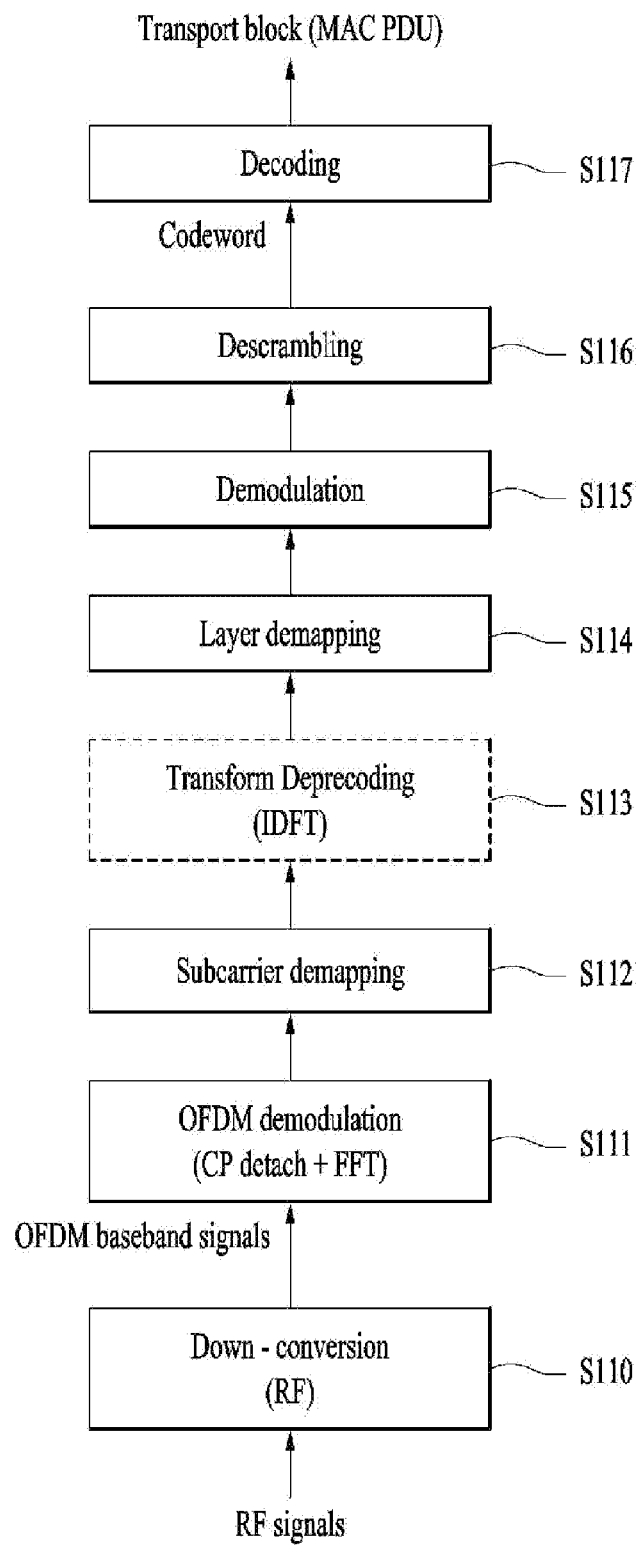
FIG. 17 illustrates an example of physical layer processing at a receiving side to which embodiment(s) are applicable.

Referring to FIG. 17, the transmitting side may perform encoding on a transport block (TB) in step S100. Data and a control stream from a MAC layer may be encoded to provide transport and control services through a radio transmission link in a physical layer. For example, the TB from the MAC layer may be encoded to a codeword at the transmitting side. A channel coding scheme may be a combination of error detection, error correction, rate matching, interleaving, and control information or a transport channel separated from the physical channel. Alternatively, the channel coding scheme may be a combination of error detection, error correction, rate matching, interleaving, and control information or a transport channel mapped to the physical channel.

In an NR LTE system, the following channel coding scheme may be used for different types of transport channels and different types of control information. For example, the channel coding scheme for each transport channel type may be listed in Table 9. For example, the channel coding scheme for each control information type may be listed in Table 10.

TABLE 9

| Transport Channel | Channel Coding Scheme |
|---|---|
| UL-SCH | LDPC |
| DL-SCH | (Low Density |
| SL-SCH | Parity Check) |
| PCH | |
| BCH | Polar code |
| SL-BCH | |

TABLE 10

| Control Information | Channel Coding Scheme |
|---|---|
| DCI | Polar code |
| SCI | |
| UCI | Block code, Polar code |

For transmission of the TB (e.g., MAC PDU), the transmitting side may attach a cyclic redundancy check (CRC) sequence to the TB. Therefore, the transmitting side may provide error detection to the receiving side. In sidelink communication, the transmitting side may be a transmitting UE and the receiving side may be a receiving UE. In the NR system, a communication device may use an LDPC code to encode/decode an uplink (UL)-SCH and a downlink (DL)-SCH. The NR system may support two LDPC base graphs (i.e., two LDPC base matrices). The two LDPC base graphs may be LDPC base graph 1 optimized for a small TB and LDPC base graph 2 optimized for a large TB. The transmitting side may select LDPC base graph 1 or 2 based on the size of the TB and a code rate R. The code rate may be indicated by a modulation and coding scheme (MCS) index I_MCS. The MCS index may be dynamically provided to the UE by a PDCCH that schedules a PUSCH or a PDSCH. Alternatively, the MCS index may be dynamically provided to the UE by a PDCCH that (re)initializes or activates UL configured grant 2 or DL semi-persistent scheduling (SPS). The MCS index may be provided to the UE by RRC signaling related to UL configured grant type 1. If the TB to which the CRC is attached is greater than a maximum code block size for the selected LDPC base graph, the transmitting side may segment the TB to which the CRC is attached into a plurality of code blocks. The transmitting side may attach an additional CRC sequence to each code block. A maximum code block size for LDPC base graph 1 and a maximum code block size for LDPC base graph 2 may be 8448 bits and 3480 bits, respectively. If the TB to which the CRC is attached is not greater than the maximum code block size for the selected LDPC base graph, the transmitting side may encode the TB to which the CRC is attached using the selected LDPC base graph. The transmitting side may encode each code block of the TB using the selected LDPC base graph. LDPC coded blocks may be individually rate-matched. Code block concatenation may be performed to generate a codeword for transmission on the PDSCH or the PUSCH. For the PDSCH, a maximum of two codewords (i.e., a maximum of two TBs) may be simultaneously transmitted on the PDSCH. The PUSCH may be used to transmit UL-SCH data and layer 1 and/or 2 control information. Although not illustrated in FIG. 17, the layer 1 and/or 2 control information may be multiplexed with a codeword for the UL-SCH data.

In steps S101 and S102, the transmitting side may perform scrambling and modulation for the codeword. Bits of the codeword may be scrambled and modulated to generate a block of complex-valued modulation symbols.

In step S103, the transmitting side may perform layer mapping. The complex-valued modulation symbols of the codeword may be mapped to one or more multiple input multiple output (MIMO) layers. The codeword may be mapped to a maximum of 4 layers. The PDSCH may carry two codewords and thus the PDSCH may support up to 8-layer transmission. The PUSCH may support a single codeword and thus the PUSCH may support up to 4-layer transmission.

In step S104, the transmitting side may perform transform precoding. A DL transmission waveform may be a normal CP-OFDM waveform. Transform precoding (i.e., discrete Fourier transform (DFT)) may not be applied to DL.

A UL transmission waveform may be legacy OFDM using a CP having a transform precoding function performing DFT spreading, which may be disabled or enabled. In the NR system, if the transform precoding function is enabled on UL, transform precoding may be selectively applied. Transform precoding may spread UL data in a special manner in order to reduce a peak-to-average power ratio (PAPR) of a waveform. Transform precoding may be one type of DFT. That is, the NR system may support two options for a UL waveform. One option may be CP-OFDM (which is the same as a DL waveform) and the other option may be DFT spread OFDM (DFT-s-OFDM). Whether the UE should use CP-OFDM or DFT-s-OFDM may be determined by the BS through an RRC parameter.

In step S105, the transmitting side may perform subcarrier mapping. A layer may be mapped to an antenna port. On DL, transparent manner (non-codebook-based) mapping may be supported for layer-to-antenna port mapping. How beamforming or MIMO precoding is performed may be transparent to the UE. On UL, both non-codebook-based mapping and codebook-based mapping may be supported for antenna port mapping.

For each antenna port (i.e., layer) used for transmission of a physical channel (e.g., a PDSCH, a PUSCH, or a PSSCH), the transmitting side may map complex-valued modulation symbols to subcarriers in an RB allocated to the physical channel.

In step S106, the transmitting side may perform OFDM modulation. A communication device of the transmitting side may generate a subcarrier spacing configuration u for a time-continuous OFDM baseband signal on an antenna port p and an OFDM symbol 1 in a TTI for the physical channel by adding the CP and performing inverse fast Fourier transform (IFFT). For example, the communication device of the transmitting side may perform IFFT on a complex-valued modulation symbol mapped to an RB of a corresponding OFDM symbol with respect to each OFDM symbol. The communication device of the transmitting side may add the CP to an IFFT signal in order to generate the OFDM baseband signal.

In step S107, the transmitting side may perform up-conversion. The communication device of the transmitting side may perform up-conversion on the OFDM baseband signal for the antenna port p, the subcarrier spacing configuration u, and the OFDM symbol into a carrier frequency f0 of a cell to which the physical channel is allocated.

Figure 34:
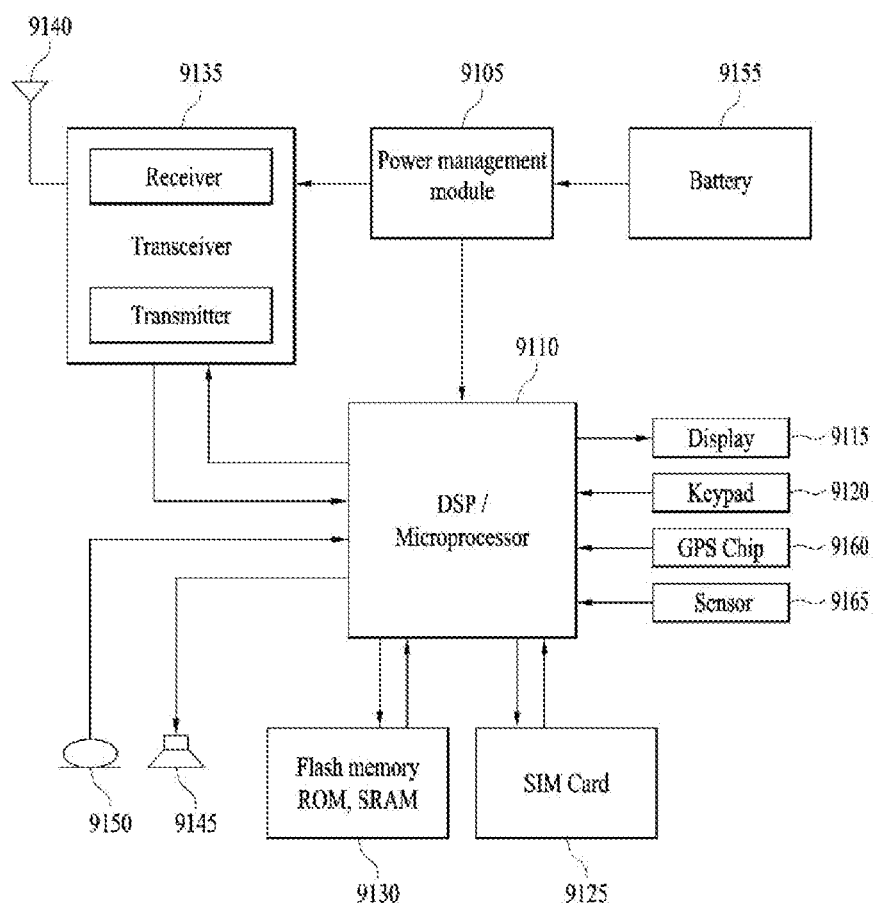

Processors 9011 and 9021 of FIG. 34 may be configured to perform encoding, scrambling, modulation, layer mapping, transform precoding (on UL), subcarrier mapping, and OFDM modulation.

FIG. 17 illustrates an example of physical layer processing at a receiving side to which embodiment(s) are applicable.

Physical layer processing at the receiving side may be basically the reverse of physical layer processing at the transmitting side.

In step S110, the receiving side may perform frequency down-conversion. A communication device of the receiving side may receive an RF signal of a carrier frequency through an antenna. Transceivers 9013 and 9023 for receiving the RF signal in the carrier frequency may down-convert the carrier frequency of the RF signal into a baseband signal in order to obtain an OFDM baseband signal.

In step S111, the receiving side may perform OFDM demodulation. The communication device of the receiving side may acquire a complex-valued modulation symbol through CP detachment and FFT. For example, the communication device of the receiving side may detach a CP from the OFDM baseband signal with respect to each OFDM symbol. The communication device of the receiving side may perform FFT on the CP-detached OFDM baseband signal in order to acquire the complex-valued modulation symbol for an antenna port p, a subcarrier spacing u, and an OFDM symbol 1.

In step S112, the receiving side may perform subcarrier demapping. Subcarrier demapping may be performed on the complex-valued modulation symbol in order to acquire a complex-valued modulation symbol of a corresponding physical channel. For example, the processor of the UE may acquire a complex-valued modulation symbol mapped to a subcarrier belonging to a PDSCH among complex-valued modulation symbols received in a bandwidth part (BWP).

In step S113, the receiving side may perform transform deprecoding. If transform precoding is enabled with respect to a UL physical channel, transform deprecoding (e.g., inverse discrete Fourier transform (IDFT)) may be performed on a complex-valued modulation symbol of the UL physical channel Transform deprecoding may not be performed on a DL physical channel and a UL physical channel for which transform precoding is disabled.

In step S114, the receiving side may perform layer demapping. A complex-valued modulation symbol may be demapped to one or two codewords.

In steps S115 and S116, the receiving side may perform demodulation and descrambling, respectively. A complex-valued modulation symbol of a codeword may be demodulated and may be descrambled to a bit of the codeword.

In step S117, the receiving side may perform decoding. A codeword may be decoded to a TB. For a UL-SCH and a DL-SCH, LDPC base graph 1 or 2 may be selected based on the size of a TB and a code rate R. The codeword may include one or multiple coded blocks. Each coded block may be decoded to a code block to which a CRC is attached or a TB to which the CRC is attached using the selected LDPC base graph. If the transmitting side performs code block segmentation on the TB to which the CRC is attached, a CRC sequence may be eliminated from each of code blocks to which the CRC is attached and code blocks may be acquired. A code block may be concatenated to the TB to which the CRC is attached. A TB CRC sequence may be detached from the TB to which the CRC is attached and then the TB may be acquired. The TB may be transmitted to a MAC layer.

Figure 20:
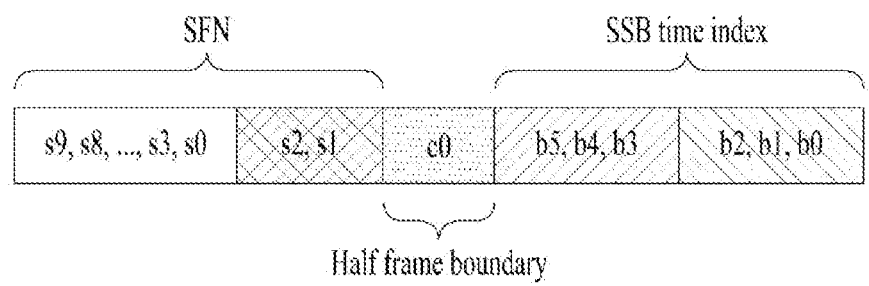
FIG. 20 illustrates a method of acquiring timing information by a UE.
Figure 21:
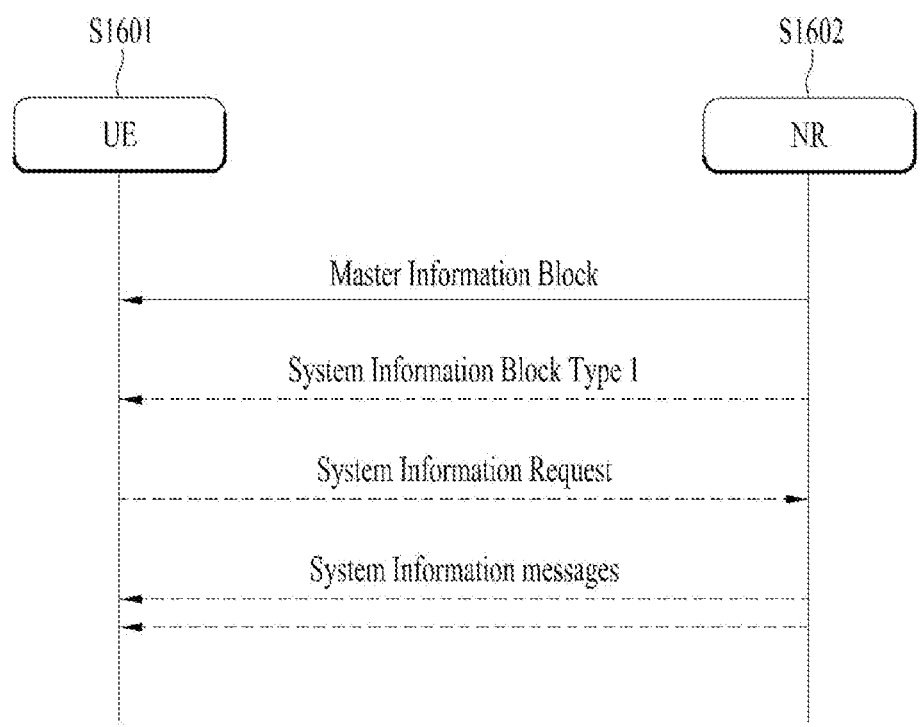
FIG. 21 is a diagram referred to in description of a procedure of acquiring system information to which embodiment(s) are applicable.

The processors 9011 and 9021 of FIG. 20 may be configured to perform OFDM demodulation, subcarrier demapping, layer demapping, demodulation, descrambling, and decoding.

In physical layer processing at the transmitting/receiving side described above, time and frequency domain resource related to subcarrier mapping (e.g., an OFDM symbol, a subcarrier, or a carrier frequency), and OFDM modulation and frequency up/down-conversion may be determined based on resource allocation (e.g., UL grant or DL allocation).

Hereinafter, synchronization acquisition of a sidelink UE will be described.

In a time division multiple access (TDMA) and frequency division multiples access (FDMA) system, accurate time and frequency synchronization is essential. If time and frequency synchronization is not accurately established, system performance may be deteriorated due to inter-symbol interference (ISI) and inter-carrier interference (ICI). This is equally applied even to V2X. For time/frequency synchronization in V2X, a sidelink synchronization signal (SLSS) may be used in a physical layer and master information block-sidelink-V2X (MIB-SL-V2X) may be used in a radio link control (RLC) layer.

Figure 18:
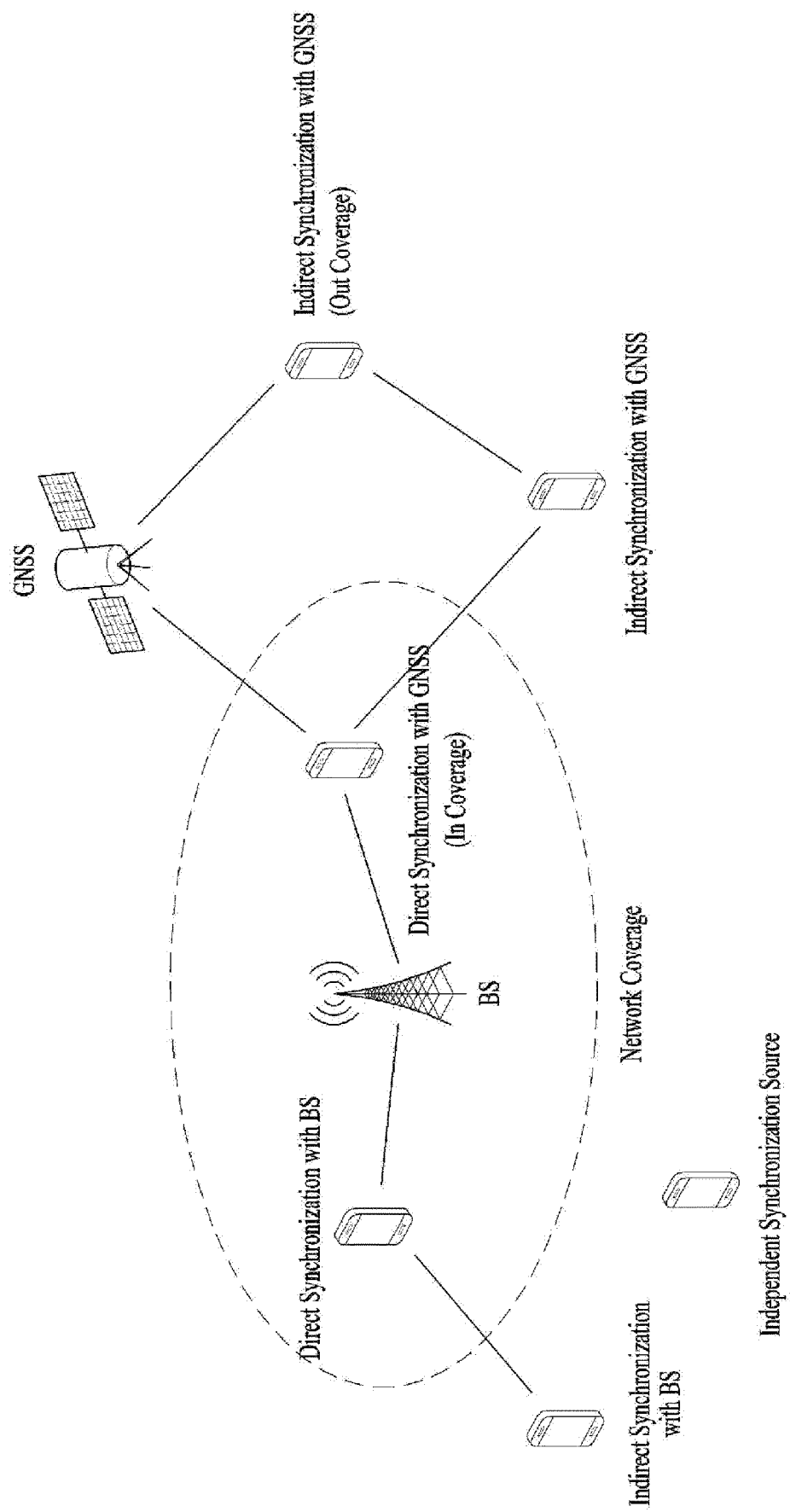
FIG. 18 illustrates a synchronization source or synchronization reference in V2X to which embodiment(s) are applicable.

FIG. 18 illustrates a synchronization source or synchronization reference in V2X to which embodiment(s) are applicable.

Referring to FIG. 18, in V2X, a UE may be directly synchronized with a global navigation satellite system (GNSS) or may be indirectly synchronized with the GNSS through the UE (in network coverage or out of network coverage) that is directly synchronized with the GNSS. If the GNSS is configured as a synchronization source, the UE may calculate a direct frame number (DFN) and a subframe number using coordinated universal time (UTC) and a (pre)configured DFN offset.

Alternatively, the UE may be directly synchronized with a BS or may be synchronized with another UE that is synchronized in time/frequency with the BS. For example, the BS may be an eNB or a gNB. For example, when the UE is in network coverage, the UE may receive synchronization information provided by the BS and may be directly synchronized with the BS. Next, the UE may provide the synchronization information to adjacent another UE. If a timing of the BS is configured as the synchronization reference, the UE may conform to a cell related to a corresponding frequency (when the UE is in cell coverage in the frequency) or a primary cell or a serving cell (when the UE is out of cell coverage in the frequency), for synchronization and DL measurement.

The BS (e.g., serving cell) may provide a synchronization configuration for a carrier used for V2X/sidelink communication. In this case, the UE may conform to the synchronization configuration received from the BS. If the UE fails to detect any cell in the carrier used for V2X/sidelink communication and fails to receive the synchronization configuration from the serving cell, the UE may conform to a preset synchronization configuration.

Alternatively, the UE may be synchronized with another UE that has failed to directly or indirectly acquire the synchronization information from the BS or the GNSS. A synchronization source and a preference degree may be preconfigured for the UE. Alternatively, the synchronization source and the preference degree may be configured through a control message provided by the BS.

The sidelink synchronization source may be associated with a synchronization priority level. For example, a relationship between the synchronization source and the synchronization priority level may be defined as shown in Table 11. Table 11 is purely exemplary and the relationship between the synchronization source and the synchronization priority level may be defined in various manners.

TABLE 11

| Priority Level | GNSS-based Synchronization | eNB/gNB-based Synchronization |
|---|---|---|
| P0 | GNSS | eNB/gNB |
| P1 | All UEs directly synchronized with GNSS | All UEs directly synchronized with eNB/gNB |
| P2 | All UEs indirectly synchronized with GNSS | All UEs indirectly synchronized with eNB/gNB |
| P3 | All other UEs | GNSS |
| P4 | N/A | All UEs directly synchronized with GNSS |
| P5 | N/A | All UEs indirectly synchronized with GNSS |
| P6 | N/A | All other UEs |

Whether to use GNSS-based synchronization or eNB/gNB-based synchronization may be (pre)configured. In a single-carrier operation, the UE may derive a transmission timing thereof from an available synchronization reference having the highest priority.

As described above, in existing sidelink communication, the GNSS, the eNB, and the UE may be configured/selected as the synchronization reference. In case of NR, the gNB has been introduced, so the NR gNB may also be the synchronization reference and then it is necessary to determine a synchronization source priority of the gNB. In addition, the NR UE may neither implement an LTE synchronization signal detector nor access an LTE carrier (non-standalone NR UE). In this situation, the LTE UE and the NR UE may have different timings, which is not desirable in view of effective resource allocation. For example, if the LTE UE and the NR UE operate at different timings, one TTI may partially overlap, resulting in unstable interference therebetween, or some (overlapping) TTIs may not be used for transmission and reception. Accordingly, hereinafter, various embodiments of how to configure the synchronization reference in a situation in which the NR gNB and the LTE eNB coexist will be described based on the above description. In the following description, the synchronization source/reference may be defined as a synchronization signal used by the UE to transmit and receive a sidelink signal or derive a timing for a subframe boundary, or as a subject that transmit the synchronization signal. If the UE derives the subframe boundary based on a UTC timing derived from the GNSS by receiving a GNSS signal, the GNSS signal or the GNSS may be the synchronization source/reference.

Meanwhile, in direct V2V communication, the UE transmits a message within a predetermined time for the purpose of safety or infotainment. In this case, each message has a target arrival distance. For example, a message of a specific application/service may require a short arrival distance and a message of another specific application/service may require a long arrival distance. Meanwhile, even for the same service, a required arrival distance may be different according to the moving speed or location of the UE. For example, a fast moving UE and a slow moving UE may have different latency requirements or arrival distances for message delivery.

Initial Access (IA)

For a process of connecting the BS and the UE, the BS and the UE (transmitting/receiving UE) may perform an initial access (IA) operation.

Cell Search

For cell search, the UE should make some assumptions. The UE should assume that an SSS, a physical broadcast channel (PBCH) demodulation reference signal (DM-RS), and PBCH data have the same energy per resource element (EPRE). The UE may assume that the ratio of PSS EPRE to SSS EPRE in an SS/PBCH block of a corresponding cell is 0 dB or 3 dB.

A cell search procedure of the UE is a procedure of acquiring time and frequency synchronization with a cell and detecting a physical layer cell ID of the cell as shown in Table 12. The UE receives a synchronization signal (SS), a primary synchronization signal (PSS), and a secondary synchronization signal (SSS) in order to perform cell search.

The UE may receive an SS/PBCH block in symbols in which reception timings of the PBCH, the PSS, and the SSS are contiguous.

TABLE 12

| | Type of Signals | Operations |
|---|---|---|
| 1$^{st}$ step | PSS | * SS/PBCH block (SSB) symbol timing acquisition<br>* Cell ID detection within a cell ID group (3 hypothesis) |
| 2$^{nd}$ Step | SSS | * Cell ID group detection (336 hypothesis) |
| 3$^{rd}$ Step | PBCH DMRS | * SSB index and Half frame index (Slot and frame boundary detection) |
| 4$^{th}$ Step | PBCH | * Time information (80 ms, SFN, SSB index, HF)<br>* RMSI CORESET/ Search space configuration |
| 5$^{th}$ Step | PDCCH and PDSCH | * Cell access information<br>* RACH configuration |

Figure 19:
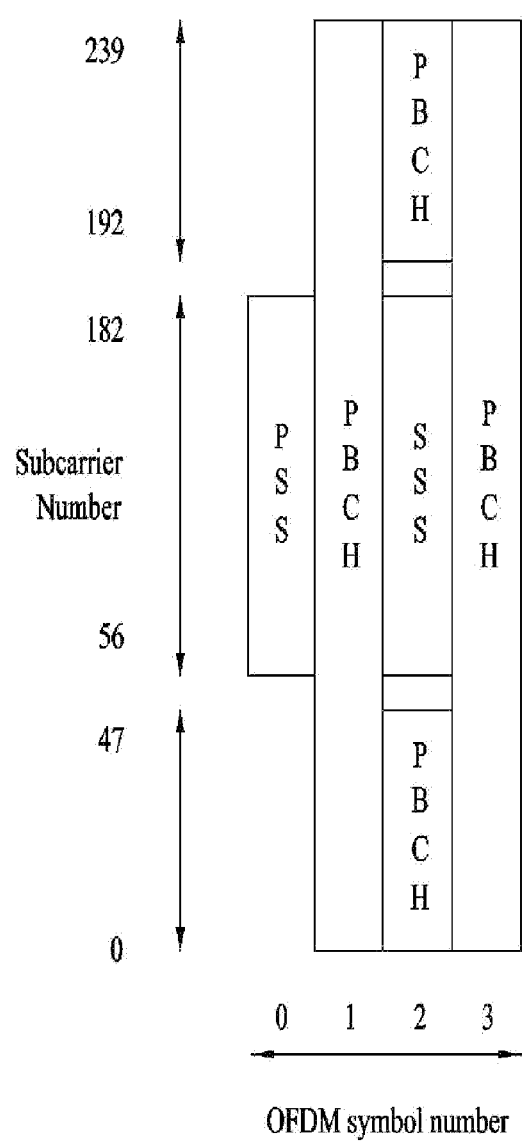
FIG. 19 illustrates an SS/PBCH block to which embodiment(s) are applicable.

Although the SS and the PBCH block are composed of a PSS and an SSS, each which occupies one symbol and 127 subcarriers, and a PBCH which spans 3 OFDM symbols and 240 subcarriers, respectively, one symbol is left unused in the middle of the SSS, as illustrated in FIG. 19. The period of the SS/PBCH block (SSB) may be configured by a network and the time position at which the SSB may be transmitted is determined by a subcarrier spacing.

Polar coding is used for the PBCH. Unless the network configures the UE to assume different subcarrier spacings, the UE may assume band-specific subcarrier spacings for the SSB.

A PBCH symbol carries a unique frequency-multiplexed DMRS. QPSK modulation is used for the PBCH.

There are 1008 unique physical layer cell IDs.

$$N_{ID}{}^{cell} = 3N_{ID}{}^{(1)} + N_{ID}{}^{(2)} \quad \text{[Equation 1]}$$

where $N_{ID}{}^{(1)} \in \{0, 1, \ldots, 335\}$ and $N_{ID}{}^{(2)} \in \{0, 1, 2\}$.

A PSS sequence $d_{PSS}(n)$ is defined as Equation 2 below.

$$\begin{aligned}
&d_{PSS}(n) = 1 - 2x(m) \quad \text{[Equation 2]}\\
&m = (n + 43N_{ID}^{(2)}) \bmod 127\\
&0 \le n < 127\\
&x(i+7) = (x(i+4) + x(i)) \bmod 2,\\
&[x(6)\ x(5)\ x(4)\ x(3)\ x(2)\ x(1)\ x(0)] =\\
&\qquad\qquad\qquad\qquad\qquad [1\ 1\ 1\ 0\ 1\ 1\ 0]
\end{aligned}$$

$$\begin{aligned}
&d_{SSS}(n) = [1 - \quad \text{[Equation 3]}\\
&\quad 2x_0((n+m_0)\bmod 127)][1 - 2x_1((n+m_1)\bmod 127)]\\
&m_0 = 15\left\lfloor\frac{N_{ID}^{(1)}}{112}\right\rfloor + 5N_{ID}^{(2)}\\
&m_1 = N_{ID}^{(1)} \bmod 112\\
&0 \le n < 127\\
&x_0(i+7) = (x_0(i+4) + x_0(i)) \bmod 2\\
&x_1(i+7) = (x_1(i+1) + x_1(i)) \bmod 2\\
&[x_0(6)\ x_0(5)\ x_0(4)\ x_0(3)\ x_0(2)\ x_0(1)\ x_0(0)] =\\
&\qquad\qquad\qquad\qquad\qquad [0\ 0\ 0\ 0\ 0\ 0\ 1]\\
&[x_1(6)\ x_1(5)\ x_1(4)\ x_1(3)\ x_1(2)\ x_1(1)\ x_1(0)] =\\
&\qquad\qquad\qquad\qquad\qquad [0\ 0\ 0\ 0\ 0\ 0\ 1]
\end{aligned}$$

This sequence is mapped to the physical resource illustrated in FIG. 19.

In the case of a half frame having the SSB, the first symbol index for a candidate SSB is determined according to a subcarrier spacing of the SSB as follows.

Case A—Subcarrier spacing of 15 kHz: The first symbol index of the candidate SSB is {2, 8}+14*n. For carrier frequencies equal to or greater than 3 GHz, n=0 and, for carrier frequencies greater than 3 GHz and less than 6 GHz, n=0, 1, 2, 3.

Case B—Subcarrier spacing of 30 kHz: The first symbol index of the candidate SSB is {4, 8, 16, 20}+28*n. For carrier frequencies equal to or greater than 3 GHz, n=0 and, for carrier frequencies greater than 3 GHz and less than 6 GHz, n=0, 1.—Case C—Subcarrier spacing of 30 kHz: The first symbol index of the candidate SSB is {2, 8}+14*n. For carrier frequencies equal to or greater than 3 GHz, n=0, 1 and, for carrier frequencies greater than 3 GHz and less than 6 GHz, n=0, 1, 2, 3.

Case D—Subcarrier spacing of 120 kHz: The first symbol index of the candidate SSB is {4, 8, 16, 20}+28*n. For carrier frequencies greater than 6 GHz, n=0, 1, 2, 3, 5, 6, 7, 8, 10, 11, 12, 13, 15, 16, 17, 18.—Case E—Subcarrier spacing of 240 kHz: The first symbol index of the candidate SSB is {8, 12, 16, 20, 32, 36, 40, 44}+56*n. For carrier frequencies greater than 6 GHz, n=0, 1, 2, 3, 5, 6, 7, 8.

In a half frame, candidate SSBs are indexed in ascending order in order of time from 0 to L−1. The UE should determine 2 least significant bits (LSBs) for L=4 of an SSB index per half frame or determine 3 LSBs for L>4, from one-to-one mapping with an index of a DM-RS sequence transmitted through the PBCH. The UE should determine 3 most significant bits (MSBs) of the SSB index per half frame by a PBCH payload bit $\overline{a}_{\overline{A}+5}$, $\overline{a}_{\overline{A}+6}$, $\overline{a}_{\overline{A}+7}$ for the case of L=4.

The UE may be configured by a higher layer parameter SSB-transmitted-SIB1, which is an SSB index for the UE that should not receive another signal or channel of REs overlapping with REs corresponding to the SSB.

The UE may be configured by a higher layer parameter SSB-transmitted, which is an SSB index for the UE that should not receive another signal or channel overlapping with REs corresponding to the SSB, per serving cell. A configuration caused by SSB-transmitted may be prioritized over a configuration caused by SSB-transmitted-SIB1. The UE may be configured by a higher layer parameter SSB-periodicityServingCell, which is a period of a half frame for reception of the SSB per serving cell, in every serving cell. If the UE is not configured with the period of the half frame for reception of the SSB, the UE should assume the period of the half frame. The UE should assume that the period is the same with respect to all SSBs of the serving cell.

FIG. 20 illustrates a method of acquiring timing information by a UE.

First, the UE may acquire 6-bit subframe number (SFN) information through a master information block (MIB) received on a PBCH. In addition, the UE may acquire 4 bits of the SFN through a PBCH TB.

Second, the UE may obtain a 1-bit half frame indication as part of a PBCH payload. For a frequency below 3 GHz, the half frame indication is implicitly signaled as part of a PBCH DMRS for Lmax=4.

Finally, the UE may acquire an SSB index by a DMRS sequence and the PBCH payload. That is, 3 LSBs of an SS block index are obtained by the DMRS sequence within a 5 ms period. 3 MSBs of timing information are explicitly signaled by the PBCH payload (for 6 GHz and above).

For initial cell selection, the UE may assume that a half frame having the SSB occurs at a period of two frames. Upon detection of the SSB, the UE determines that there is a control resource set for the Type0-PDCCH common search space when $k_{SSB} \leq 23$ for frequency range 1 (FR1) and $k_{SSB} \leq 11$ for frequency range 2 (FR2). The UE determines that there is no control resource set for the Type0-PDCCH common search space when $k_{SSB} > 23$ for FR1 and $k_{SSB} > 11$ for FR2.

For a serving cell without SSB transmission, the UE obtains time and frequency synchronization of the serving cell based on SSB reception in a PCell or PSCell of a cell group for the serving cell.

System Information Acquisition

System information (SI) is divided into an MIB Master-InformationBlock) and multiple SIBs SystemInformation-Blocks as follows.

MIB MasterInformationBlock is always transmitted on a BCH with a periodicity of 80 ms and a repetition of 80 ms or less and includes parameters needed to acquire SIB1 SystemInformationBlockType1 in a cell.

SIB1 SystemInformationBlockType1 is transmitted on a DL-SCH periodically and repeatedly. SIB1 includes information about availability and scheduling (e.g., periodicity and SI window size) of other SIBs. SIB1 also indicates whether the other SIBs are provided on a periodic broadcast basis or on a request basis. If the other SIBs are provided on a request basis, SIB1 includes information needed by the UE to perform an SI request.

The SI other than SystemInformationBlockType1 is delivered through SI (SystemInformation) messages transmitted on the DL-SCH. Each SI message is transmitted within a time domain window (SI window) that occurs periodically.

In case of a PSCell and an SCell, a RAN provides necessary SI through dedicated signaling. Nevertheless, the UE should acquire an MIB of the PSCell to obtain an SFN timing of a secondary cell group (SCG) (which may be different from a master cell group (MCG)). If relevant SI for the SCell is changed, the RAN releases and adds the SCell. For the PSCell, the SI may be changed only by reconfiguration through synchronization.

The UE acquires access stratum (AS) and a non-access stratum (NAS) information by applying an SI acquisition procedure. The procedure is applied to UEs of RRC_IDLE, RRC_INACTIVE, and RRC_CONNECTED.

The UEs of RRC_IDLE and RRC_INACTIVE should have valid versions of (at least) MasterInformationBlock, SystemInformationBlockType1, and SystemInformationBlockTypeX through SystemInformationBlockTypeY (depending on support of relevant RAT for UE control mobility).

The UE of RRC_CONNECTED should have valid versions of (at least) MasterInformationBlock, SystemInformationBlockType1, and SystemInformationBlockTypeX (depending on mobility support for relevant RAT).

The UE should store associated SI obtained from the currently camped cell/serving cell. The version of the SI acquired and stored by the UE is valid only for a certain time. The UE may use this stored version of the SI. For example, after cell reselection, the UE may use the stored version of the SI upon returning back from out-of-coverage or after indicating SI change.

Random Access

Figure 22:
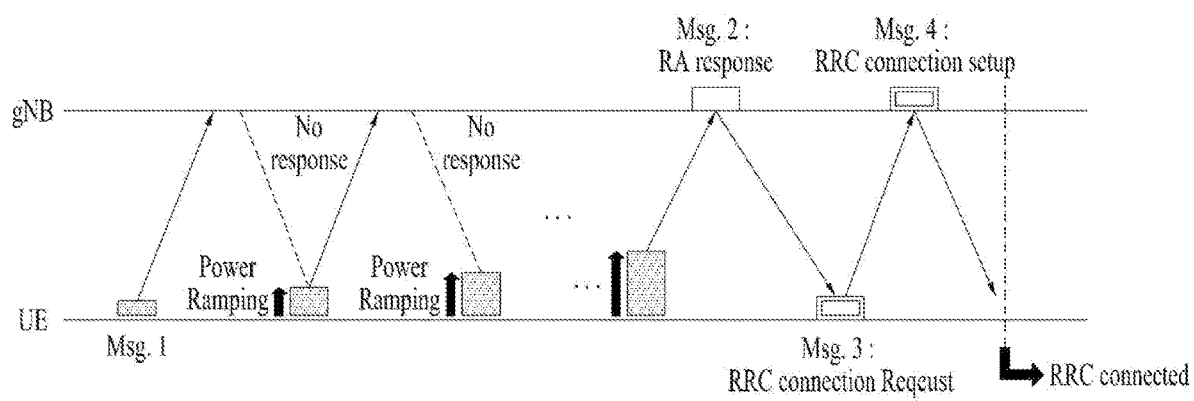
FIG. 22 is a diagram referred to in description of a random access procedure to which embodiment(s) are applicable.

A random access procedure of the UE may be summarized as illustrated in Table 13 and FIG. 22.

TABLE 13

| | Type of Signals | Operations/Information Acquired |
|---|---|---|
| $1^{st}$ step | PRACH preamble in UL | * Initial beam acquisition<br>* Random election of RA-preamble ID |
| $2^{nd}$ Step | Random Access Response on DL-SCH | * Timing alignment information<br>* RA-preamble ID<br>* Initial UL grant, Temporary C-RNTI |
| $3^{rd}$ Step | UL transmission on UL-SCH | * RRC connection request<br>* UE identifier |
| $4^{th}$ Step | Contention Resolution on DL | * Temporary C-RNTI on PDCCH for initial access<br>* C-RNTI on PDCCH for UE in RRC_CONNECTED |

First, the UE may transmit a physical random access channel (PRACH) preamble on UL as Msg1 of the random access procedure.

Two lengths of the random access preamble sequences are supported. A long sequence length of 839 is applied to subcarrier spacings of 1.25 and 5 kHz and a short sequence length of 139 is applied to subcarrier spacings of 15, 30, 60, and 120 kHz. The long sequence supports an unrestricted set and restricted sets of Type A and Type B, whereas the short sequence supports only the unrestricted set.

Multiple RACH preamble formats are defined as one or more RACH OFDM symbols and different CP and guard times. A PRACH preamble configuration used is provided to the UE through SI.

If there is no response to Msg1, the UE may retransmit the PRACH preamble through power ramping within a preset number of times. The UE calculates PRACH transmit power for retransmission of the preamble based on the most recent estimated path loss and a power ramp counter. When the UE performs beam switching, the power ramping counter remains unchanged.

Figure 23:
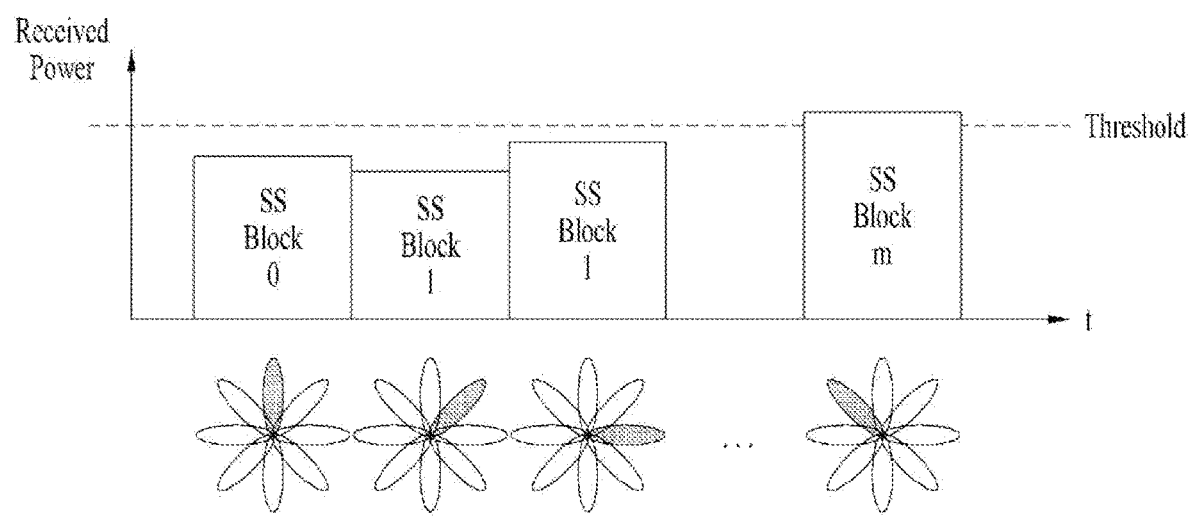
FIG. 23 is a diagram referred to in description of a threshold of an SS block to which embodiment(s) are applicable.

An association between an SS block and an RACH resource is indicated to the UE through the SI. FIG. 23 illustrates the concept of a threshold of an SS block for RACH resource association.

The threshold of the SS block for the RACH resource association is based on RSRP and network configurability. Transmission or retransmission of the RACH preamble is based on the SS block that satisfies the threshold.

When the UE receives a random access response on a DL-SCH, the DL-SCH may provide timing alignment information, an RA-preamble ID, an initial UL grant, and a temporary C-RNTI.

Based on this information, the UE may perform UL transmission on a UL-SCH as Msg3 of the random access procedure. Msg3 may include an RRC connection request and a UE ID.

In response to Msg3, the network may transmit Msg4, which may be treated as a contention resolution message on DL. By receiving the Msg4, the UE may enter an RRC connected state.

The detailed description of each step is as follows.

Before starting the physical random access procedure, Layer 1 should receive a set of SSB indexes from a higher layer and provide an RSRP measurement set corresponding to the set of the SSB indexes to the higher layer.

Before starting the physical random access procedure, Layer 1 should receive the following information from the higher layer.

PRACH transmission parameter configuration (a PRACH preamble format and time and frequency resources for PRACH transmission).

Parameters for determining a root sequence and a cyclic shift in a PRACH preamble sequence set (an index of a logical root sequence table, a cyclic shift $N_{CS}$, and a set type (unrestricted set, restricted set A, or restricted set B)).

From the perspective of a physical layer, an L1 random access procedure includes transmission of a random access preamble Msg1 in a PRACH, transmission of a random access response (RAR) message with a PDCCH/PDSCH (Msg2), and, when applicable, transmission of a Msg3 PUSCH and transmission of the PDSCH for contention resolution.

If the random access procedure is initiated by "PDCCH order" for the UE, random access preamble transmission has the same subcarrier spacing as random access preamble transmission initiated by a higher layer.

If two UL carriers are configured for the UE with respect to a serving cell and the UE detects "PDCCH order", the UE determines a UL carrier for transmitting a corresponding random access preamble using a UL/SUL indicator field value from the detected "PDCCH order".

In association with the random access preamble transmission step, a physical random access procedure is triggered according to a request of PRACH transmission or the PDCCH order by the higher layer. A higher layer configuration for PRACH transmission includes:

configuration for PRACH transmission, and a preamble index, a preamble subcarrier spacing, $P_{PRACH,\ target}$, a corresponding RA-RNTI, and a PRACH resource.

The preamble is transmitted using a PRACH format selected with transmit power $P_{PRACH,\ b,\ f,\ c}(i)$ on an indicated PRACH resource.

The UE is provided with a plurality of SSBs associated with one PRACH occasion by the value of a higher layer parameter SSB-perRACH-Occasion. If the value of SSB-perRACH-Occasion is less than 1, one SSB is mapped to SSB-perRACH-Occasion, which is one/consecutive PRACH occasions. The UE is provided with a plurality of preambles per SSB by the value of a higher layer parameter cb-preamblePerSSB and determines a total number of preambles per SSB per PRACH occasion as the product of the values of SSB-perRACH-Occasion and cb-preamblePerSSB.

SSB indexes are mapped to PRACH occasions in the following order.

First, order in which preamble indexes increase in a single PRACH occasion.

Second, order in which frequency resource indexes for frequency multiplexed PRACH occasions increase.

Third, order in which time indexes for time multiplexed PRACH occasions in a PRACH slot increase.

Fourth, order in which indexes for a PRACH slot increase.

A period starting from frame 0, for mapping SSBs to PRACH occasions, is the smallest period among PRACH configuration periods such as {1, 2, 4}, greater than or equal to $\lceil N_{Tx}^{SSB}/N_{PRACHperiod}^{SSB} \rceil$. In this case, the UE obtains $N_{Tx}^{SSB}$ from the higher layer parameter SSB-transmitted-SIB1 and $N_{PRACHperiod}^{SSB}$ is the number of SSBs capable of being mapped to one PRACH configuration period.

If a random access procedure is initialized by the PDCCH order, the UE should transmit a PRACH in the first available PRACH occasion, which is time between the last symbol of PDCCH order reception and the first symbol of PRACH transmission, equal to or greater than $N_{T,2}+\Delta_{BWPSwitchng}+\Delta_{Delay}$ msec, at the request of the higher layer. $N_{T,2}$ is a time duration of $N_2$ symbols corresponding to a PUSCH preparation time for PUSCH processing capability 1 and $\Delta_{BWPSwitching}$ is a preset value, and $\Delta_{Delay}>0$. In response to PRACH transmission, the UE attempts to detect a PDCCH corresponding to an RA-RNTI during a window controlled by the higher layer.

The window is started in the first symbol of an initial control resource set. The UE is configured for a Type1-PDCCH common search space which is a symbol $\lceil (\Delta \cdot N_{slot}^{subframe\mu} \cdot N_{symb}^{slot})/T_{sf} \rceil$ after the last symbol of preamble sequence transmission.

The length of the window indicated as the number of slots, based on a subcarrier spacing for a Type0-PDCCH common search space, is provided by a higher layer parameter rar-WindowLength.

If the UE detects a PDCCH corresponding to an RA-RNTI and a corresponding PDSCH including a DL-SCH TB in the window, the UE delivers a TB to the higher layer. The higher layer parses a TB for a random access preamble identity (RAPID) related to PRACH transmission. If the higher layer identifies the RAPID in RAR message(s) of the DL-SCH TB, the higher layer indicates a UL grant to a physical layer. This is referred to as a random access response (RAR) UL grant in the physical layer. If the higher layer does not identify the RAPID associated with PRACH transmission, the higher layer may instruct the physical layer to transmit the PRACH. A minimum time between the last symbol of PDSCH reception and the first symbol of PRACH transmission is equal to $N_{T,1}+\Delta_{new}+0.5$ msec. In this case, $N_{T,1}$ denotes a time duration of N symbols corresponding to a PDSCH reception time for PDSCH processing capability 1 when an additional PDSCH DM-RS is configured.

The UE should receive a PDSCH including a DL-SCH TB having the same DM-RS antenna port quasi co-location attribute as the detected SSB or received CSI and receive a PDCCH of a corresponding RA-RNTI. When the UE attempts to detect the PDCCH corresponding to the RA-RNTI in response to PRACH transmission initiated by the PDCCH order, the UE assumes that the PDCCH and the PDCCH order have the same DM-RS antenna port quasi co-location attribute.

An RAR UL grant schedules PUSCH transmission from the UE (Msg3 PUSCH). The contents of an RAR UL grant that begin with the MSB and end with the LSB are shown in Table 14. Table 14 shows the size of an RAR grant content field.

TABLE 14

| RAR grant field | Number of bits |
| --- | --- |
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |
| Reserved bits | 3 |

Msg3 PUSCH frequency resource allocation is for UL resource allocation type 1. For frequency hopping, the first bit, two bits, or $N_{UL,hop}$ bits of an Msg3 PUSCH frequency resource allocation field are used as hopping information bits as shown in Table 14, based on indication of a frequency hopping flag field.

An MCS is determined from the first 16 indexes of an MCS index table applicable to a PUSCH.

A TPC command $\delta_{msg2,b,f,c}$ is used to set the power of the Msg3 PUSCH and is interpreted according to Table 15. Table 15 shows the TPC command for the Msg3 PUSCH.

TABLE 15

| TPC Command | Value (in d) |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

In a non-contention-based random access procedure, a CSI request field is interpreted to determine if aperiodic CSI reporting is included in corresponding PUSCH transmission. In a contention-based random access procedure, the CSI request field is reserved.

Unless the UE configures a subcarrier spacing, the UE receives a subsequent PDSCH using the same subcarrier spacing as PDSCH reception providing an RAR message.

If the UE fails to detect a PDCCH in a window using a corresponding RA-RNTI and a corresponding DL-SCH TB, the UE performs a RAR reception failure procedure.

For example, the UE may perform power ramping for retransmission of a random access preamble based on the power ramping counter. However, the power ramping counter remains unchanged when the UE performs beam switching in PRACH retransmission as illustrated in FIG. 16.

Figure 24:
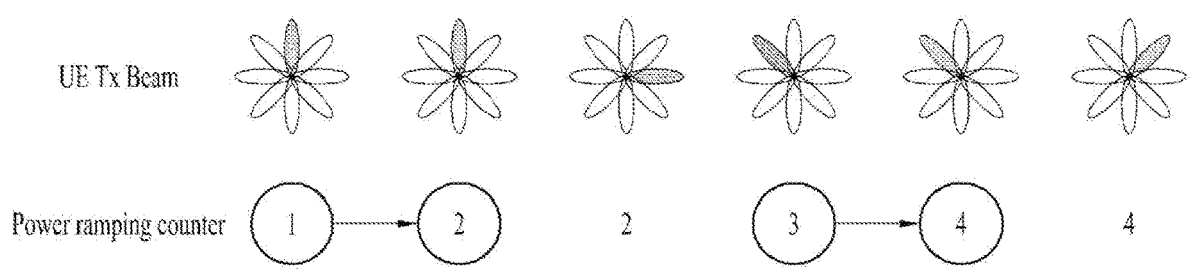
FIG. 24 is a diagram referred to in description of beam switching for PRACH retransmission to which embodiment(s) are applicable.

In FIG. 24, when the UE retransmits a random access preamble for the same beam, the UE may increase the power ramping counter by one. However, even if a beam is changed, the power ramp counter is not changed.

In relation to Msg3 PUSCH transmission, a higher layer parameter msg3-tp indicates whether the UE should apply transform precoding to Msg3 PUSCH transmission. When the UE applies transform precoding to Msg3 PUSCH transmission having frequency hopping, a frequency offset for the second hop is given in Table 16. Table 16 shows the frequency offset for the second hop for Msg3 PUSCH transmission having frequency hopping.

TABLE 16

| Number of PRBs in initial active UL BWP | Value $N_{UL,hop}$ Hopping Bits | Frequency offset for $2^{nd}$ hop |
| --- | --- | --- |
| $N_{BWP}^{size} < 50$ | 0 | $N_{BWP}^{size}/2$ |
| | 1 | $N_{BWP}^{size}/4$ |
| $N_{BWP}^{size} \geq 50$ | 00 | $N_{BWP}^{size}/2$ |
| | 01 | $N_{BWP}^{size}/4$ |
| | 10 | $-N_{BWP}^{size}/4$ |
| | 11 | Reserved |

A subcarrier spacing for Msg3 PUSCH transmission is provided by a higher layer parameter msg3-scs. The UE should transmit the PRACH and Msg3 PUSCH on the same UL carrier of the same serving cell. A UL BWP for Msg3 PUSCH transmission is indicated by SystemInformationBlockType1.

If a PDSCH and a PUSCH have the same subcarrier spacing, a minimum time between the last symbol of PDSCH reception carrying a RAR to the UE and the first symbol of corresponding Msg3 PUSCH transmission scheduled by the RAR of the PDSCH is equal to $N_{T,1}+N_{T,2}+N_{TA,max}+0.5$ msec. $N_{T,1}$ is the time interval of $N_2$ symbols corresponding to a PDSCH reception time for PDSCH processing capability 1 when an additional PDSCH DM-RS is configured. $N_{T,2}$ is a time interval of symbols corresponding to a PUSCH preparation time for PUSCH processing capability 1, and $N_{TA, max}$ is a maximum timing adjustment value that may be provided in a TA command field of the RAR. In response to Msg3 PUSCH transmission when a C-RNTI is not provided to the UE, the UE attempts to detect a PDCCH with a TC-RNTI scheduling a PDSCH including a UE contention-resolution ID. Upon receiving a PDSCH through the UE contention resolution ID, the UE transmits HARQ-ACK information on the PUCCH. A minimum time between the last symbol of PDSCH reception and the first symbol of corresponding HARQ-ACK transmission is equal to $N_{T,1}+0.5$ msec. In this case, N, is a time duration of N symbols corresponding to a PDSCH reception time for PDSCH processing capability 1 when an additional PDSCH DM-RS is configured.

Channel Coding Scheme

A channel coding scheme for an embodiment mainly includes (1) a low-density parity check (LDPC) coding scheme for data, and (2) other coding schemes such as polar coding and iterative coding/simplex coding/Reed-Muller coding for control information.

Specifically, the network/UE may perform LDPC coding for the PDSCH/PUSCH by supporting two base graphs (BGs). BG1 has a mother code rate of 1/3 and BG2 has a mother code rate of 1/5.

For coding of control information, iterative coding/simplex coding/Reed-Muller coding may be supported. If the control information has a length longer than 11 bits, the polar coding scheme may be used. For DL, the size of the mother code may be 512 and, for UL, the size of the mother code may be 1024. Table 17 summarizes the coding scheme of UL control information.

TABLE 17

| Uplink Control Information size including CRC, if present | Channel code |
|---|---|
| 1 | Repetition code |
| 2 | Simplex code |
| 3-11 | Reed Muller code |
| >11 | Polar code |

As mentioned above, the polar coding scheme may be used for the PBCH. This coding scheme may be the same as in the PDCCH.

An LDPC coding structure is described in detail.

An LDPC code is an (n, k) linear block code defined as a null space of (n, k)×a sparse parity-check matrix H.

$$Hx^T = 0 \quad \text{[Equation 4]}$$

$$Hx^T = \begin{bmatrix} 1 & 1 & 1 & 0 & 0 \\ 1 & 0 & 0 & 1 & 1 \\ 1 & 1 & 0 & 0 & 0 \\ 0 & 1 & 1 & 1 & 0 \end{bmatrix} \begin{bmatrix} x_1 \\ x_2 \\ x_3 \\ x_4 \\ x_5 \end{bmatrix} = \begin{bmatrix} 0 \\ 0 \\ 0 \\ 0 \end{bmatrix}$$

Figure 25:
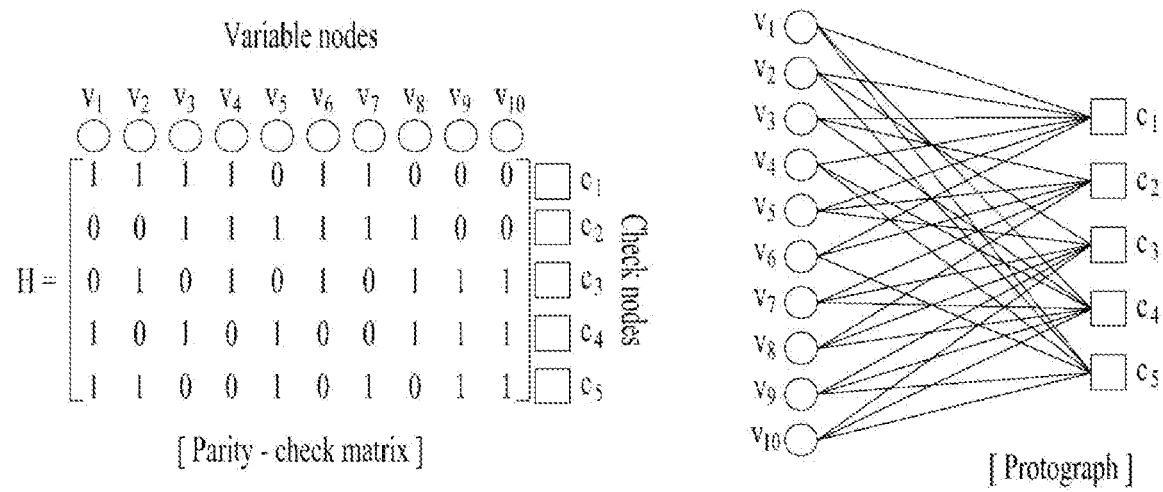

The parity-check matrix is represented by a prototype graph as illustrated in FIG. 25.

In one embodiment, a quasi-cyclic (QC) LDPC code is used. In this embodiment, the parity-check matrix is an m×n array of a Z×Z cyclic permutation matrix. Complexity may be reduced and highly parallelizable encoding and decoding may be obtained using this QC LDPC.

FIG. 26 illustrates an example of a parity-check matrix based on a 4×4 cyclic permutation matrix.

In FIG. 26, H is represented by a shift value (cyclic matrix) and 0 (zero matrix) instead of Pi.

Figure 27:
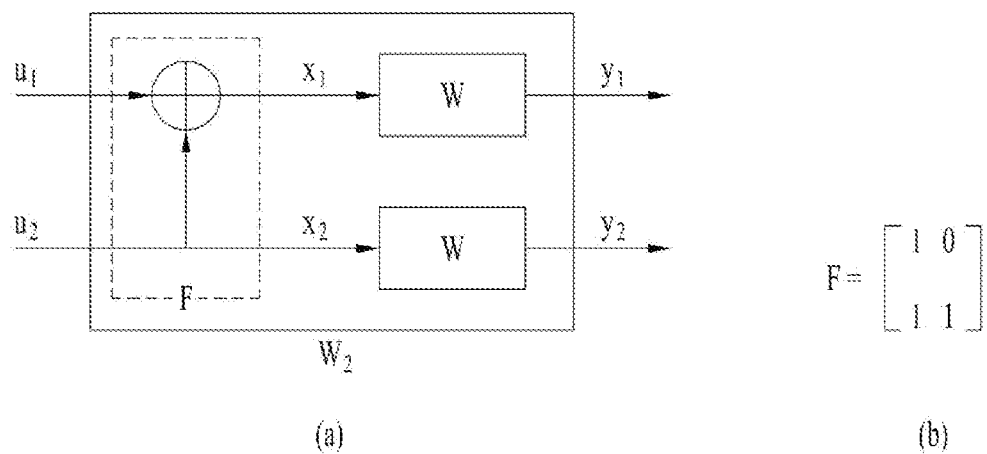
FIG. 27 illustrates an encoder structure for a polar code to which embodiment(s) are applicable.

FIG. 27 illustrates an encoder structure for a polar code. Specifically, FIG. 27(a) illustrates a basic module of the polar code and FIG. 27(b) illustrates a basic matrix.

Figure 28:
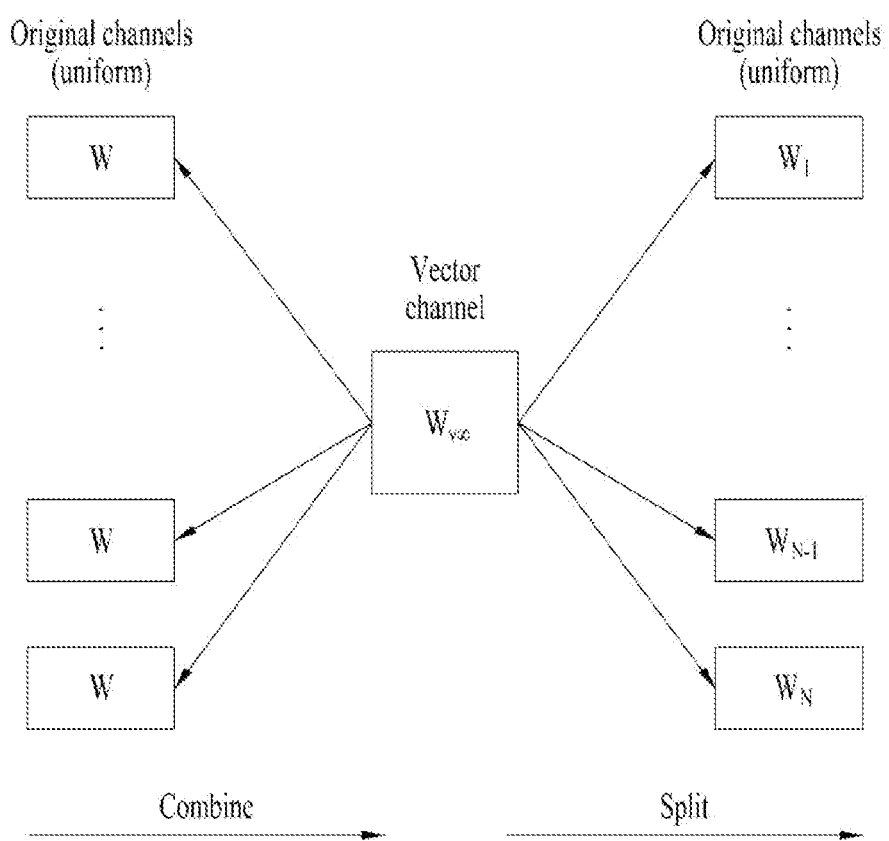
FIG. 28 illustrates channel combining and channel splitting to which embodiment(s) are applicable.

The polar code is known in the art as a code capable of obtaining channel capacity in a binary input discrete memoryless channel (B-DMC). That is, channel capacity may be obtained when the size N of a code block is increased to infinity. An encoder of the polar code performs channel combining and channel splitting as illustrated in FIG. 28.

UE States and State Transition

Figure 29:
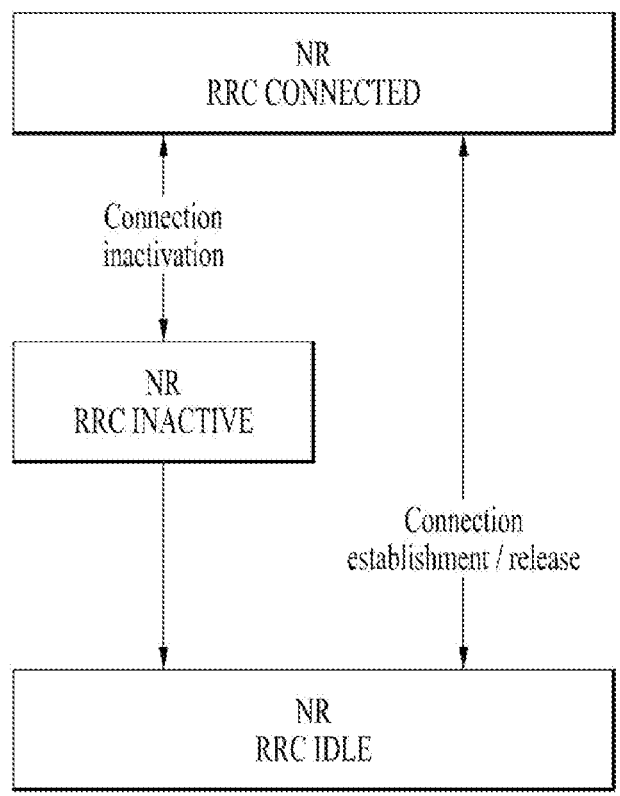
FIG. 29 illustrates UE RRC state transition to which embodiment(s) are applicable.

FIG. 29 illustrates a UE RRC state machine and state transition. The UE has only one RRC state at a time.

Figure 30:
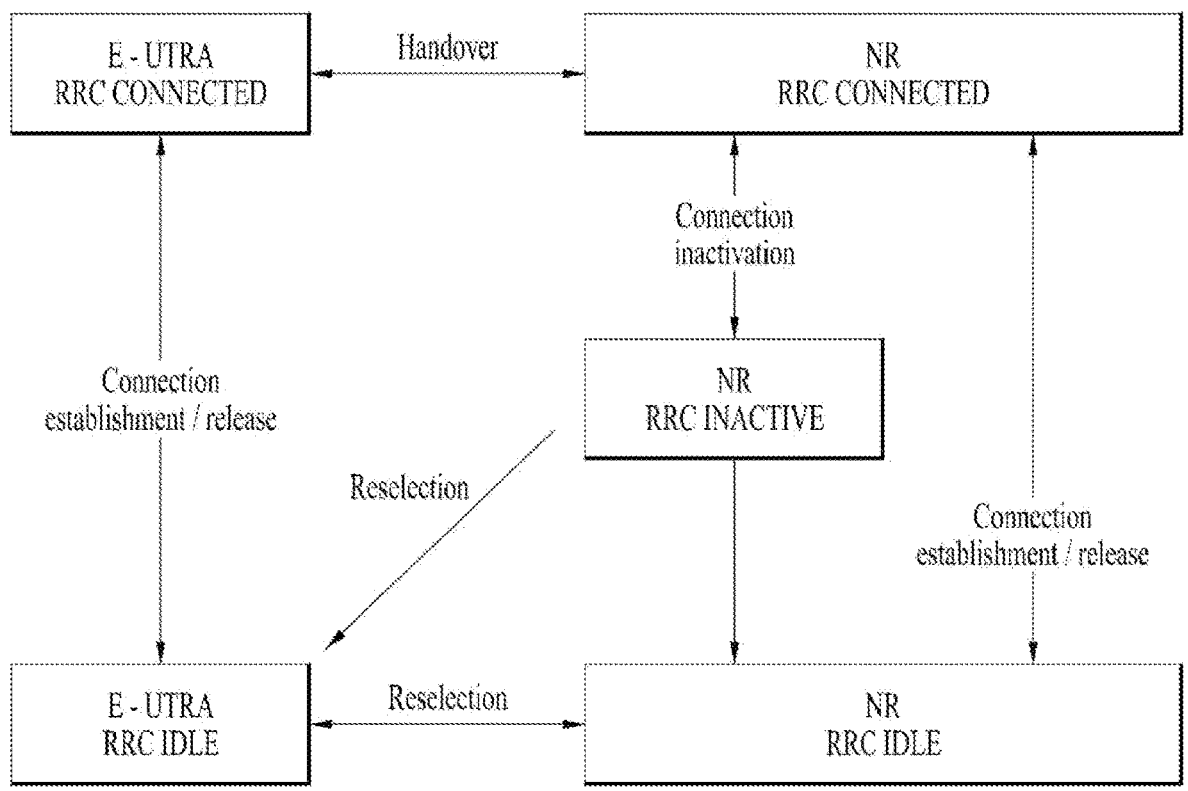
FIG. 30 illustrates state transition between an NR/NGC and an E-UTRAN/EPC to which embodiment(s) are applicable.

FIG. 30 illustrates a UE state machine, state transition, and a mobility procedure supported between an NR/NGC and an E-UTRAN/EPC.

The RRC state indicates whether an RRC layer of the UE is logically connected to an RRC layer of the NG RAN.

When an RRC connection is established, the UE is in RRC_CONNECTED state or RRC_INACTIVE state. Otherwise, that is, if no RRC connection is established, the UE is in RRC_IDLE state.

When the UE is in RRC_CONNECTED state or RRC_INACTIVE state, the UE has an RRC connection, so that the NG RAN may recognize the presence of the UE in a cell unit. Therefore, it is possible to effectively control the UE. Meanwhile, when the UE is in RRC_IDLE state, the UE may not be recognized by the NG RAN and is managed by a core network in a tracking area unit, which is a unit of a larger area than a cell. That is, only the presence of the UE is recognized in a wide area unit for the UE in RRC_IDLE state. In order to receive general mobile communication services such as voice or data, it is necessary to switch to RRC_CONNECTED state.

When the user first turns on the UE, the UE first searches for an appropriate cell and then maintains RRC_IDLE state in the cell. Only when it is necessary to establish an RRC connection, does the UE in RRC_IDLE state establish an RRC connection with the NG RAN through an RRC connection procedure and then transition to RRC_CONNECTED state or RRC_INACTIVE state. When the UE in RRC_IDLE needs to establish an RRC connection includes various cases in which, for example, a UL data transmission is required due to a telephone attempt by a user or a response message is transmitted in response to a paging message received from the NG RAN.

RRC_IDLE state and RRC_INACTIVE state have the following characteristics.

(1) RRC_IDLE:
UE-specific discontinuous reception (DRX) may be configured by a higher layer;
UE control mobility based on network configuration;
UE:
monitors a paging channel;
performs adjacent cell measurement and cell (reselection); and
acquire SI.

(2) RRC_INACTIVE:
UE-specific DRX may be configured by the higher layer or RRC layer;
UE control mobility based on network configuration;
The UE stores an access stratum (AS) context;
UE:
monitors the paging channel;
performs adjacent cell measurement and cell (reselection);
performs RAN-based notification area update when the UE moves out of a RAN-based notification area; and
acquires SI.

(3) RRC_CONNECTED:
The UE stores an AS context;
Unicast data with the UE is transmitted;
In a lower layer, the UE may be configured with UE-specific DRX;
For the UE supporting CA, one or more SCells aggregated with an SpCell are used for extended bandwidth;
For the UE supporting DC, one SCG aggregated with an MCG is used for extended bandwidth;
Network control mobility to an E-UTRAN/from the E-UTRAN in-NR;
UE:
monitors a paging channel;
confirms whether data is reserved by monitoring a control channel associated with a shared data channel;
provides channel quality and feedback information;
performs adjacent cell measurement and measurement reporting; and
acquires SI.

RRC_IDLE State and RRC_INACTIVE State

A UE procedure related to RRC_IDLE state and RRC_INACTIVE state is summarized as shown in Table 18.

TABLE 18

| | UE procedure |
|---|---|
| 1st step | a public land mobile network (PLMN) selection when a UE is switched on |
| 2nd Step | cell (re)selection for searching a suitable cell |
| 3rd Step | tune to its control channel (camping on the cell) |
| 4th Step | Location registration and a RAN-based Notification Area (RNA) update |

PLMN selection, cell reselection procedure, and location registration are common to both RRC_IDLE state and RRC_INACTIVE state.

When the UE is powered on, a PLMN is selected by a non-access stratum (NAS). For the selected PLMN, associated radio access technology (RAT) may be configured. If possible, the NAS should provide an equivalent PLMN list that the AS will use for cell selection and cell reselection.

Through cell selection, the UE searches for a suitable cell of the selected PLMN and selects the cell in order to provide available services. Additionally, the UE should tune to a control channel thereof. This selection is called "camping on the cell".

While the UE is in RRC_IDLE state, three levels of service are provided:
  limited services (emergency calls, ETWS and CMAS in an acceptable cell);
  normal services (for public use in a suitable cell);
  operator services (allowed only for operators in a reserved cell).

The following two levels of services are provided while the UE is in RRC_INACTIVE state.
  normal services (for public use in a suitable cell);
  operator services (allowed only for operators in a reserved cell).

If necessary, the UE registers presence thereof in a tracking area of the selected cell through a NAS registration procedure and a PLMN selected as a result of successful location registration becomes a registered PLMN.

If the UE finds a suitable cell according to a cell reselection criterion, the UE reselects the cell and camps on the cell. If a new cell does not belong to at least one tracking area in which the UE is registered, location registration is performed. In RRC_INACTIVE state, if the new cell does not belong to a configured RNA, an RNA update procedure is performed.

If necessary, the UE should search for a PLMN having a high priority at regular time intervals and search for a suitable cell when the NAS selects another PLMN.

If the UE loses coverage of the registered PLMN, a new PLMN may be automatically selected (automatic mode) or an indication indicating which PLMN is available may be given to the UE so as to make manual selection (manual mode).

Registration is not performed by a UE capable of providing only services that do not require registration.

There are four purposes of camping on cells of RRC_IDLE state and RRC_INACTIVE state.

a) The UE may receive system information from the PLMN.

b) When registration is performed and when the UE tries to establish an RRC connection, this may be performed by first accessing a network via a control channel of a camped cell.

c) Upon receiving a call to a registered UE, the PLMN is aware of (in most cases) a set of tracking areas (RCR_IDLE state) or RNA (RCC_INACTIVE state) on which the UE is camped. A "paging" message may be sent to the UE on control channels of all cells of the area set. The UE may receive a paging message and respond to the paging message.

Three processes that are distinguished from RRC_IDLE state and RRC_INACTIVE state will now be described.

First, a PLMN selection procedure is described.

In the UE, an AS should report, to a NAS, available PLMNs at the request of the NAS or autonomously.

In the PLMN selection procedure, a specific PLMN may be selected automatically or manually based on a priority-based PLMN ID list. Each PLMN in the PLMN ID list is identified by a 'PLMN ID'. In system information of a broadcast channel, the UE may receive one or more 'PLMN IDs' in a given cell. A result of PLMN selection performed by the NAS is an ID of the selected PLMN.

The UE should scan all RF channels in an NR band according to capabilities thereof to find the available PLMNs. On each carrier, the UE should search for the strongest cell and read SI of the cell to find out which PLMN(s) belong to the cell. If the UE can read one or several PLMN IDs in the strongest cell and the following high quality criteria are satisfied, each of the found PLMNs should be reported to the NAS as a high quality PLMN (without RSRP value).

For an NR cell, a measured RSRP value should be −110 dBm or more.

Found PLMNs that do not meet the high quality criteria but have IDs capable of being read by the UE are reported to the NAS along with an RSRP value. A quality measurement value reported to the NAS by the UE should be the same with respect to each PLMN found in one cell.

PLMN search may be stopped at the request of the NAS. The UE may optimize PLMN search using stored information, for example, information about a carrier frequency and optionally information about a cell parameter from a previously received measurement control information element.

If the UE selects a PLMN, the cell selection procedure should be performed to select an appropriate cell of the PLMN on which the UE is to camp.

Next, cell selection and cell reselection will be described.

The UE should perform measurement for the purpose of cell selection and reselection.

The NAS may control RAT for which cell selection should be performed, for example, by indicating RAT associated with the selected PLMN and maintaining a list of forbidden registration area(s) and a list of equivalent PLMNs. The UE should select an appropriate cell based on RRC_IDLE state measurement and cell selection criteria.

To facilitate a cell selection process, the UE may use stored information about several RATs.

Upon camping on a cell, the UE should regularly search for a better cell according to the cell reselection criteria. If a better cell is found, the cell is selected. Change in a cell may mean change in RAT. If received SI related to the NAS is changed due to cell selection and reselection, the UE informs the NAS of change in the SI.

For a normal service, the UE should camp on a suitable cell and tune to control channel(s) of the cell so that the UE may perform the following operations:
  receive SI from the PLMN;
  receive registration area information such as tracking area information from the PLMN; and receive information about another AS and NAS;
If registration is performed, the UE:
  receives paging and notification messages from the PLMN; and
  start transmission in connected mode.

For cell selection, the measurement quantity of a cell depends on UE implementation.

For cell reselection in a multi-beam operation, the UE derives measurement quantity of a cell as follows amongst beams corresponding to the same cell based on an SSB, using the maximum number of beams to be considered and a threshold provided through SystemInformationBlockTypeX.

If a maximum value of beam measurement quantities is below the threshold:
  the UE derives a cell measurement quantity as the highest beam measurement quantity value;
otherwise,
  the UE derives a cell measurement quantity as the linear average of power values up to the maximum number of the highest measurement quantity values above the threshold.

Cell selection is performed by one of the following two procedures.
  a) Initial cell selection (without prior knowledge of which RF channel is an NR carrier);
    1. The UE should scan all RF channels in an NR band according to capabilities thereof to find an appropriate cell.
    2. On each carrier frequency, the UE needs to search for the strongest cell.
    3. Once a suitable cell is found, the UE should select this cell.
  b) The UE selects a cell using stored information.
    1. This procedure requires stored information of a carrier frequency and optionally information about a cell parameter from a previously received measurement control information element or a previously detected cell.
    2. If the UE finds a suitable cell, the UE should select this cell.
    3. If no suitable cell is found, the initial cell selection procedure should be started.

Next, cell reservation and access restriction procedures will be described.

There are two mechanisms which allow an operator to impose cell reservation or access restriction. The first mechanism uses indication of cell status and special reservations for control of cell selection and reselection procedures. The second mechanism, referred to as unified access control, should allow preventing selected access classes or access IDs from sending initial access messages for load control reasons.

Cell status and cell reservation are indicated in an MasterinformationBlock or SystemInformationBlockType1 (SIB1) message by means of three fields below:
  cellBarred (IE type: "barred" or "not barred")
  This field is indicated through the MasterinformationBlock message. In the case of multiple PLMNs indicated in SIB1, this field is common to all PLMNs.
  cellReservedForOperatorUse (IE type: "reserved" or "not reserved")
  This field is indicated through the SystemInformationBlockType1 message. In the case of multiple PLMNs indicated in SIB1, this field is specified per PLMN.
  cellReservedForOtherUse (IE type: "reserved" or "not reserved")
  This field is indicated through the SystemInformationBlockType1 message. In the case of multiple PLMNs indicated in SIB1, this field is common to all PLMNs.

If a cell status is indicated as "not barred" and "not reserved" and indicated as "not reserved" for other use,
  all UEs should treat this cell as a candidate cell during cell selection and cell reselection procedures.
If the cell status is indicated as "reserved" for other use,
  a UE should treat this cell as a cell status of "barred".
If the cell status is indicated as "not barred" and "reserved" for operator use for a PLMN and as "not reserved" for other use,
  a UE allocated to access identity 11 or 15 operating in an HPLMN/EHPLMN should treat this cell as a candidate cell during the cell selection and reselection procedures if a cellReservedForOperatorUse field for the PLMN is set to as "reserved", and
  a UE allocated to an access identity in the range of 12 to 14 should behave as if a cell status is "barred" if the cell is "reserved for operator use" for a registered PLMN or a selected PLMN.

If the cell status "barred" is indicated or treated as if the cell status is "barred",
  the UE is not permitted to select/reselect this cell, not even in an emergency call.
  The UE should select another cell according to the following rule:
  If the cell status is treated as if the cell status is "barred" because MasterinformationBlock or SystemInformationBlockType1 is not obtainable:
  the UE may exclude the barred cell as a candidate for cell selection/reselection for up to 300 seconds.
  If selection criteria are fulfilled, the UE may select another cell in the same frequency.
  Otherwise.
  if an intraFreqReselection field of the MasterinformationBlock message is set to "allowed" and the reselection criteria are fulfilled, the UE may select another cell in the same frequency.
  The UE should exclude the barred cell as a candidate for cell selection/reselection for 300 seconds.
  If the intraFreqReselection field of the MasterinformationBlock message is set to "not allowed", the UE should not reselect a cell in the same frequency as the barred cell.
  The UE should exclude the barred cell and a cell in the same frequency as a candidate for cell selection/reselection for 300 seconds.

Cell selection of another cell may also include a change in RAT.

Information about cell access restrictions associated with access categories and identities is broadcast as SI.

The UE should ignore access category and identity related cell access restrictions for cell reselection. A change in the indicated access restriction should not trigger cell reselection by the UE.

The UE should consider access category and identity related cell access restrictions for NAS initiated access attempts and RAN-based notification area update (RNAU).

Next, tracking area registration and RAN area registration procedures will be described.

In the UE, an AS should report tracking area information to a NAS.

If the UE reads one or more PLMN identities in a current cell, the UE should report the found PLMN identities that make the cell suitable in the tracking area information to the NAS.

The UE transmits the RNAU periodically or when the UE selects a cell that does not belong to a configured RNA.

Next, mobility in RRC_IDLE and RRC_INACTIVE will be described in more detail.

PLMN selection in NR is based on 3GPP PLMN selection rules. Cell selection is required upon transition from RM-DEREGISTERED to RM-REGISTERED, from CM-IDLE to CM-CONNECTED, or from CM-CONNECTED to CM-IDLE, based on the following rules.

- A UE NAS layer identifies a selected PLMN and equivalent PLMNs of the selected PLMN.
- The UE scans NR frequency bands and identifies the strongest cell for each carrier frequency. The UE reads broadcast SI of the cell to identify a PLMN.
- The UE may sequentially scan each carrier ("initial cell selection") or use stored information to shorten search ("stored information cell selection").
- The UE tries to identify a suitable cell; if no suitable cell can be identified, the UE tries to identify an acceptable cell. If a suitable cell is found or only an acceptable cell is found, the UE starts to camp on the corresponding cell and begins a cell reselection procedure.
- The suitable cell is a cell in which measured cell attributes satisfy cell selection criteria. A cell PLMN is a selected PLMN, or a registered or equivalent PLMN; the cell is not barred or reserved, and the cell is not part of a tracking area which is on the list of "forbidden tracking areas for roaming"
- The acceptable cell is a cell, measured cell attributes of which satisfy the cell selection criteria, and the cell is not barred;

Transition to RRC_IDLE:

Upon transition from RRC_CONNECTED to RRC_IDLE, the UE camps on the last cell/any cell of a cell set, which has been in RRC_CONNECTED, according to a frequency allocated by RRC in a cell/state transition message.

Recovery from out-of-coverage:

The UE should attempt to find a suitable cell in the manner described for the stored information or initial cell selection. If no suitable cell is found in any frequency or RAT, the UE should attempt to find an acceptable cell.

In a multi-beam operation, cell quality is derived amongst beams corresponding to the same cell.

The UE of RRC_IDLE performs cell reselection. The principle of the procedure is as follows.

- The UE measures attributes of serving and neighboring cells to enable a reselection process
- For search and measurement of inter-frequency neighboring cells, only carrier frequencies need to be indicated.
- Cell reselection identifies a cell that the UE should camp on. Cell reselection is based on cell reselection criteria which involves measurement of serving and neighboring cells:
- Intra-frequency reselection is based on ranking of cells;
- Inter-frequency reselection is based on absolute priorities at which the UE attempts to camp on the highest priority frequency available;
- An NCL may be provided by the serving cell to handle a specific case for intra-frequency and inter-frequency neighboring cells.
- A blacklist may be provided to prevent the UE from reselecting specific intra-frequency and inter-frequency neighboring cells.
- Cell reselection may be speed dependent;
- Service specific prioritization.

In multi-beam operation, cell quality is derived amongst beams corresponding to the same cell.

RRC_INACTIVE is a state in which the UE remains CM-CONNECTED state and may move within an area configured by an NG-RAN (an RNA) without notifying the NG-RAN. In RRC_INACTIVE, the last serving gNB node maintains UE context and UE associated NG connection with a serving AMF and UPF.

If the last serving gNB receives DL data from the UPF or a DL signal from the AMF while the UE is in RRC_INACTIVE, the UE pages in a cell corresponding to the RNA and may transmit Xn application protocol (XnAP) RAN paging to a neighboring gNB if the RNA includes cells of neighboring gNB(s), The AMF provides RRC inactive assistance information to the NG-RAN node to assist the NG-RAN node in determining whether the UE may transition to RRC_INACTIVE. The RRC inactive assistance information includes a registration area configured for the UE, UE-specific DRX, a periodic registration update timer, an indication if the UE is configured in mobile initiated connection only (MICO) mode by the AMF, and a UE ID index value. The UE registration area is considered by the NG-RAN node when configuring the RAN based notification area. The UE-specific DRX and the UE ID index value are used by the NG-RAN node for RAN paging. The periodic registration update timer is considered to configure a periodic RAN notification area update timer in the NG-RAN node.

In transitioning to RRC_INACTIVE, the NG-RAN node may configure the UE with a periodic RNA update timer value.

If the UE accesses a gNB other than the last serving gNB, a receiving gNB may trigger an XnAP retrieve UE context procedure to obtain a UE context from the last serving gNB and trigger a data delivery procedure including tunnel information for potential recovery of data from the last serving gNB. Upon performing successful context retrieval, the receiving gNB becomes a serving gNB and further triggers an NG application protocol (NGAP) path switch request procedure. After the path switch procedure, the serving gNB triggers release of the UE context in the last serving gNB by the XnAP UE context release procedure.

If the UE accesses a gNB other than the last serving gNB and the receiving gNB fails to find a valid UE context, the gNB performs establishment of a new RRC connection instead of resumption of a previous RRC connection.

The UE in RRC_INACTIVE state is required to initiate an RNA update procedure when the UE moves out of the configured RNA. Upon receiving an RNA update request from the UE, the receiving gNB may decide to send the UE back to the RRC_INACTIVE state, move the UE to the RRC_CONNECTED state, or transition the UE to RRC_IDLE.

The UE in RRC_INACTIVE performs cell reselection. The principle of the procedure is the same as for RRC_IDLE state.

Discontinuous Reception (DRX)

A UE procedure related to DRX may be summarized as shown in Table 19.

TABLE 19

| | Type of signals | UE produre |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

Figure 31:
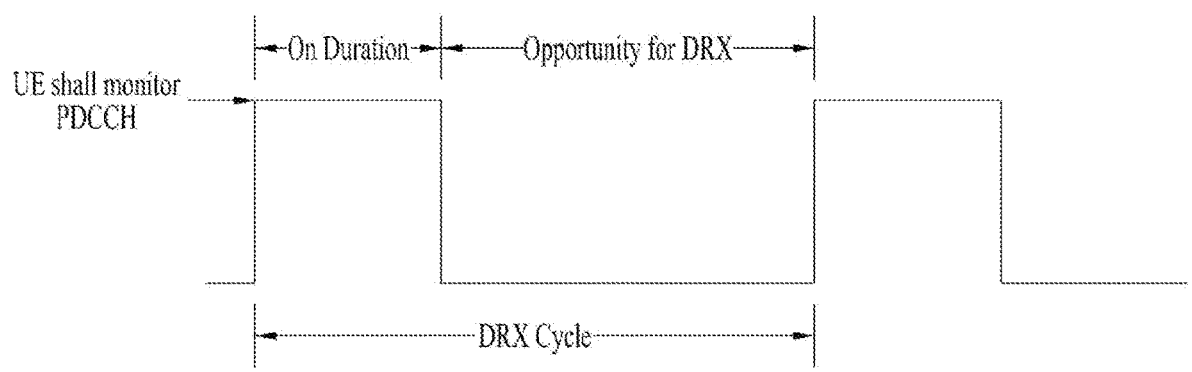
FIG. 31 illustrates a DRX cycle to which embodiment(s) are applicable.

FIG. 31 illustrates a DRX cycle.

The UE uses DRX in RRC_IDLE and RRC_INACTIVE states to reduce power consumption.

If DRX is configured, the UE performs a DRX operation according to DRX configuration information.

The UE acting as DRX repeatedly turns on and off a receive operation.

For example, if DRX is configured, the UE attempts to receive a PDCCH, which is a DL channel, only for a predetermined time duration and does not attempt to receive the PDCCH for the other time duration. In this case, a duration during which the UE should attempt to receive the PDCCH is called an on-duration and this on-duration is defined once every DRX cycle.

The UE may receive DRX configuration information from the gNB through RRC signaling and operate as DRX through reception of a (long) DRX command MAC CE.

The DRX configuration information may be included in MAC-CellGroupConfig.

The information element (IE) MAC-CellGroupConfig is used to configure MAC parameters for a cell group including DRX.

Table 20 and Table 21 are examples of the IE MAC-CellGroupConfig.

TABLE 20

```
-- ASN1START
-- TAG-MAC-CELL-GROUP-CONFIG-START
MAC-CellGroupConfig ::=        SEQUENCE {
    drx-Config                 SetupRelease { DRX-Config }                          OPTIONAL, -- Need M
    schedulingRequestConfig    SchedulingRequestConfig                              OPTIONAL, -- Need M
    bsr-Config                 BSR-Config                                           OPTIONAL, -- Need M
    tag-Config                 TAG-Config                                           OPTIONAL, -- Need M
    phr-Config                 SetupRelease { PHR-Config }                          OPTIONAL, -- Need M
    skipUplinkTxDynamic        BOOLEAN,
    cs-RNTI                    SetupRelease { RNTI-Value }                          OPTIONAL-- Need M
}
DRX-Config ::=                 SEQUENCE {
    drx-onDurationTimer        CHOICE {
        subMilliSeconds        INTEGER (1..31),
        milliSeconds           ENUMERATED {
            ms1, ms2, ms3, ms4, ms5, ms6, ms8, ms10, ms20,
ms30, ms40, ms50, ms60, ms80, ms100, ms200, ms300, ms400, ms500, ms600, ms800,
ms1000, ms1200, ms1600, spare9, spare8, spare7, spare6, spare5, spare4, spare3, spare2,
spare1}
    },
    drx-InactivityTimer        ENUMERATED {
            ms0, ms1, ms2, ms3, ms4, ms5, ms6, ms8, ms10,
ms20, ms30, ms40, ms50, ms60, ms80, ms100, ms200, ms300, ms500, ms750, ms1280,
ms1920, ms2560, spare9, spare8, spare7, spare6, spare5, spare4, spare3, spare2, spare1},
    drx-HARQ-RTT-TimerDL       INTEGER (0..56),
    drx-HARQ-RTT-TimerUL       INTEGER (0..56),
    drx-RetransmissionTimerDL  ENUMERATED {
            sl0, sl1, sl2, sl4, sl6, sl8, sl16, sl24, sl33, sl40,
sl64, sl80, sl96, sl112, sl128, sl160, sl320, spare15, spare14, spare13, spare12, spare11,
spare10, spare9, spare8, spare7, spare6, spare5, spare4, spare3, spare2, spare1},
    drx-RetransmissionTimerUL  ENUMERATED {
            sl0, sl1, sl2, sl4, sl6, sl8, sl16, sl24, sl33, sl40,
sl64,
sl80, sl96, sl112, sl128, sl160, sl320, spare15, spare14, spare13, spare12, spare11,
spare10,
spare9, spare8, spare7, spare6, spare5, spare4, spare3, spare2, spare1 },
    drx-LongCycleStartOffset   CHOICE {
        ms10                   INTEGER(0..9),
        ms20                   INTEGER(0..19),
        ms32                   INTEGER(0..31),
        ms40                   INTEGER(0..39),
        ms60                   INTEGER(0..59),
        ms64                   INTEGER(0..63),
```

TABLE 20-continued

```
        ms70                  INTEGER(0..69),
        ms80                  INTEGER(0..79),
        ms128                 INTEGER(0..127),
        ms160                 INTEGER(0..159),
        ms256                 INTEGER(0..255),
        ms320                 INTEGER(0..319),
        ms512                 INTEGER(0..511),
        ms640                 INTEGER(0..639),
        ms1024                INTEGER(0..1023),
        ms1280                INTEGER(0..1279),
        ms2048                INTEGER(0..2047),
        ms2560                INTEGER(0..2559),
        ms5120                INTEGER(0..5119),
        ms10240               INTEGER(0..10239)
    },
    shortDRX                  SEQUENCE {
        drx-ShortCycle            ENUMERATED {
            ms2, ms3, ms4, ms5, ms6, ms7, ms8,
ms10, ms14, ms16, ms20, ms30, ms32, ms35, ms40, ms64, ms80, ms128, ms160, ms256,
ms320, ms512, ms640, spare9,spare8, spare7, spare6, spare5, spare4, spare3, spare2,
spare1 },
        drx-ShortCycleTimer       INTEGER (1..16)
    }              OPTIONAL,                              -- Need R
    drx-SlotOffset            INTEGER (0..31)
}
```

TABLE 21

MAC-CellGroupConfig field descriptions drx-Config
Used to configure DRX.
drx-HARQ-RTT-TimerDL
Value in number of symbols.
drx-HARQ-RTT-TimerUL
Value in number of symbols.
drx-Inactivity Timer
Value in multiple integers of 1 ms. ms 0 corresponds to 0, ms 1
corresponds to 1 ms, ms 2 corresponds to 2 ms, and so on.
drx-onDuration Timer
Value in multiples of 1/32 ms (subMilliSeconds)
or in ms (milliSecond). For the latter, ms 1 corresponds to 1 ms,
ms 2 corresponds to 2 ms, and so on.
drx-LongCycleStart Offset
drx-LongCycle in ms and drx-StartOffset in multiples of 1ms.
drx-RetransmissionTimerDL
Value in number of slot lengths. sl1 corresponds to 1 slot,
s 12 corresponds to 2 slots, and so on.
drx-RetransmissionTimerUL
Value in number of slot lengths. sl1 corresponds to 1 slot,
s 12 corresponds to 2 slots, and so on.
drx-ShortCycle
Value in ms. ms1 corresponds to 1 ms, ms 2
corresponds to 2 ms, and so on.
drx-ShortCycleTimer
Value in multiples of drx-ShortCycle. A value of 1
corresponds to drx-ShortCycle, a value of 2
corresponds to 2 * drx-ShortCycle and so on.
drx-Slot Offset
Value in 1/32 ms. Value 0 corresponds to 0 ms, value 1
corresponds to 1/32 ms, value 2 corresponds to 2/32 ms, and so on.

drx-onDurationTimer is the duration at the beginning of a DRX cycle.

drx-SlotOffset is slot delay before starting drx-onDurationTimer.

drx-StartOffset is a subframe in which the DRX cycle is started.

drx-InactivityTimer is the duration after PDCCH occasion, indicating initial UL or DL user data transmission for a MAC entity.

drx-RetransmissionTimerDL (per DL HARQ process) is a maximum duration until DL retransmission is received.

drx-RetransmissionTimerUL (per UL HARQ process) is a maximum duration until a grant for UL retransmission is received.

drx-LongCycle is a long DRX cycle.

drx-ShortCycle (optional) is a short DRX cycle.

drx-ShortCycleTimer (optional) is a duration during which the UE should follow the short DRX cycle.

drx-HARQ-RTT-TimerDL (per DL HARQ process) is a minimum duration before DL assignment for HARQ retransmission is expected by the MAC entity.

drx-HARQ-RTT-TimerUL (per UL HARQ process) is a minimum duration before a UL HARQ retransmission grant is expected by the MAC entity.

A DRX command MAC CE or a long DRX command MAC CE is identified by a MAC PDU lower header with a logical channel ID (LCID). A fixed size is 0 bits.

Table 5 shows an example of an LCID value for a DL-SCH.

TABLE 22

| Index | LCID values |
| --- | --- |
| 111011 | Long DRX Command |
| 111100 | DRX Command |

PDCCH monitoring activity of the UE is managed by DRX and BA.

When DRX is configured, the UE does not need to continuously monitor the PDCCH.

DRX has the following features:
on-duration: duration that the UE waits for, after waking up, to receive the PDCCH. If the UE successfully decodes the PDCCH, the UE stays awake and starts an inactivity timer;
inactivity-timer: duration in which the UE waits to successfully decode the PDCCH from the last successful decoding of the PDCCH. If the UE fails to decode the PDCCH, the UE may go back to sleep. The UE should restart the inactivity timer following single successful decoding of the PDCCH for first transmission only (i.e., not for retransmission);

retransmission timer: duration until retransmission is expected;

cycle: specifies periodic repetition of an on-duration and a period of inactivity.

Next, DRX described in the MAC layer will be described. The MAC entity used hereinafter may be represented as a UE or a MAC entity of the UE.

The MAC entity may be configured by RRC with DRX functionality that controls PDCCH monitoring activity of the UE for a C-RNTI, a CS-RNTI, a TPC-PUCCH-RNTI, a TPC-PUSCH-RNTI, and a TPC-SRS-RNTI of the MAC entity. When using DRX operation, the MAC entity should monitor the PDCCH. When the MAC entity is in RRC_CONNECTED, if DRX is configured, the MAC entity may discontinuously monitor the PDCCH using the DRX operation; otherwise, the MAC entity should constantly monitor the PDCCH.

RRC controls the DRX operation by configuring parameters in Table 3 and Table 4 (DRX configuration information).

If the DRX cycle is configured, Active Time includes the time while:

drx-onDurationTimer or drx-InactivityTimer or drx-RetransmissionTimerDL or drx-RetransmissionTimerUL or ra-ContentionResolutionTimer is running; or a scheduling request is sent on PUCCH and is pending; or a PDCCH indicating new transmission addressed to the C-RNTI of the MAC entity has not been received after successful reception of an RAR for a random access preamble not selected by the MAC entity among contention-based random access preambles.

If the DRX is configured, the MAC entity should perform operation as shown in Table 23 below.

TABLE 23

1> if a MAC PDU is transmitted in a configured uplink grant:
2> start the drx-HARQ-RTT-TimerUL for the corresponding HARQ process immediately after the first repetition of the corresponding PUSCH transmission;
2> stop the drx-RetransmissionTimerUL for the corresponding HARQ process.
1> if a drx-HARQ-RTT-TimerDL expires:
2> if the data of the corresponding HARQ process was not successfully decoded:
3> start the drx-RetransmissionTimerDL for the corresponding HARQ process.
1> if a drx-HARQ-RTT-TimerUL expires:
2> start the drx-RetransmissionTimerUL for the corresponding HARQ process.
1> if a DRX Command MAC CE or a Long DRX Command MAC CE is received:
2> stop drx-onDurationTimer;
2> stop drx-InactivityTimer.
1> if drx-InactivityTimer expires or a DRX Command MAC CE is received:
2> if the Short DRX cycle is configured:
3> start or restart drx-ShortCycleTimer;
3> use the Short DRX Cycle.
2> else:
3> use the Long DRX cycle.
1> if drx-ShortCycle Timer expires:
2> use the Long DRX cycle.
1> if a Long DRX Command MAC CE is received:
2> stop drx-ShortCycle Timer;
2> use the Long DRX cycle.
1> if the Short DRX Cycle is used, and
[(SFN x 10) + subframe number]modulo (drx-ShortCycle) = (drx-StartOffset) modulo (drx-ShortCycle); or
1> if the Long DRX Cycle is used, and
[(SFN x 10) + subframe number]modulo (drx-LongCycle) = drx-StartOffset:

TABLE 23-continued

2> if drx-SlotOffset is configured:
3> start drx-onDurationTimer after drx-SlotOffset.
2> else:
3> start drx-onDurationTimer.
1> if the MAC entity is in Active Time:
2> monitor the PDCCH;
2> if the PDCCH indicates a DL transmission or if a DL assignment has been configured:
3> start the drx-HARQ-RTT-TimerDL for the corresponding HARQ process immediately after the corresponding PUCCH transmission;
3> stop the drx-RetransmissionTimerDL for the corresponding HARQ process.
2> if the PDCCH indicates a UL transmission:
3> start the drx-HARQ-RTT-TimerUL for the corresponding HARQ process immediately after the first repetition of the corresponding PUSCH transmission;
3> stop the drx-RetransmissionTimerUL for the corresponding HARQ process.
2> if the PDCCH indicates a new transmission (DL or UL):
3> start or restart drx-InactivityTimer.
1> else (i.e. not part of the Active Time):
2> not transmit type-0-triggered SRS.
1> if CQI masking (cqi-Mask) is setup by upper layers:
2> if drx-onDurationTimer is not running:
3> not report CSI on PUCCH.
1> else:
2> if the MAC entity is not in Active Time:
3> not report CSI on PUCCH.

Regardless of whether the MAC entity is monitoring the PDCCH, the MAC entity transmits HARQ feedback and a type 1 trigger SRS when such signals are expected.

The MAC entity does not need to monitor the PDCCH if the MAC entity is not a complete PDCCH occasion (e.g., the active time starts or expires in the middle of a PDCCH occasion).

Next, DRX for paging will be described.

The UE may use DRX in RRC_IDLE and RRC_INACTIVE states in order to reduce power consumption. The UE monitors one paging occasion (PO) per DRX cycle, and one PO may consist of multiple time slots (e.g., subframes or OFDM symbols) in which paging DCI may be transmitted. In a multi-beam operation, the length of one PO is one cycle of beam sweeping and the UE may assume that the same paging message is repeated in all beams of a sweeping pattern. The paging message is the same for both RAN initiated paging and CN initiated paging.

One paging frame (PF) is one radio frame that may include one or multiple POs.

Upon receiving RAN paging, the UE initiates an RRC connection resumption procedure. Upon receiving CN initialized paging in RRC_INACTIVE state, the UE transitions to RRC_IDLE to notify a NAS.

When UEs supporting V2X communication perform sidelink communication, the UEs need to perform automatic gain control (AGC) operation to receive information. The AGC operation is in charge of maintaining a signal at a constant amplitude level and thus performed first during signal processing. In LTE V2X, among 14 OFDM symbols of one subframe, the first symbol is used for the AGC. The AGC is required for both control and data channels, and the time required for the AGC may vary depending on the modulation order (hereinafter, the time required for the AGC is referred to as an AGC time, the control channel is referred to as a PSCCH, and the data channel is referred to as a PSSCH). For example, if the modulation order of the PSCCH is QPSK and higher-order modulation (e.g., 16-QAM) is used for the PSSCH, the AGC time of the PSCCH may be different from that of the PSSCH.

When the UE selects a transmission pattern from among a plurality of resource pattern(s) configured (or preconfigured) by the BS, the UE may perform resource sensing and then select one or more patterns (i.e., resources to be transmitted) based on sensing results in order to prevent transmission resource collisions with other UEs. The sensing and resource selection process may be performed based on the latency requirement, reliability requirement, and/or periodicity of information that the UE intends to transmit.

The UE may perform sidelink communication even in the RRC idle or inactive state. When the UE is in the RRC idle or inactive state, the UE may receive a configuration for sidelink communication through an SIB. When the UE is in an RRC connected state, the UE may dynamically receive an instruction from the network. When performing sidelink communication, the UE may determine its status through the above process and receive a different sidelink configuration depending on each status. Hereinafter, it is assumed that what is commonly applied to UEs is configured by the SIB and upon receiving appropriate configurations as described above, the UEs perform sidelink transmission/reception operations.

If mobile UEs use a fixed transmission parameter or a fixed feedback method while rapidly changing their paths or rapidly increasing/decreasing their speeds, the efficiency may be degraded. In the case of a vehicle, since various sensors are installed therein, information about the position, movement speed, acceleration, direction, and movement trajectory of the UE may be obtained. In addition, if information about the position, movement speed, acceleration, direction, and movement trajectory of another vehicle is obtained based on V2X communication, the UE may obtain the relative movement speed, relative acceleration, relative position, relative distance, and relative trajectory change. Hereinafter, a method of effectively performing estimation and acquisition of channel state information (CSI) in direct communication between UEs, particularly, inter-vehicle communication or vehicle-to-object communication and a method of effectively adjusting a transmission parameter will be described.

Embodiments

Figure 32:
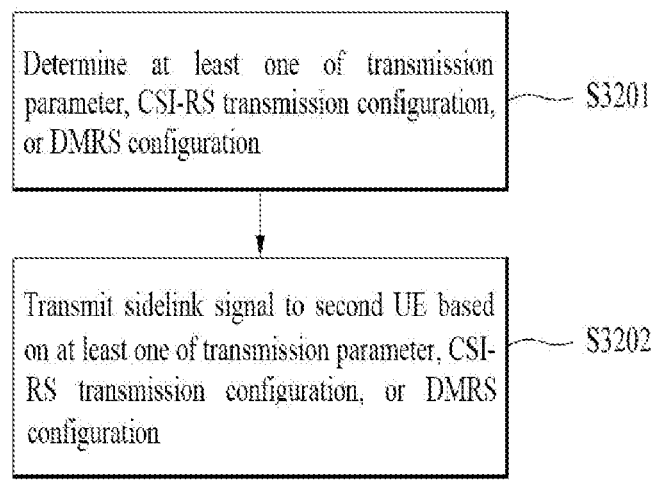
FIG. 32 is a flowchart for explaining embodiment(s).

According to an embodiment of the present disclosure, a first UE may determine at least one of a transmission parameter, a CSI-RS transmission configuration, or a DMRS configuration (S3201 in FIG. 32) and then transmit a sidelink signal to a second UE based on the at least one of the transmission parameter, CSI-RS transmission configuration, or DMRS configuration (S3202 of FIG. 32). Based on establishment of a unicast connection with the second UE, the first UE may determine a first value corresponding to the relative difference from the second UE by using information included in a message from the second UE (including sensor information from the second UE) and sensor information. The first UE may determine/change the at least one of the transmission parameter, CSI-RS transmission configuration, or DMRS configuration based on the first value. The first value may correspond to one of a relative speed/acceleration, a relative distance/distance change, and a relative position/position change. The message from the second UE may correspond to at least one of a basic safety message (BSM), a cooperative awareness message (CAM), or a decentralized notification message (DENM). The message from the second UE may include at least one of a speed, an acceleration, a location, an altitude, a direction, a distance (relative distance), a trajectory (relative trajectory change), a lane (lane change), a congestion level, or a channel busy ratio (CBR). The sensor information may include at least one of a speed, an acceleration, a location, an altitude, a direction, a distance (relative distance), a trajectory (relative trajectory change), a lane (lane change), a congestion level, or a CBR. Based on the first value, the transmission parameter, CSI-RS transmission configuration, or DMRS configuration may be exchanged/configured through signaling (e.g., PC5 RRC signaling) predefined between the UEs.

It is assumed that if a UE performs unicast, the UE receives a BSM, CAM, or DENM from another UE that the UE communicates with. Before establishment of unicast association, each UE may configure a transmission parameter, CSI-RS configuration, or DMRS configuration based on its own sensor information. Before establishing a unicast session, such a UE may be considered a broadcast UE. After establishing the unicast session, the UE may predict the relative speed/acceleration, relative distance/distance change, relative position/position change, etc. based on the BSM or CAM transmitted by the other (peer) UE. Based on the relative state changes, the UE may change the transmission parameter (e.g., transmission power and resource amount), CSI-RS transmission configuration (e.g., RS configuration and transmission period), and DMRS configuration (e.g., the number of DMRSs per slot) of the UE.

That is, after establishing the unicast connection with the second UE, the first UE may calculate/compute/derive/determine the first value corresponding to the relative speed/acceleration, relative distance/distance change, and/or relative position/position change with the second UE based on its own sensor information and the sensor information of the second UE, which is transmitted from the second UE. Thereafter, the first UE may determine/change the at least one of the transmission parameter, CSI-RS transmission configuration, or DMRS configuration based on the first value. The UE may change the DMRS configuration or CSI-RS configuration in consideration of the relative speed or relative trajectory difference from the peer UE communicating with the UE, rather than the absolute speed of the UE. For example, if a vehicle changes its lane or direction rapidly, the channel condition may suddenly deteriorate due to the occurrence of vehicle blockage. Similarly, the CSI-RS transmission period and DMRS density may vary depending on the speed of the vehicle, the change in the direction, and the change in the lane. In this case, if the UE is capable of obtaining changes in the moving speed and direction of another vehicle that the UE communicates with, the UE may change the CSI-RS transmission configuration and DMRS transmission configuration based on the changes.

To this end, the network may signal to the UE the CSI-RS transmission configuration (candidate) and/or DMRS transmission configuration (candidate) based on the relative speed/acceleration, relative distance/distance change, relative position/position change, etc. through physical layer or higher layer signaling. In other words, the network may indicate how to configure the CSI-RS configuration and DMRS configuration based on the relative speed/acceleration, relative distance/distance change, relative position/position change, etc.

If the transmission parameter, CSI-RS configuration, and/or DMRS configuration are changed based on the relative value with another UE as described above, limitations of using the absolute speed may be overcome. Specifically, when the number of DMRSs per slot, the CSI-RS configuration, and/or the transmission period are changed based on the absolute vehicle speed, resource waste may occur between UEs moving in similar directions. This is because it is expected that even if UEs move at high speeds, there will be no significant change in a radio channel between the UEs moving at similar speeds in similar directions. For example, if two vehicles form a platoon and continuously move at regular intervals on the same trajectory, the quality of a radio channel is expected to be very good and stable. In this case, even though the vehicles move quickly, it is not desirable to use DMRS and CSI-RS configurations capable of handling high Doppler spread. Accordingly, the UE may configure its DMRS configuration or CSI-RS configuration in consideration of changes in the relative speed/acceleration, relative position, and relative distance with the peer UE to communicate with.

According to the above configuration, the transmission parameter may be configured based on information provided by vehicle sensors such as the speed, direction, and trajectory change, and feedback may be efficiently provided. Thus, UEs may effectively exchange CSI, thereby improving decoding performance in UE-to-UE communication. Further, channel quality between UEs may be effectively measured in unicast or groupcast communication, thereby effectively configuring the transmission parameter (e.g., MCS, power, RB size, etc.) and reducing transmission of excessive CSI-RSs or use of DMRSs with high density. In summary, the reception rate may be improved compared to resource usage so that overall system performance may be improved.

If the UE establishes no unicast connection with a specific UE, the UE may determine a second value corresponding to relative differences from a plurality of UEs based on the sensor information and one of the minimum, average, maximum, and weight values of information in messages received from the plurality of UEs. Thereafter, the UE may determine the at least one of the transmission parameter, CSI-RS transmission configuration, and DMRS configuration based on the second value. Specifically, while the UE performs groupcast or broadcast, the UE may have a plurality of UEs that will receive a corresponding packet. In this case, the UE may change the CSI-RS transmission configuration and DMRS configuration based on a speed, distance, and/or position change for the average, maximum, or minimum value of BSMs or CAMs received from the peer UEs (the plurality of UEs) or based on a speed, distance, and/or position change for a value obtained by multiplying the maximum value with a predetermined constant. For example, for the groupcast, if the UE receives CAMs, BSMs, etc. from receiving UEs in a group, the UE may measure the relative speed/acceleration, relative distance/distance change, and relative position/position change with respect to the UEs and then change the DMRS configuration and CSI-RS transmission configuration based on the maximum value thereof.

In addition, the first UE may receive a transmission parameter, a CSI-RS transmission configuration, or a DMRS configuration depending on the average relative speed, average distance, and average moving trajectory in a specific area for each resource pool, bandwidth part, or carrier through physical layer or higher layer signaling. In other words, the network may signal to the UE the transmission parameter, CSI-RS configuration, or DMRS configuration depending on the average relative speed, average distance, and average movement trajectory in the specific area for each resource pool, bandwidth part, or carrier through the physical layer or higher layer signaling.

To this end, the first UE may transmit to the BS at least one of the average relative speed, average relative acceleration, or average distance of other UEs communicating with the first UE, the average number of UEs performing communication, CSI variation, or MCS variation through physical layer or higher layer signaling. That is, the UE may signal to the network or BS information about the average relative speed, average relative acceleration, or average distance of UE(s) communicating with the UE, the average number of UEs performing communication (some or all of the above-described information) through a physical layer or higher layer signal. Based on this feedback, the network may recognize that UEs are communicating with each other at which distance and at which speed in a specific area around a specific BS. Accordingly, the network may determine the transmission power, transmission resource size, retransmission count setting, CSI-RS transmission configuration, and/or DMRS transmission configuration.

When the first UE is a Mode 1 UE, the BS may transmit the at least one of the transmission parameter, CSI-RS transmission configuration, or DMRS configuration through physical layer or higher layer signaling. In this case, the physical layer or higher layer signaling may be overheard by a Mode 2 UE. Specifically, in Mode 2 (when the UE autonomously determines transmission resources), it may be difficult to periodically secure CSI-RS transmission resources, and thus a specific resource may be periodically reserved for CSI-RS transmission. However, when other UEs abruptly use many resources, it may be difficult to effectively secure the periodic transmission resources. The BS/network may inform a Mode 2 UE of configuration information related to the Mode 1 UE through additional (physical layer/higher layer) signaling.

In Mode 1 (when the network determines transmission resources for direct communication between UEs), the network may configure periodic CSI-RS transmission resources for a specific UE. In this case, neighboring Mode 2 UEs need to know the corresponding fact to avoid selecting the CSI-RS transmission resources. To this end, the network may configure a CSI-RS resource or a CSI-RS resource set for CSI-RS transmission through a physical layer or higher layer signal. The CSI-RS transmission resources signaled by the network may be periodically configured (periodic CSI-RS transmission). In this case, the CSI-RS transmission resources are for a CSI-RS configured for sidelink communication. That is, the CSI-RS transmission resources are not for the network to directly transmit a CSI-RS. The network may signal that a specific UE will transmit the CSI-RS to neighboring UEs to prevent UEs in the network coverage from invading or overlapping the CSI-RS resource. As another example, the network may configure resource information for CSI-RS transmission and at the same time, transmit to neighboring UEs information on from which UE each CSI-RS is transmitted through a physical layer or higher layer signal. Information on the resource configuration may be shared by BSs through backhaul between adjacent cells and also be signaled to UEs performing sidelink communication in other cells. As another method, information about the CSI-RS configuration for a specific Mode 1 UE may be signaled to other Mode 1 UEs and/or other receiving UEs through a physical layer or higher layer signal. Specifically, it may be interpreted to mean that the network signals to neighboring UEs which UE transmits the CSI-RS through which RS in the CSI-RS resource or the network directly signals CSI-RS information for the specific mode 1 UE to other Mode 1 UEs. According to the above method, if two specific UEs perform unicast and both UEs operate in Mode 1, there is an advantage in that the network configures all sidelink transmission and reception resources. In addition, considering that the CSI-RS may be used to measure interference, Mode 2 UEs receiving interference from Mode 1 UEs may determine which UEs transmit a Mode 1 CSI-RS in the cell to avoid use of corresponding resources or effectively measure interference based on the corresponding CSI-RS configuration information.

In order for the network to configure the CSI-RS configuration to a specific Mode 1 UE or neighboring UEs, a Mode 1 UE needs to report to the network information about the relative speed/acceleration, relative distance/distance change, relative position/position change, etc. with respect to another UE communicating the Mode 1 UE. The UE may feed back information obtained by vehicle sensors and V2X communication, but the UE may also report CSI variation or MCS variation. Alternatively, the UE may feed back to the network CSI feedback information, which is fed back from the peer UE. Based on this, the gNB may properly configure CSI-RS transmission resource.

In the above description, the CSI-RS transmission configuration may include the configuration of a CSI-RS transmission period and pattern, the DMRS configuration may include the configuration of the number and pattern of DMRSs per slot, and the transmission parameter may include at least one of transmission power, a transmission resource size, or a retransmission count setting. For example, the number of DMRSs per slot or the transmission period of the CSI-RS may vary according to the speed of a vehicle.

The proposed method may be used not only for vehicle-to-vehicle communication but also for vehicle-to-pedestrian communication and vehicle-to-BS or fixed node communication. For example, for communication with the BS, the position and speed of a peer receiver may be regarded as fixed. The difference from the existing Uu operation is that CSI-RS, DMRS, and SRS configurations are not directly configured by the BS, but the UE adaptively changes specific parameters (CSI-RS transmission configuration, DMRS configuration, etc.) according to the relative speed and relative position change with the BS.

In the embodiment(s), the details and/or embodiments may be considered as one proposed method, and any combination of details and/or embodiments may also be considered as a new proposed method. In addition, it is apparent that the details shall not be limited only to the embodiment(s) nor be limited only to a specific system. All parameters, all operations, any combination of parameters and/or operations, the application of a specific parameter and/or operation, and/or the application of any combination of parameters and/or operations may be configured (or preconfigured) by the BS for the UE through higher layer signaling and/or physical layer signaling or may be predefined in the system. Additionally, each detail of the embodiment(s) may be defined as one operation mode, and the BS may configure (or preconfigure) one of the operation modes for the UE through higher layer signaling and/or physical layer signaling to enable the UE to operate in the corresponding operation mode. In the embodiment(s), a TTI or a resource unit for signal transmission may correspond to units with various lengths such as a sub-slot/slot/subframe, a basic transmission unit, and so on. In the embodiment(s), the UE may correspond to various types of devices such as a vehicle, a pedestrian UE, and so on. In the embodiment(s), the operations of the UE, the operations of the BS, and/or the operations of the road side unit (RSU) may be performed by different types of devices without being limited to each device type. For example, the operations performed by the BS in the embodiment(s) may be applied to UE operations. Among the details of the embodiment(s), the details of communication between UEs may be used for communication between the UE and the BS (for example, UL or DL communication). In this case, the proposed methods may be applied to communication between the UE and the BS, the relay node, or a special type of UE such as a UE-type RSU or communication between specific types of wireless devices. In the above description, the BS may be replaced by the relay node and/or UE-type RSU.

The present disclosure is not limited to communication between UEs. That is, the present disclosure may be applied to UL or DL communication, and in this case, the proposed methods may be used by the BS, the relay node, etc.

It is obvious that each of the examples of the proposed methods may also be included as one implementation method, and thus each example may be regarded as a kind of proposed method. Although the proposed methods may be implemented independently, some of the proposed methods may be combined (or merged) for implementation. In addition, it may be regulated that information on whether the proposed methods are applied (or information on rules related to the proposed methods) should be transmitted from a BS to a UE or from a transmitting UE to a receiving UE through a predefined signal (e.g., a physical layer signal, a higher layer signal, etc.).

Device Configuration According to Embodiment(s)

Hereinafter, a device to which the present disclosure is applicable will be described.

Figure 33:
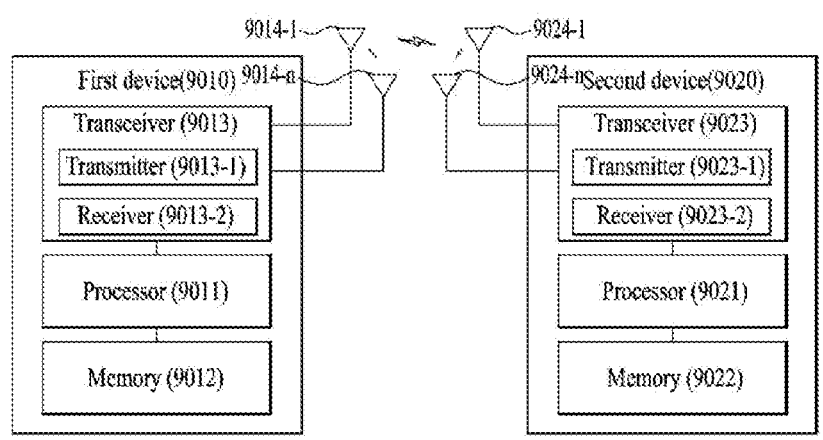
FIGS. 33 to 39 are diagrams for explaining various devices to which embodiment(s) are applicable.

FIG. 33 illustrates a wireless communication device according to an embodiment.

Referring to FIG. 33, the wireless communication system may include a first device 9010 and a second device 9020.

The first device 9010 may be a BS, a network node, a Tx UE, an Rx UE, a wireless device, a wireless communication device, a vehicle, a vehicle having an autonomous traveling function, a connected car, an unmanned aerial vehicle (UAV), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or a financial device), a security device, a weather/environment device, a device related to a 5G service, or a device related to fourth industrial revolution.

The second device 9020 may be a BS, a network node, a Tx UE, an Rx UE, a wireless device, a wireless communication device, a vehicle, a vehicle having an autonomous traveling function, a connected car, a UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to fourth industrial revolution.

The UE may include, for example, a cellular phone, a smartphone, a laptop computer, a digital broadcast terminal, a personal digital assistant (PDA), a portable multimedia player (PMP), a navigation system, a slate PC, a tablet PC, an ultrabook, a wearable device (e.g., a smartwatch, smartglasses, or a head mounted display (HMD)), and the like. The HMD may be, for example, a type of display device that is worn on the head. For example, the HMD may be used to implement VR, AR, or MR.

The UAV may be, for example, an aircraft without a human being onboard, which aviates by a wireless control signal. The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device that implements a stereoscopic image of 360 degrees by recording and reproducing stereoscopic information, using an interference phenomenon of light that is generated by two laser beams meeting each other which is called holography. The public safety device may include, for example, an image relay device or an image device that is wearable on the body of a user. The MTC device and the IoT device may be, for example, devices that do not require direct human intervention or manipulation. For example, the MTC device and the IoT device may include smartmeters, vending machines, thermometers, smartbulbs, door locks, or various sensors. The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used to control pregnancy. For example, the medical device may include a device for treatment, a device for operation, a device for (in vitro) diagnosis, a hearing aid, or an operation device. The security device may be, for example, a device installed to prevent a danger that may arise and to maintain safety. For example, the security device may be a camera, a CCTV, a recorder, or a black box. The FinTech device may be, for example, a device capable of providing a financial service such as mobile payment. For example, the FinTech device may include a payment device or a point of sale (POS) system. The weather/environment device may include, for example, a device for monitoring or predicting a weather/environment.

The first device 9010 may include at least one processor, such as a processor 9011, at least one memory, such as a memory 9012, and at least one transceiver, such as a transceiver 9013. The processor 9011 may perform the functions, procedures, and/or methods described above. The processor 9011 may perform one or more protocols. For example, the processor 9011 may implement one or more layers of a radio interface protocol. The memory 9012 may be connected to the processor 9011 and store various types of information and/or commands. The transceiver 9013 may be connected to the processor 9011 and controlled to transmit/receive a radio signal. The transceiver 9013 may be connected to one or more antennas 9014-1 to 9014-$n$. The transceiver 9013 may be configured to transmit and receive the user data, control information, and radio signals/channels, mentioned in the methods and/or operation flowcharts of the present specification, through the one or more antennas 9014-1 to 9014-$n$. In the present specification, the n antennas may be n physical antennas or n logical antenna ports.

The second device 9020 may include at least one processor such as a processor 9021, at least one memory such as a memory 9022, and at least one transceiver such as a transceiver 9023. The processor 9021 may perform the functions, procedures, and/or methods described above. The processor 9021 may implement one or more protocols. For example, the processor 9021 may implement one or more layers of the radio interface protocol. The memory 9022 may be connected to the processor 9021 and store various types of information and/or commands. The transceiver 9023 may be connected to the processor 9021 and controlled to transmit/receive a radio signal. The transceiver 9023 may be connected to one or more antennas 9024-1 to 9024-$n$. The transceiver 9023 may be configured to transmit and receive the user data, control information, and radio signals/channels, mentioned in the methods and/or operation flowcharts of the present specification, through the one or more antennas 9024-1 to 9024-$n$.

The memory 9012 and/or the memory 9022 may each be connected inside or outside the processor 9011 and/or the processor 9021 and connected to other processors by various techniques such as wired or wireless connection. FIG. 34 illustrates a wireless communication device according to an embodiment.

FIG. 34 is a detailed diagram of the first device 9010 or the second device 9020 of FIG. 33. However, the wireless communication device of FIG. 34 is not limited to the UE. The wireless communication device may be an arbitrary suitable mobile computer device configured to implement one or more of a vehicle communication system or device, a wearable device, a portable computer, and a smartphone.

Referring to FIG. 34, the UE may include at least one processor (e.g., a DSP or a microprocessor) such as a processor 9110, a transceiver 9135, a power management module 9105, an antenna 9140, a battery 9155, a display 9115, a keypad 9120, a global positioning system (GPS) chip 9160, a sensor 9165, a memory 9130, an (optional) subscriber identification module (SIM) card 9125, a speaker 9145, and a microphone 9150. The UE may include one or more antennas.

The processor 9110 may be configured to perform the functions, procedures, and/or methods described above. According to an implementation example, the processor 9110 may implement one or more protocols such as layers of the radio interface protocol.

The memory 9130 may be connected to the processor 9110 to store information related to operation of the processor 9110. The memory 9130 may be located insider or outside the processor 9110 and may be connected to other processors by various techniques such as wired or wireless connection.

A user may input various types of information (e.g., instruction information such as telephone numbers) by various techniques such as pressing a button on the keypad 9120 or activating voice using the microphone 9150. The processor 9110 performs appropriate functions such as receiving and/or processing information of the user and dialing a telephone number. For example, data (e.g., operational data) may be retrieved from the SIM card 9125 or the memory 9130 to perform the appropriate functions. As another example, the processor 10 may receive and process GPS information from the GPS chip 9160 to perform functions related to the location of the UE such as vehicle navigation, map services, or the like. As another example, the processor 9110 may display various types of information on the display 9115 for reference and convenience of the user.

The transceiver 9135 is connected to the processor 9110 to transmit and/or receive radio signals, such as RF signals. The processor 9110 may control the transceiver 9135 to initiate communication and transmit radio signals including various types of information or data, such as voice communication data. The transceiver 9135 may include one receiver and one transmitter for receiving and transmitting radio signals. The antenna 9140 facilitates transmission and reception of radio signals. In some implementations, upon receipt of radio signals, the transceiver 9135 may forward and convert the signals to a baseband frequency for processing by the processor 9110. The processed signals may be processed according to various techniques, such as being converted into audible information so that the signals may be output through the speaker 9145 or into readable information.

In some implementations, the sensor 9165 may be connected to the processor 9110. The sensor 9165 may include one or more sensing devices configured to detect various types of information, including, without being limited to, velocity, acceleration, light, vibration, proximity, position, and images. The processor 9110 receives and processes the sensor information obtained from the sensor 9165 and performs various functions such as collision avoidance and autonomous driving.

In the example of FIG. 34, various components (e.g., a camera and a USB port) may be further included in the UE. For example, the camera may be connected to the processor 9110, which may be used for a variety of services such as autonomous driving and vehicle safety services.

In this way, FIG. 34 is purely exemplary and implementation is not limited thereto. For example, some components (e.g., the keypad 9120, the GPS chip 9160, the sensor 9165, the speaker 9145, and/or the microphone 9150) may be excluded in some implementations.

Figure 35:
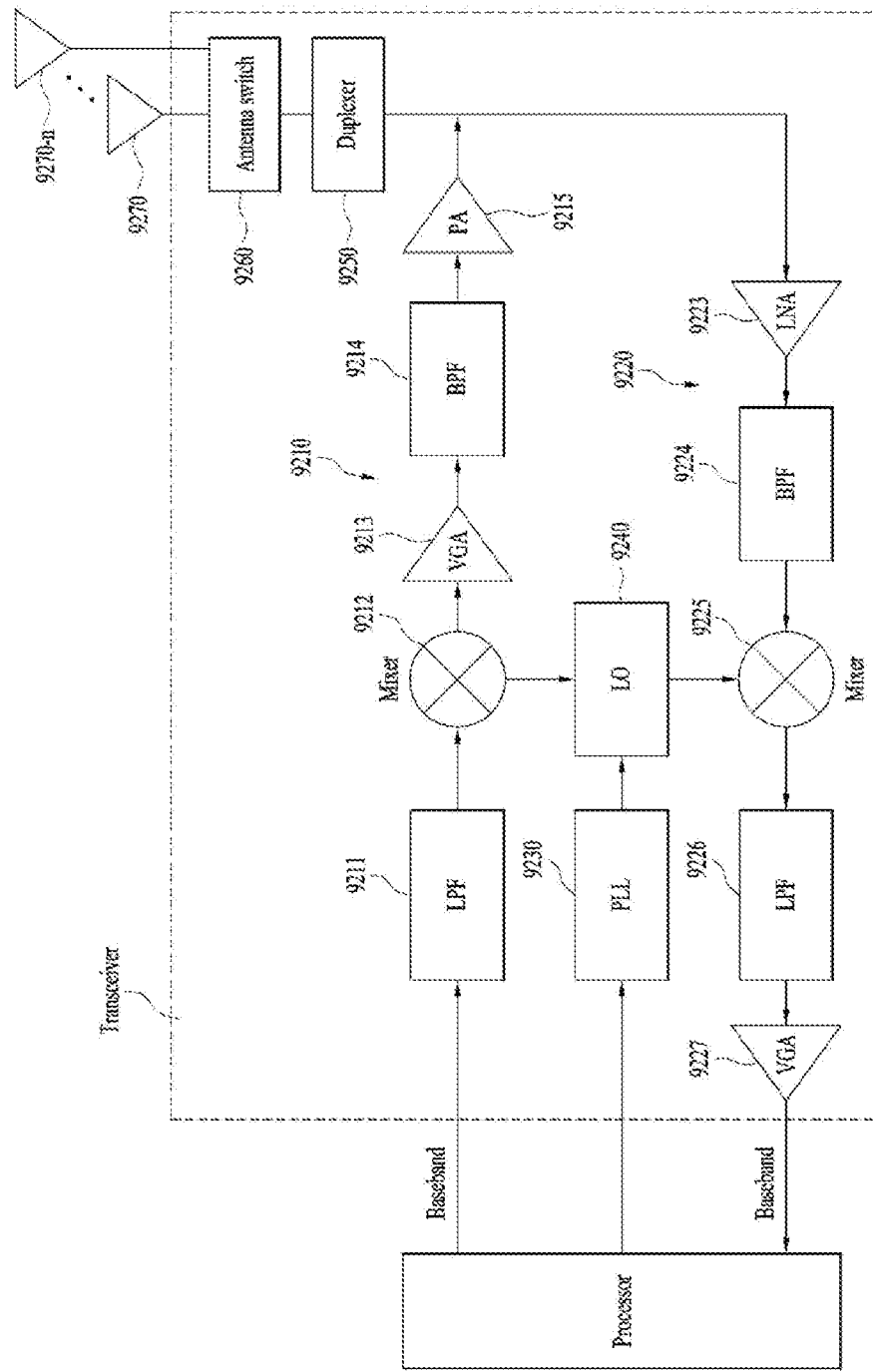

FIG. 35 illustrates a transceiver of a wireless communication device according to an embodiment. For example, FIG. 35 may illustrate an example of a transceiver that may be implemented in a frequency division duplex (1-DD) system.

On a transmission path, at least one processor, such as the processor described with reference to FIGS. 34 and 35, may process data to be transmitted and transmit a signal such as an analog output signal to a transmitter 9210.

In the above example, in the transmitter 9210, the analog output signal may be filtered by a low-pass filter (LPF) 9211 in order to eliminate noise caused by, for example, previous digital-to-analog conversion (ADC), up-converted into an RF signal from a baseband signal by an up-converter (e.g., a mixer) 9212, and then amplified by an amplifier such as a variable gain amplifier (VGA) 9213. The amplified signal may be filtered by a filter 9214, amplified by a power amplifier (PA) 9215, routed by a duplexer 9250/antenna switches 9260, and then transmitted through an antenna 9270.

On a reception path, the antenna 9270 may receive a signal in a wireless environment. The received signal may be routed by the antenna switches 9260/duplexer 9250 and then transmitted to a receiver 9220.

In the above example, in the receiver 9220, the received signal may be amplified by an amplifier such as a low-noise amplifier (LNA) 9223, filtered by a band-pass filter (BPF) 9224, and then down-converted into the baseband signal from the RF signal by a down-converter (e.g., a mixer) 9225.

The down-converted signal may be filtered by an LPF 9226 and amplified by an amplifier such as a VGA 9227 in order to obtain an analog input signal. The analog input signal may be provided to one or more processors.

Furthermore, a local oscillator (LO) 9240 may generate an LO signal for transmission and reception and transmit the LO signal to the up-converter 9212 and the down-converter 9224.

In some implementations, a phase-locked loop (PLL) 9230 may receive control information from the processor and transmit control signals to the LO 9240 so that the LO 9240 may generate LO signals for transmission and reception at an appropriate frequency.

Implementations are not limited to a specific arrangement illustrated in FIG. 35 and various components and circuits may be arranged differently from the example illustrated in FIG. 35.

Figure 36:
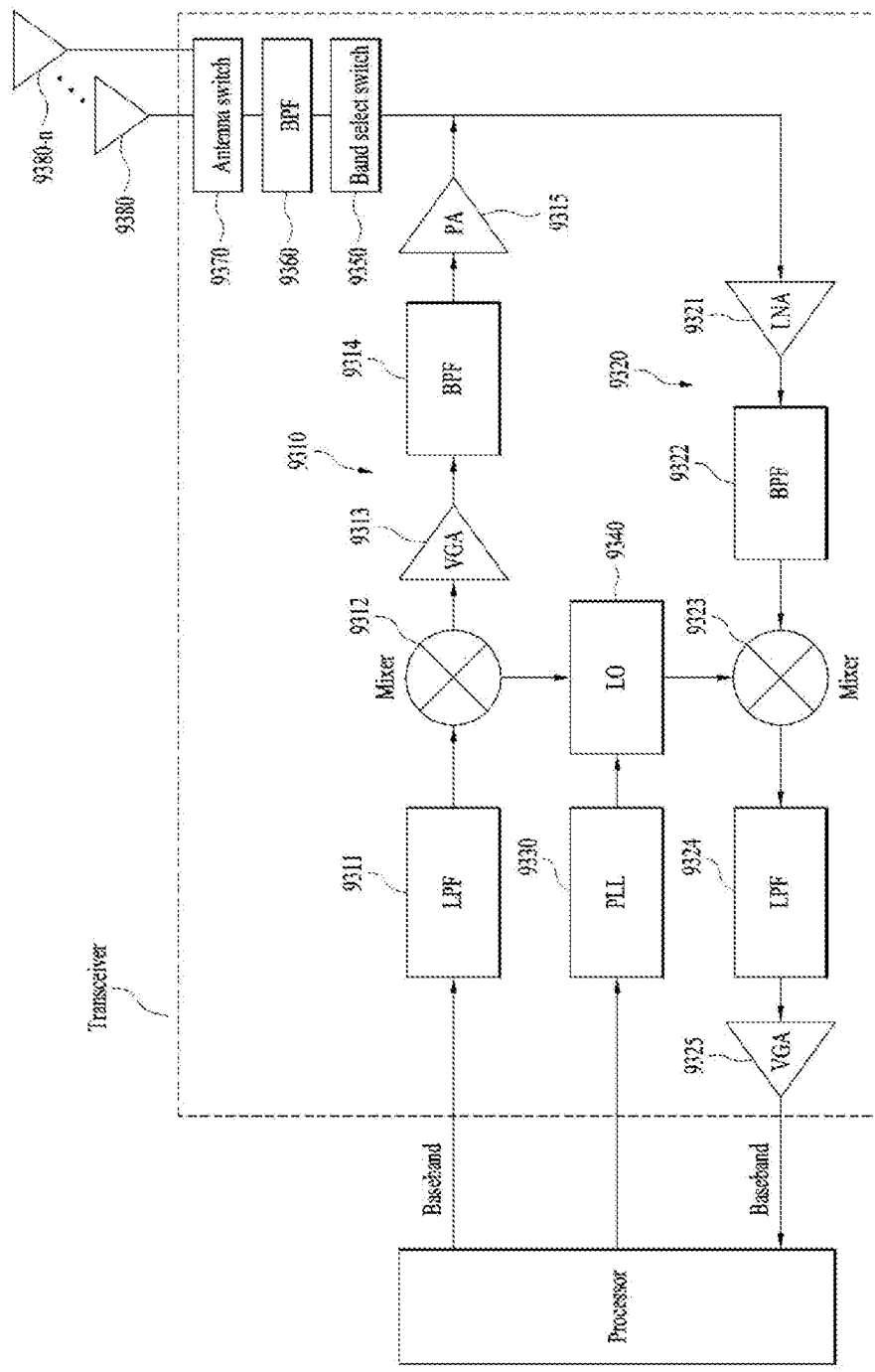
Figure 37:
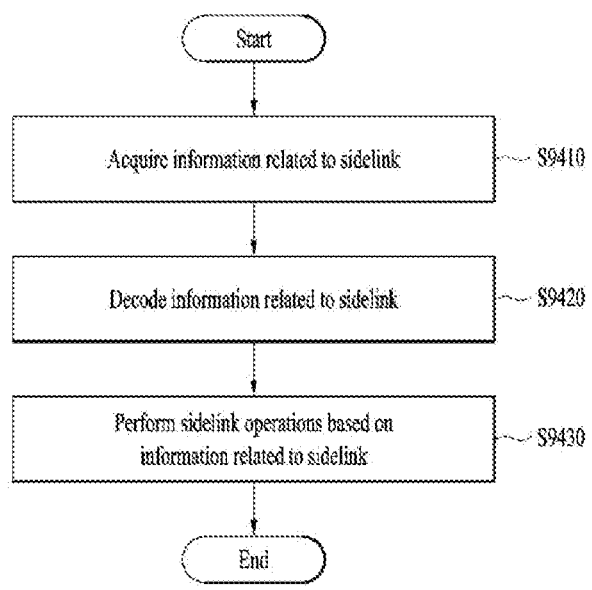
Figure 38:
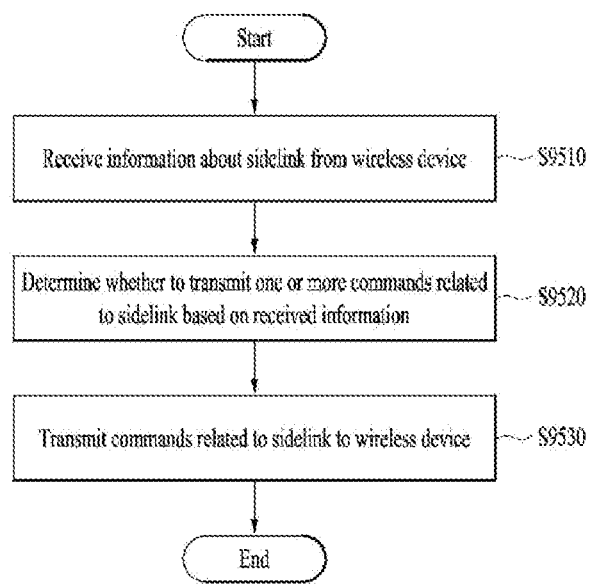
Figure 39:
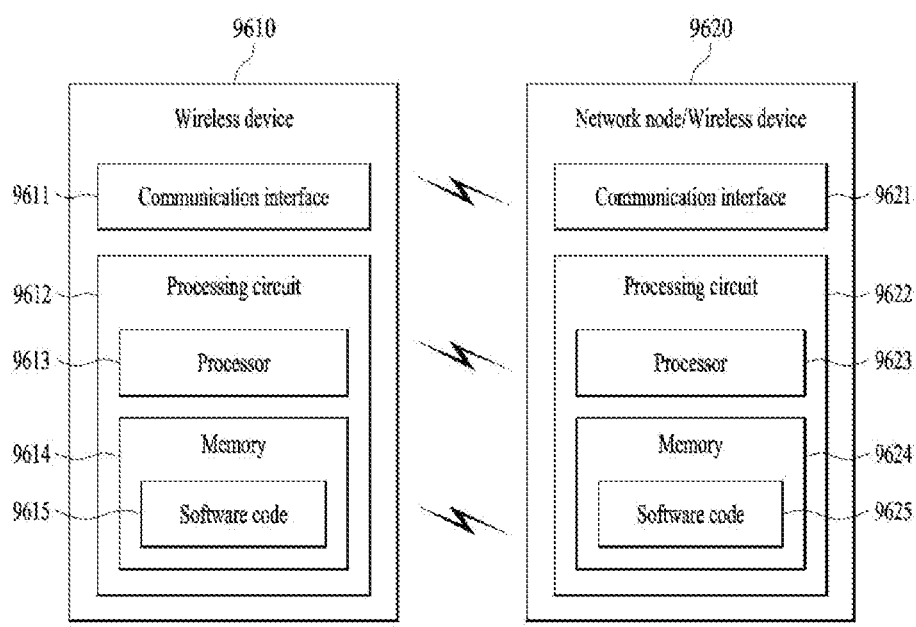

FIG. 36 illustrates a transceiver of a wireless communication device according to an embodiment. For example, FIG. 36 may illustrate an example of a transceiver that may be implemented in a time division duplex (TDD) system.

In some implementations, a transmitter 9310 and a receiver 9320 of the transceiver of the TDD system may have one or more features similar to the transmitter and receiver of the transceiver of the FDD system. Hereinafter, the structure of the transceiver of the TDD system will be described.

On a transmission path, a signal amplified by a PA 9315 of the transmitter may be routed through a band select switch 9350, a BPF 9360, and antenna switch(s) 9370 and then transmitted through an antenna 9380.

On a reception path, the antenna 9380 receives a signal in a wireless environment. The received signal may be routed through the antenna switch(s) 9370, the BPF 9360, and the band select switch 9350 and then provided to the receiver 9320.

FIG. 33 illustrates an operation of a wireless device related to sidelink communication, according to an embodiment. The operation of the wireless device related to sidelink described in FIG. 33 is purely exemplary and sidelink operations using various techniques may be performed by the wireless device. Sidelink may be a UE-to-UE interface for sidelink communication and/or sidelink discovery. Sidelink may correspond to a PC5 interface. In a broad sense, a sidelink operation may be transmission and reception of information between UEs. Sidelink may carry various types of information.

Referring to FIG. 33, in step S9410, the wireless device may acquire information related to sidelink. The information related to sidelink may be one or more resource configurations. The information related to sidelink may be obtained from other wireless devices or network nodes.

After acquiring the information related to sidelink, the wireless device may decode the information related to the sidelink in step S9420.

After decoding the information related to the sidelink, the wireless device may perform one or more sidelink operations based on the information related to the sidelink in step S9430. The sidelink operation(s) performed by the wireless device may include the one or more operations described in the present specification.

FIG. 34 illustrates an operation of a network node related to sidelink according to an embodiment. The operation of the network node related to sidelink described in FIG. 34 is purely exemplary and sidelink operations using various techniques may be performed by the network node.

Referring to FIG. 34, in step S9510, the network node may receive information about sidelink from a wireless device. For example, the information about sidelink may be sidelink UE information used to inform the network node of sidelink information.

After receiving the information, in step S9520, the network node may determine whether to transmit one or more commands related to sidelink based on the received information.

According to the determination of the network node to transmit the command(s), the network node may transmit the command(s) related to sidelink to the wireless device in step S9530. In some implementations, after receiving the command(s) transmitted by the network node, the wireless device may perform one or more sidelink operations based on the received command(s).

FIG. 35 illustrates implementation of a wireless device and a network node according to one embodiment. The network node may be replaced with a wireless device or a UE.

Referring to FIG. 35, a wireless device 9610 may include a communication interface 9611 to communicate with one or more other wireless devices, network nodes, and/or other elements in a network. The communication interface 9611 may include one or more transmitters, one or more receivers, and/or one or more communication interfaces. The wireless device 9610 may include a processing circuit 9612. The processing circuit 9612 may include one or more processors such as a processor 9613, and one or more memories such as a memory 9614.

The processing circuit 9612 may be configured to control the arbitrary methods and/or processes described in the present specification and/or to allow, for example, the wireless device 9610 to perform such methods and/or processes. The processor 9613 may correspond to one or more processors for performing the wireless device functions described in the present specification. The wireless device 9610 may include the memory 9614 configured to store data, program software code, and/or other information described in the present specification.

In some implementations, the memory 9614 may be configured to store software code 9615 including instructions for causing the processor 9613 to perform a part or all of the above-described processes according to the present disclosure when one or more processors, such as the processor 9613, are executed.

For example, one or more processors, such as the processor 9613, that control one or more transceivers, such as a transceiver 2223, for transmitting and receiving information may perform one or more processes related to transmission and reception of information.

A network node 9620 may include a communication interface 9621 to communicate with one or more other network nodes, wireless devices, and/or other elements on a network. Here, the communication interface 9621 may include one or more transmitters, one or more receivers, and/or one or more communication interfaces. The network node 9620 may include a processing circuit 9622. Here, the processing circuit 9622 may include a processor 9623 and a memory 9624.

In some implementations, the memory 9624 may be configured to store software code 9625 including instructions for causing the processor 9623 to perform a part or all of the above-described processes according to the present disclosure when one or more processors, such as the processor 9623, are executed.

For example, one or more processors, such as processor 9623, that control one or more transceivers, such as a transceiver 2213, for transmitting and receiving information may perform one or more processes related to transmission and reception of information.

The aforementioned implementations are achieved by combinations of structural elements and features in various manners. Each of the structural elements or features may be considered selective unless specified otherwise. Each of the structural elements or features may be carried out without being combined with other structural elements or features. In addition, some structural elements and/or features may be combined with one another to constitute implementations. Operation orders described in implementations may be rearranged. Some structural elements or features of one implementation may be included in another embodiment or may be replaced with corresponding structural elements or features of another implementation.

The implementations of the present disclosure may be embodied through various techniques, for example, hardware, firmware, software, or combinations thereof. In a hardware configuration, a method according to the implementations may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), one or more processors, one or more controllers, one or more microcontrollers, one or more microprocessors, etc.

In a firmware or software configuration, the implementations may be embodied as a module, a procedure, or a function. Software code may be stored in a memory and executed by a processor. The memory is located at the interior or exterior of the processor and may transmit and receive data to and from the processor by various methods.

It is apparent that ordinary persons skilled in the art may perform various modifications and variations that can be made in the present disclosure without departing from the spirit or scope of the disclosure. While the present disclosure has been described with reference to an example applied to a 3GPP LTE/LTE-A system or a 5G system (or NR system), the present disclosure is applicable to various other wireless communication systems.

INDUSTRIAL APPLICABILITY

The embodiments described above may be applied to various mobile communication systems.

The invention claimed is:

1. A method of transmitting a signal by a first user equipment (UE) in a wireless communication system, the method comprising:
   determining, by the first UE, at least one of transmission parameters, a channel state information reference signal (CSI-RS) transmission configuration, or a demodulation reference signal (DMRS) configuration; and
   transmitting, by the first UE, the signal to a second UE based on the at least one of the transmission parameters, the CSI-RS transmission configuration, or the DMRS configuration,
   wherein based on establishment of a unicast connection with the second UE, the first UE determines a first value corresponding to one of a relative speed/acceleration, a relative distance/distance change, or a relative position/position change with the second UE based on information included in a message from the second UE and sensor information, and
   wherein the first UE changes the at least one of the transmission parameters, the CSI-RS transmission configuration, or the DMRS configuration based on a change of the first value,
   wherein the CSI-RS transmission configuration includes at least one of a CSI-RS transmission period or a CSI-RS transmission pattern,
   wherein the DMRS configuration includes at least one of a number DMRSs per slot or a DMRS pattern, and wherein the transmission parameters include at least one of transmission power, a transmission resource size, or a number of retransmissions.

2. The method of claim 1, wherein at least one of transmission parameters related to the first value, CSI-RS transmission configuration related to the first value, or a DMRS configuration related to the first value is received through a physical layer signaling or a higher layer signaling.

3. The method of claim 1,
wherein based on that there is no establishment of a unicast connection with a specific UE, the first UE determines a second value corresponding to relative differences from a plurality of UEs based on the sensor information and one of minimum, average, maximum, and weight values of information in messages received from the plurality of UEs, and
wherein the first UE changes the at least one of the transmission parameters, the CSI-RS transmission configuration, or the DMRS configuration based on the second value.

4. The method of claim 1, wherein the first UE receives at least one of transmission parameters, CSI-RS transmission configuration, or DMRS configuration depending on an average relative speed, an average distance, and an average moving trajectory in a specific area, for each resource pool, each bandwidth part, or each carrier, through a physical layer signaling or a higher layer signaling.

5. The method of claim 4, wherein the first UE transmits at least one of an average relative speed, an average relative acceleration, or an average distance of other UEs communicating with the first UE, an average number of UEs performing communication, channel state information (CSI) variation, or modulation and coding scheme (MCS) variation to a base station, through a physical layer signaling or a higher layer signaling.

6. The method of claim 1, wherein based on that the first UE is a Mode 1 UE, a base station provides configuration information on the Mode 1 UE to a Mode 2 UE.

7. The method of claim 1, wherein the message from the second UE is at least one of a basic safety message (BSM), a cooperative awareness message (CAM), or a decentralized notification message (DENM).

8. The method of claim 1, wherein the message from the second UE includes at least one of a speed, an acceleration, a location, an altitude, a direction, a relative distance, a relative trajectory, a lane change, a congestion level, or a channel busy ratio (CBR).

9. The method of claim 1, wherein the sensor information includes at least one of a speed, an acceleration, a location, an altitude, a direction, a relative distance, a relative trajectory, a lane change, a congestion level, or a channel busy ratio (CBR).

10. The method of claim 1, wherein the sidelink-signal is either a CSI-RS or a DMRS.

11. A first user equipment (UE) in a wireless communication system, the first UE comprising:
a memory; and
a plurality of processors coupled to the memory,
wherein at least one processor among the plurality of processors is configured to:
determine at least one of transmission parameters, a channel state information reference signal (CSI-RS) transmission configuration, or a demodulation reference signal (DMRS) configuration, and
transmit a signal to a second UE based on the at least one of the transmission parameters, the CSI-RS transmission configuration, or the DMRS configuration,
wherein based on establishment of a unicast connection with the second UE, the first UE determines a first value corresponding to one of a relative speed/acceleration, a relative distance/distance change, or a relative position/position change with the second UE based on information included in a message from the second UE and sensor information, and
wherein the first UE changes the at least one of the transmission parameters, the CSI-RS transmission configuration, or the DMRS configuration based on a change of the first value,
wherein the CSI-RS transmission configuration includes at least one of a CSI-RS transmission period or a CSI-RS transmission pattern,
wherein the DMRS configuration includes at least one of a number DMRSs per slot or a DMRS pattern, and
wherein the transmission parameters include at least one of transmission power, a transmission resource size, or a number of retransmissions.

12. The first UE of claim 11, wherein the first UE is an autonomous driving vehicle or included in the autonomous driving vehicle.

* * * * *